US008683157B2

(12) United States Patent
Nakagawa et al.

(10) Patent No.: US 8,683,157 B2
(45) Date of Patent: *Mar. 25, 2014

(54) STORAGE SYSTEM AND VIRTUALIZATION METHOD

(75) Inventors: Yoshihito Nakagawa, Oi (JP); Satoru Ozaki, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,577

(22) Filed: Apr. 16, 2012

(65) Prior Publication Data
US 2012/0203988 A1    Aug. 9, 2012

Related U.S. Application Data

(63) Continuation of application No. 11/970,762, filed on Jan. 8, 2008, now Pat. No. 8,301,854.

(30) Foreign Application Priority Data

Oct. 5, 2007  (JP) ................................. 2007-261650

(51) Int. Cl.
G06F 12/00 (2006.01)
(52) U.S. Cl.
USPC ........... 711/162; 711/161; 711/165; 711/203; 714/1; 714/6.23; 714/6.3; 714/6.1
(58) Field of Classification Search
None
See application file for complete search history.

(56) References Cited

U.S. PATENT DOCUMENTS

| 7,424,592 | B1 * | 9/2008 | Karr et al. .................... 711/203 |
| 2005/0223267 | A1 * | 10/2005 | Fujibayashi .................... 714/6 |
| 2006/0085388 | A1 | 4/2006 | Shinohara et al. |
| 2007/0118840 | A1 | 5/2007 | Amaki et al. |
| 2008/0034005 | A1 | 2/2008 | Satoyama |
| 2008/0104346 | A1 | 5/2008 | Watanabe et al. |
| 2008/0104347 | A1 | 5/2008 | Iwamura et al. |
| 2008/0104443 | A1 | 5/2008 | Akutsu et al. |

FOREIGN PATENT DOCUMENTS

JP    2007-150409    6/2007

* cited by examiner

Primary Examiner — Matthew Bradley
Assistant Examiner — Alan Otto
(74) Attorney, Agent, or Firm — Brundidge & Stanger, P.C.

(57) ABSTRACT

The storage system of the present invention is able to generate one virtual logical device from different logical devices which exist in each of the different storage control units and remote-copy all or part of the virtual logical device to another logical device. The same virtual identifier is set for a volume of the first storage unit and for a volume of the second storage unit. The path control unit of the host identifies a plurality of volumes which have the same virtual identifier as one virtual volume. A remote copy pair can also be set by a virtual volume and a volume of the third storage unit. The setting of the virtual volume and the setting of the remote copy can be performed by means of an instruction from the management server.

12 Claims, 47 Drawing Sheets

FIG. 9

VIRTUAL VOLUME MANAGEMENT INFORMATION TABLE — T10

| # | VIRTUAL VOLUME ID (C12) | | FIRST VIRTUAL VOLUME CONSTITUTION INFORMATION (C13) | | | SECOND VIRTUAL VOLUME CONSTITUTION INFORMATION (C14) | | |
|---|---|---|---|---|---|---|---|---|
|   | S/N (C15) | LDEV# (C16) | S/N (C15) | LDEV# (C16) | PVOL/SVOL (C17) | S/N (C15) | LDEV# (C16) | PVOL/SVOL (C17) |
| 1 | 0001 0002 | 0001 | 0x0001 | 0x0001 | PVOL | 0x0002 | 0x0002 | SVOL |
| 2 | 0001 0003 | 0011 | 0x0001 | 0x0011 | SVOL | 0x0003 | 0x0011 | PVOL |
| 3 | 0001 0004 | 0013 | 0x0001 | 0x0013 | PVOL | 0x0004 | 0x0040 | SVOL |
| 4 | 0001 0005 | 0015 | 0x0001 | 0x0015 | SVOL | 0x0005 | 0x0060 | PVOL |
| 5 | 0001 0006 | 0022 | 0x0001 | 0x0022 | PVOL | 0x0006 | 0x0050 | SVOL |
| 6 | 0001 0007 | 0025 | 0x0001 | 0x0025 | PVOL | 0x0007 | 0x0100 | SVOL |
| 7 | 0001 0008 | 0100 | 0x0001 | 0x0100 | PVOL | 0x0008 | 0x0220 | SVOL |
| ... | ... | ... | ... | ... | ... | ... | ... | ... |

| VIRTUAL VOLUME ID (C12) | | |
|---|---|---|
| FIRST UNIT NUMBER (S/N) (C151) | SECOND UNIT NUMBER (S/N) (C152) | PVOL LDEV NUMBER (C16) |

FIG. 10

| VIRTUAL VOLUME ID | | | | C12 |
|---|---|---|---|---|
| C151 | C152 | C16 | C18 | |
| FIRST UNIT NUNBER (S/N) | SECOND UNIT NUNBER (S/N) | PVOL LDEV NUMBER | SERIAL NUMBER | |

FIG. 11

REMOTE COPY PAIR MANAGEMENT TABLE (T20)

| # (C21) | FIRST REMOTE COPY CONSTITUTION INFORMATION (C22) | | | | SECOND REMOTE COPY CONSTITUTION INFORMATION (C23) | | | |
|---|---|---|---|---|---|---|---|---|
| | S/N (C24) | LDEV# (C25) | RC-PVOL/RC-SVOL (C26) | VVOL ATTRIBUTE (C27) | S/N (C24) | LDEV# (C25) | RC-PVOL/RC-SVOL (C26) | VVOL ATTRIBUTE (C27) |
| 1 | 0x00010002 | 0x0001 | RC-PVOL | ON | 0x0003 | 0x0003 | RC-SVOL | OFF |
| 2 | 0x0001 | 0x0011 | RC-SVOL | OFF | 0x00030004 | 0x0011 | RC-PVOL | ON |
| 3 | 0x0001 | 0x0013 | RC-PVOL | OFF | 0x0012 | 0x0040 | RC-SVOL | OFF |
| 4 | 0x00010005 | 0x0015 | RC-SVOL | ON | 0x00030004 | 0x0060 | RC-PVOL | ON |
| ... | ... | ... | ... | ... | ... | ... | ... | ... |

FIG. 12

LDEV MANAGEMENT TABLE T30

| LDEV# C31 | INTERNAL VOL/EXTERNAL VOL C32 | VDEV# C33 | START ADDRESS C34 | SIZE C35 |
|---|---|---|---|---|
| 0x0000 | INTERNAL VOL | 0x0000 | 0x00000000 | 1000 |
| 0x0001 | INTERNAL VOL | 0x0000 | 0x00010000 | 1000 |
| 0x0002 | INTERNAL VOL | 0x0001 | 0x00010000 | 2000 |
| 0x0003 | EXTERNAL VOL | 0x0003 | 0x00010000 | 1000 |
| ... | ... | ... | ... | ... |

| | | EXTERNAL VOLUME MANAGEMENT TABLE | | | |
|---|---|---|---|---|---|
| C41 | C42 | C43 | | | |
| | | EXTERNAL STORAGE INFORMATION | | | |
| VDEV# | CONNECTION PORT | C44 | C45 | C46 | C47 |
| | | LUN | VENDOR NAME | UNIT NAME | VOLUME ID |
| 0x0000 | | | | | |
| 0x0001 | | | | | |
| 0x0002 | | | | | |
| 0x0003 | 0x01 | 0x02 | H | RA | 123456789 |
| 0x0004 | | | | | |
| 0x0005 | | | | | |
| ... | ... | ... | ... | ... | ... |

FIG. 18

VOLUME LIST — G11

| S/N | LDEV# | INTERNAL VOL/ EXTERNAL VOL | SIZE (BLOCK) |
|---|---|---|---|
| 0x0001 | 0x0000 | INTERNAL VOL | 10000 |
| 0x0001 | 0x0001 | INTERNAL VOL | 10000 |
| 0x0001 | 0x0010 | INTERNAL VOL | 20000 |
| 0x0001 | 0x0011 | EXTERNAL VOL | 10000 |
| ⋮ | ⋮ | ⋮ | ⋮ |
| 0x0002 | 0x0000 | INTERNAL VOL | 50000 |
| 0x0002 | 0x0001 | INTERNAL VOL | 10000 |
| 0x0002 | 0x0020 | EXTERNAL VOL | 20000 |
| 0x0002 | 0x0040 | EXTERNAL VOL | 10000 |
| ⋮ | ⋮ | ⋮ | ⋮ |
| 0x0003 | 0x0000 | INTERNAL VOL | 50000 |
| 0x0003 | 0x0001 | INTERNAL VOL | 10000 |
| 0x0003 | 0x0020 | INTERNAL VOL | 20000 |
| 0x0003 | 0x0030 | INTERNAL VOL | 20000 |
| ⋮ | ⋮ | ⋮ | ⋮ |

SELECTION LIST — G12

| S/N | LDEV# | INTERNAL VOL/ EXTERNAL VOL | SIZE | PVOL/SVOL |
|---|---|---|---|---|
|  |  |  |  |  |

G13 Apply    G14 Cancel

FIG. 19

VOLUME LIST — G11

| S/N | LDEV# | INTERNAL VOL/ EXTERNAL VOL | SIZE (BLOCK) |
|---|---|---|---|
| 0x0001 | 0x0000 | INTERNAL VOL | 10000 |
| 0x0001 | 0x0001 | INTERNAL VOL | 10000 |
| 0x0001 | 0x0010 | INTERNAL VOL | 20000 |
| 0x0001 | 0x0011 | EXTERNAL VOL | 10000 |
| ⋮ | ⋮ | ⋮ | ⋮ |
| 0x0002 | 0x0000 | INTERNAL VOL | 50000 |
| 0x0002 | 0x0001 | INTERNAL VOL | 10000 |
| 0x0002 | 0x0020 | EXTERNAL VOL | 20000 |
| 0x0002 | 0x0040 | EXTERNAL VOL | 10000 |
| ⋮ | ⋮ | ⋮ | ⋮ |
| 0x0003 | 0x0000 | INTERNAL VOL | 50000 |
| 0x0003 | 0x0001 | INTERNAL VOL | 10000 |
| 0x0003 | 0x0020 | INTERNAL VOL | 20000 |
| 0x0003 | 0x0030 | INTERNAL VOL | 20000 |
| ⋮ | ⋮ | ⋮ | ⋮ |

G15: set PVOL / set SVOL

SELECTION LIST — G12

| S/N | LDEV# | INTERNAL VOL/ EXTERNAL VOL | SIZE | PVOL/SVOL |
|---|---|---|---|---|
|  |  |  |  |  |

G13 (Apply)   G14 (Cancel)

FIG. 20

VOLUME LIST — G11

| S/N | LDEV# | INTERNAL VOL/ EXTERNAL VOL | SIZE (BLOCK) |
|---|---|---|---|
| 0x0001 | 0x0000 | INTERNAL VOL | 10000 |
| 0x0001 | 0x0001 | INTERNAL VOL | 10000 |
| 0x0001 | 0x0010 | INTERNAL VOL | 20000 |
| 0x0001 | 0x0011 | EXTERNAL VOL | 10000 |
| ⋮ | ⋮ | ⋮ | ⋮ |
| 0x0002 | 0x0000 | INTERNAL VOL | 50000 |
| 0x0002 | 0x0001 | INTERNAL VOL | 10000 |
| 0x0002 | 0x0020 | EXTERNAL VOL | 20000 |
| 0x0002 | 0x0040 | EXTERNAL VOL | 10000 |
| ⋮ | ⋮ | ⋮ | ⋮ |
| 0x0003 | 0x0000 | INTERNAL VOL | 50000 |
| 0x0003 | 0x0001 | INTERNAL VOL | 10000 |
| 0x0003 | 0x0020 | INTERNAL VOL | 20000 |
| 0x0003 | 0x0030 | INTERNAL VOL | 20000 |
| ⋮ | ⋮ | ⋮ | ⋮ |

G15: set PVOL / set SVOL

SELECTION LIST — G12

| S/N | LDEV# | INTERNAL VOL/ EXTERNAL VOL | SIZE | PVOL/SVOL |
|---|---|---|---|---|
| 0x0001 | 0x0010 | INTERNAL VOL | 20000 | PVOL |

G13: Apply    G14: Cancel

FIG. 21

VOLUME LIST — G11

| S/N | LDEV# | INTERNAL VOL/ EXTERNAL VOL | SIZE (BLOCK) |
|---|---|---|---|
| 0x0001 | 0x0000 | INTERNAL VOL | 10000 |
| 0x0001 | 0x0001 | INTERNAL VOL | 10000 |
| 0x0001 | 0x0010 | INTERNAL VOL | 20000 |
| 0x0001 | 0x0011 | EXTERNAL VOL | 10000 |
| ⋮ | ⋮ | ⋮ | ⋮ |
| 0x0002 | 0x0000 | INTERNAL VOL | 50000 |
| 0x0002 | 0x0001 | INTERNAL VOL | 10000 |
| 0x0002 | 0x0020 | EXTERNAL VOL | 20000 |
| 0x0002 | 0x0040 | EXTERNAL VOL | 10000 |
| ⋮ | ⋮ | ⋮ | ⋮ |
| 0x0003 | 0x0000 | INTERNAL VOL | 50000 |
| 0x0003 | 0x0001 | INTERNAL VOL | 10000 |
| 0x0003 | 0x0020 | INTERNAL VOL | 20000 |
| 0x0003 | 0x0030 | INTERNAL VOL | 20000 |
| ⋮ | ⋮ | ⋮ | ⋮ |

SELECTION LIST — G12

| S/N | LDEV# | INTERNAL VOL/ EXTERNAL VOL | SIZE | PVOL/SVOL |
|---|---|---|---|---|
| 0x0001 | 0x0010 | INTERNAL VOL | 20000 | PVOL |
| 0x0002 | 0x0020 | EXTERNAL VOL | 20000 | SVOL |

G13 Apply   G14 Cancel

FIG. 22

VIRTUAL VOLUME LIST — G20

| VIRTUAL VOLUME ID | PVOL (G22) | | | SVOL (G23) | | | SIZE (G24) |
|---|---|---|---|---|---|---|---|
| S/N | S/N | LDEV# | INTERNAL / EXTERNAL | S/N | LDEV# | INTERNAL / EXTERNAL | |
| 0x00010002 | 0x0001 | 0x0010 | INTERNAL VOL | 0x0002 | 0x0020 | EXTERNAL VOL | 20000 |
| 0x00010002 | 0x0001 | 0x0000 | INTERNAL VOL | 0x0002 | 0x0001 | INTERNAL VOL | 10000 |

VIRTUAL VOLUME LIST (G31)

| VIRTUAL VOLUME ID | | PVOL | | | SVOL | | |
|---|---|---|---|---|---|---|---|
| S/N | LDEV# | S/N | LDEV# | INTERNAL / EXTERNAL | S/N | LDEV# | INTERNAL / EXTERNAL | SIZE |
| 0x00010002 | 0x0010 | 0x0001 | 0x0010 | INTERNAL VOL | 0x0002 | 0x0020 | EXTERNAL VOL | 20000 |
| 0x00010002 | 0x0000 | 0x0001 | 0x0000 | INTERNAL VOL | 0x0002 | 0x0001 | INTERNAL VOL | 10000 |

NORMAL VOLUME LIST (G32)

| S/N | LDEV# | INTERNAL / EXTERNAL | SIZE |
|---|---|---|---|
| 0x0001 | 0x0010 | EXTERNAL VOL | 20000 |
| 0x0001 | 0x0011 | EXTERNAL VOL | 10000 |
| 0x0002 | 0x0000 | INTERNAL VOL | 50000 |
| 0x0002 | 0x0040 | EXTERNAL VOL | 10000 |
| 0x0003 | 0x0020 | INTERNAL VOL | 20000 |
| 0x0003 | 0x0030 | INTERNAL VOL | 20000 |

SELECTION LIST (G33)

| S/N | LDEV# | VOL TYPE | SIZE | RC-PVOL/RC-SVOL |
|---|---|---|---|---|
| 0x00010002 | 0x0010 | VVOL | 20000 | RC-PVOL |
| 0x0003 | 0x0030 | INTERNAL VOL | 20000 | RC-SVOL |

G30

Apply (G34)    Cancel (G35)

FIG. 32

| REMOTE COPY PAIR LIST | | | | | | G40 |
|---|---|---|---|---|---|---|
| RC-PVOL | | | RC-SVOL | | | |
| S/N | LDEV# | VOLUME TYPE | S/N | LDEV# | VOLUME TYPE | |
| 0x00010002 | 0x0010 | VVOL | 0x0003 | 0x0030 | INTERNAL VOL | |
| 0x0001 | 0x0000 | INTERNAL VOL | 0x000110002 | 0x0011 | VVOL | |
| | | | | | | |

FIG. 44

VIRTUAL VOLUME LIST — G31

| VIRTUAL VOLUME ID | | PVOL | | | SVOL | | |
|---|---|---|---|---|---|---|---|
| S/N | LDEV# | INTERNAL / EXTERNA | S/N | LDEV# | INTERNAL / EXTERNAL | SIZE | |
| 0x00010002 | 0x0010 | 0x0001 Delete | INTERNAL VOL | 0x0002 | 0x0020 | EXTERNAL VOL | 20000 |
| 0x00010002 | 0x0000 | | INTERNAL VOL | 0x0002 | 0x0001 | INTERNAL VOL | 10000 |

G36

SELECTION LIST — G33

| VIRTUAL VOLUME ID | | PVOL | | | SVOL | | |
|---|---|---|---|---|---|---|---|
| S/N | LDEV# | S/N | INTERNAL / EXTERNA | S/N | LDEV# | INTERNAL / EXTERNAL | SIZE |
| 0x00010002 | 0x0010 | 0x0001 | INTERNAL VOL | 0x0002 | 0x0020 | EXTERNAL VOL | 20000 |

G40

Apply — G34      Cancel — G35

FIG. 45

| VIRTUAL VOLUME LIST | | | | | | | | |
|---|---|---|---|---|---|---|---|---|
| VIRTUAL VOLUME ID | | PVOL | | | SVOL | | | |
| S/N | LDEV# | S/N | LDEV# | INTERNAL / EXTERNA | S/N | LDEV# | INTERNAL / EXTERNA | SIZE |
| 0x00010002 | 0x0010 | 0x0001 | 0x0010 | INTERNAL VOL | 0x0002 | 0x0020 | EXTERNAL VOL | 20000 |
| 0x00010002 | 0x0000 | 0x0000 Delete | 000 | INTERNAL VOL | 0x0002 | 0x0001 | INTERNAL VOL | 10000 |

G31

G36

| SELECTION LIST | | | | | | | | |
|---|---|---|---|---|---|---|---|---|
| VIRTUAL VOLUME ID | | PVOL | | | SVOL | | | |
| S/N | LDEV# | S/N | LDEV# | INTERNAL / EXTERNA | S/N | LDEV# | INTERNAL / EXTERNA | SIZE |
| | | | | | | | | |

G33

G40

G34 Apply    G35 Cancel

FIG. 46

VIRTUAL VOLUME LIST — G31

| VIRTUAL VOLUME ID | | PVOL | | | SVOL | | |
|---|---|---|---|---|---|---|---|
| S/N | LDEV# | S/N | LDEV# | INTERNAL / EXTERNAL | S/N | LDEV# | INTERNAL / EXTERNAL | SIZE |
| 0x00010002 | 0x0010 | 0x0001 | 0x0010 | INTERNAL VOL | 0x0002 | 0x0020 | EXTERNAL VOL | 20000 |
| 0x00010002 | 0x0000 | 0x0001 | 0x0000 | INTERNAL VOL | 0x0002 | 0x0001 | INTERNAL VOL | 10000 |

SELECTION LIST — G33

| VIRTUAL VOLUME ID | | PVOL | | | SVOL | | |
|---|---|---|---|---|---|---|---|
| S/N | LDEV# | S/N | LDEV# | INTERNAL / EXTERNAL | S/N | LDEV# | INTERNAL / EXTERNAL | SIZE |
| 0x00010002 | 0x0010 | 0x0001 | 0x0010 | INTERNAL VOL | — | — | — | 20000 |

G40

G34 Apply   G35 Cancel

STORAGE SYSTEM AND VIRTUALIZATION METHOD

CROSS-REFERENCE TO RELATED APPLICATIONS

The present application is a continuation of application Ser. No. 11/970,762, filed Jan. 8, 2008, now U.S. Pat. No. 8,301,854; which relates to and claims priority from Japanese Patent Application No. 2007-261650 filed on Oct. 5, 2007, the entire disclosures of which are incorporated herein by reference.

BACKGROUND OF THE INVENTION

1. Field of the Invention

The present invention relates to a storage system and virtualization method.

2. Description of the Related Art

In order to handle large quantities of various types of data at government agencies, enterprises, and educational establishments, for example, data are managed using a relatively large-scale storage system. This storage system comprises at least one storage control apparatus. The storage control apparatus comprises a multiplicity of storage devices, for example, and is able to provide a RAID (Redundant Array of Inexpensive Disks)-based storage area. At least one or more logical devices (also known as logical volumes) are formed in a physical storage area that is provided by a storage device group. A host computer ('host' hereinbelow) carries out the writing of data and the reading of data by issuing write commands and read commands to the logical devices.

In order to improve the stability and so forth of data, the storage system is able to store the same data in each of a plurality of logical devices. For example, as a first conventional technology, the storage system is able to store the same data in different logical devices in the same storage control apparatus or is able to store the same data in logical devices in different storage control apparatuses (Japanese Application Laid Open No. 2007-150409).

According to this conventional technology, by storing data in a plurality of logical devices in the same enclosure or storing data in a plurality of logical devices located in different enclosures, even when a primary logical device is out of service, the work processing can be continued by using a secondary logical device. However, in order to switch from the primary logical device to the secondary logical device, it is necessary to intentionally switch the access destination device of the host from the primary logical device to the secondary logical device and the switching operation takes time.

SUMMARY OF THE INVENTION

The present invention was conceived in view of the above problem and an object of the present invention is to provide a storage system and virtualization method that make it possible to virtualize different logical devices that exist in different storage control apparatuses as one virtual logical device and remotely copy all or part of the virtual logical device to another logical device. A further object of the present invention is to provide a storage system and virtualization method that make it possible to transparently switch the access destination logical device of the host computer to the host computer even in cases where a fault occurs in accessing the first logical device by making it possible for the respective logical devices which constitute the virtual logical device to change roles between the copy source logical device and the copy destination logical device. Further objects of the present invention will become evident from embodiments that will be described subsequently.

In order to solve the above problem, the storage system according to the present invention is a storage system having a host computer and a plurality of storage control units which are utilized by the host computer, comprising a virtualization setting section which, by setting a first logical device belonging to a first storage control unit designated from among the respective storage control units and a second logical device which belongs to a second storage control unit designated from among the respective storage control units as a pair, virtualizes the first and second logical devices as one virtual logical device and supplies the virtual logical device to the host computer, the virtualization setting section setting the virtual identifier set for the virtual logical device for the first logical device and the second logical device; and a remote copy setting section that sets another logical device which belongs to another storage control unit designated from among the respective storage control units and all or part of the virtual logical device as a remote copy pair.

The host computer can comprise an alternate path control unit for switching between a first access path for accessing the first logical device for which the virtual identifier is set and a second access path for accessing the second logical device for which the virtual identifier is set.

The virtualization setting section is able to set the virtual identifier for the first logical device and the second logical device by storing first management information relating to the pair constituting the virtual logical device in both the first storage control unit and the second storage control unit.

The constitution may also be such that the virtualization setting section transmits the first management information to either the first storage control unit or the second storage control unit and one of the storage control units that receives the first management information from the virtualization setting section of the first storage control unit or the second storage control unit transmits the first management information to the other storage control unit for storage therein.

The primary device and secondary device can be switched between the first logical device and second logical device which form a pair.

In cases where the host computer updates the stored content of the virtual logical device, (1) the host computer is able to transmit a write command and write data to the logical device which is the primary device of the pair of the first logical device or the second logical device, and one of logical devices which constitutes the primary device (2-1) is able to write the write data to itself before (2-2) transferring the write data to the other logical device which constitutes the secondary device of the pair of the first logical device or the second logical device, and (2-3) confirm that the write data have been written to the other logical device before reporting to the effect that the processing of the write command is complete to the host computer.

In cases where the first logical device is the primary device of the pair and the first access path is the primary access path of the virtual logical device, the host computer is able to access the second logical device by using the second access path when it is not possible to access the first logical device by using the first access path; and, in cases where access is made by the host computer, the second logical device is able to change the attribute of the first logical device from the primary device to the secondary device and change the attribute of the second logical device from the secondary device to the primary device.

The virtual identifier can be generated on the basis of information relating to the whereabouts of the first logical device and information relating to the whereabouts of the second logical device.

The virtualization setting section is able to collect information relating to the logical devices of the respective storage control units and display a list of the respective logical devices on the screen such that the first logical device and the second logical device which constitute the virtual logical device are each designated by the user from among the respective logical devices displayed on the screen.

The remote copy setting section is able to set the other logical devices as either the remote copy destination device or the remote copy source device and generate the remote copy pair by setting the virtual logical device as either the remote copy source device or the remote copy destination device.

The other logical device may be constituted as a logical device which the other storage control unit comprises or as another virtual logical device which is formed by logical devices which a plurality of other storage control units other than the first storage control unit and the second storage control unit of the respective storage control units each comprise.

In cases where the pair is canceled, the remote copy setting section is able to continue the remote copy pair with either one logical device of the first logical device or the second logical device which constitute the virtual logical device and with the other logical device.

The remote copy setting section, (1) in cases where the pair is canceled, judges whether the remote copy pair can be continued between the logical device selected by the user of the first logical device or the second logical device which constitute the virtual logical device and the other logical device; (2) cancel the pair in cases where it is judged that the remote copy pair can be continued; and (3) warn the user in cases where it is judged that it is impossible to continue the remote copy pair.

The remote copy setting section is able to set either one of the first logical device and second logical device which constitute the virtual logical device, and the other logical device as a remote copy pair which is unrelated to the virtual logical device.

At least either one of the logical device of the first logical device and the second logical device can be generated by virtually including, within the storage control unit to which this one logical device belongs, a logical device which another storage control unit comprises.

Both the first logical device and the second logical device can be generated by virtually including a common logical device which another storage control unit other than the first storage control unit and the second storage control unit comprises in each of the first storage control unit and the second storage control unit.

The virtualization setting section is also able to hand over the virtual identifier to the first logical device or the second logical device in cases where the virtual logical device is deleted.

A storage system according to another aspect of the present invention is a storage system having a host computer, a plurality of storage control units which are utilized by the host computer, and a management device which is connected to the host computer and the respective storage control units, wherein the plurality of storage control units includes a first storage control unit, a second storage control unit, and a third storage control unit; the first storage control unit is connected to the host computer via a first access path which is set as a first communication path and the second storage control unit is connected to the host computer via a second access path which is set as the first communication path; the first storage control unit and/or the second storage control unit and the third storage control unit are connected via the second communication path; the host computer, the first storage control unit, the second storage control unit, and the third storage control unit are connected to the management device via a third communication path; (1) the respective storage control units comprise a first communication control unit for communicating with the host computer or the other storage control unit, a second communication control unit for communicating with a logical device constituted by one or a plurality of storage devices, and a memory unit that is utilized by the first communication control unit and the second communication control unit; (2) the management device comprises: (2-1) a virtualization setting section which, by setting a first logical device which belongs to a first storage control unit designated from among the respective storage control units and a second logical device which belongs to a second storage control unit designated from among the respective storage control units as a pair, virtualizes the first logical device and the second logical device as one virtual logical device and supplies the virtual logical device to the host computer, the virtualization setting section setting a virtual identifier that has been set for the virtual logical device for the first logical device and the second logical device; and (2-2) a remote copy setting section that sets a third logical device which belongs to the third storage control unit designated from among the respective storage control units and all or part of the virtual logical device as a remote copy pair; and (3) the host computer comprises an alternate path control unit for switching the first access path and the second access path.

A virtualization method according to another aspect of the present invention is a virtualization method for virtualizing logical devices which are distributed between a plurality of storage control units and supplying the virtualized logical devices to a host computer, comprising a step in which the management device collects information relating to the constitutions of the respective storage control units from the respective storage control units; a step in which the management device allows the user to designate, from among the different storage control units, a primary logical device and a secondary logical device which form a pair on the basis of the information relating to the constitutions of the respective storage control units; a step in which the management device generates first management information including information relating to the primary logical device and the secondary logical device and a virtual identifier; a step in which the management device transmits the first management information to either one storage control unit of the respective storage control units relating to the pair; a step in which the one storage unit sets the received first management information for itself and transmits the first management information to the other storage control unit among the respective storage control units relating to the pair so that the first management information is set for the other storage control unit; a step in which the respective storage control units relating to the pair match the stored content of the primary logical device and the stored content of the secondary logical device; a step in which the management device issues a request to identify logical devices to the host computer; a step in which the host computer acquires information relating to the logical devices which the respective storage control units each comprise in accordance with the request from the management device; a step in which the host computer detects the primary logical device and the secondary logical device for which the virtual identifier has been set among the respective logical devices thus acquired and identifies the primary logical device and the secondary logical device which comprise the same virtual identifier as one virtual logical device; a step in which, in cases where the stored content of the primary logical device constituting the virtual logical device has been changed, the stored content of the secondary logical device is also changed by the host computer; a step in which the management device allows the user to designate the remote copy source logical device and the remote copy destination logical device so that at least either one of the remote copy source logical device and the remote copy destination logical device which form a remote copy pair is the virtual logical device on the basis of the information relating to the constitutions of the respective storage control units; a step in which the management device generates second management information including information relating to the respective logical devices forming the remote copy pair; a step in which the management device transmits the second management information to either one storage control unit of the respective storage control units relating to the remote copy pair; a step in which the one storage control unit relating to the remote copy sets the second management information thus received for itself and transmits the second management information to the other storage control unit of the respective storage control units relating to the remote copy pair such that the second management information is set for the other storage control unit; a step in which the respective storage control units relating to the remote copy pair match the stored content of the remote copy source logical device and the stored content of the remote copy destination logical device; a step in which, in cases where the stored content of the remote copy source logical device has been changed, the stored content of the remote copy destination logical device is also changed by the host computer; a step in which, in cases where an instruction to cancel the pair constituting the virtual logical device has been issued, it is judged whether the remote copy pair can be maintained by using either logical device of the primary logical device and the secondary logical device; a step in which the pair is canceled in cases where it is judged that the remote copy pair can be maintained following the pair cancellation; and a step in which a warning is sent to the user in cases where it is judged that the remote copy pair cannot be maintained following the pair cancellation.

A virtualization method according to another aspect of the present invention is a virtualization method for virtualizing logical devices which are distributed between a plurality of storage control units and supplying the virtualized logical devices to a host computer, comprising the steps of allowing a user to designate a primary first logical device and a secondary second logical device from among different storage control units; setting a pair that is constituted by the first logical device and the second logical device; virtualizing the first logical device and the second logical device as one virtual logical device by setting a common virtual identifier for the first logical device and the second logical device and supplying the virtual logical device to the host computer; allowing the user to designate a remote copy source logical device and a remote copy destination logical device so that at least either one of the remote copy source logical device and the remote copy destination logical device is the virtual logical device; and setting a remote copy pair from the remote copy source logical device and the remote copy destination logical device.

All or some of the means, functions, and steps of the present invention can sometimes be constituted as a computer program that is executed by the computer system. In cases where all or part of the constitution of the present invention is constituted by a computer program, the computer program can also be distributed after being secured in various storage medium or can be transmitted via a communication network, for example.

BRIEF DESCRIPTION OF THE DRAWINGS

FIG. 9 is an explanatory diagram that shows a table for managing virtual volume management information;

FIG. 10 is an explanatory diagram of the structure of a virtual identifier;

FIG. 11 is an explanatory diagram that shows a table for managing remote copy management information;

FIG. 12 is an explanatory diagram that shows a table for managing virtual volumes;

FIG. 13 is an explanatory diagram that shows a table for managing external volumes;

FIG. 18 is an explanatory diagram that shows a screen for setting virtual volumes;

FIG. 19 is an explanatory diagram of a screen that shows an aspect in which the primary volume constituting the virtual volume is designated;

FIG. 20 is an explanatory diagram of a screen that shows an aspect in which the secondary volume constituting the virtual volume is designated;

FIG. 21 is an explanatory diagram of a screen that shows a state where the primary volume and secondary volume are designated;

FIG. 22 is an explanatory diagram of a screen that displays a list of virtual volumes;

FIG. 31 is an explanatory diagram of a screen that shows a state where a remote copy source volume and a remote copy destination volume are designated;

FIG. 32 is an explanatory diagram of a screen that displays a list of remote copy pairs;

FIG. 44 is an explanatory diagram of a screen which shows a state where the virtual volume to be deleted has been determined;

FIG. 45 is an explanatory diagram that shows a screen in which the virtual volume is deleted with the virtual identifier taken over by a volume in the virtual volume;

FIG. 46 is an explanatory diagram of a screen that shows a state where the virtual volume to be deleted has been determined.

DESCRIPTION OF THE SPECIFIC EMBODIMENTS

Figure 1:
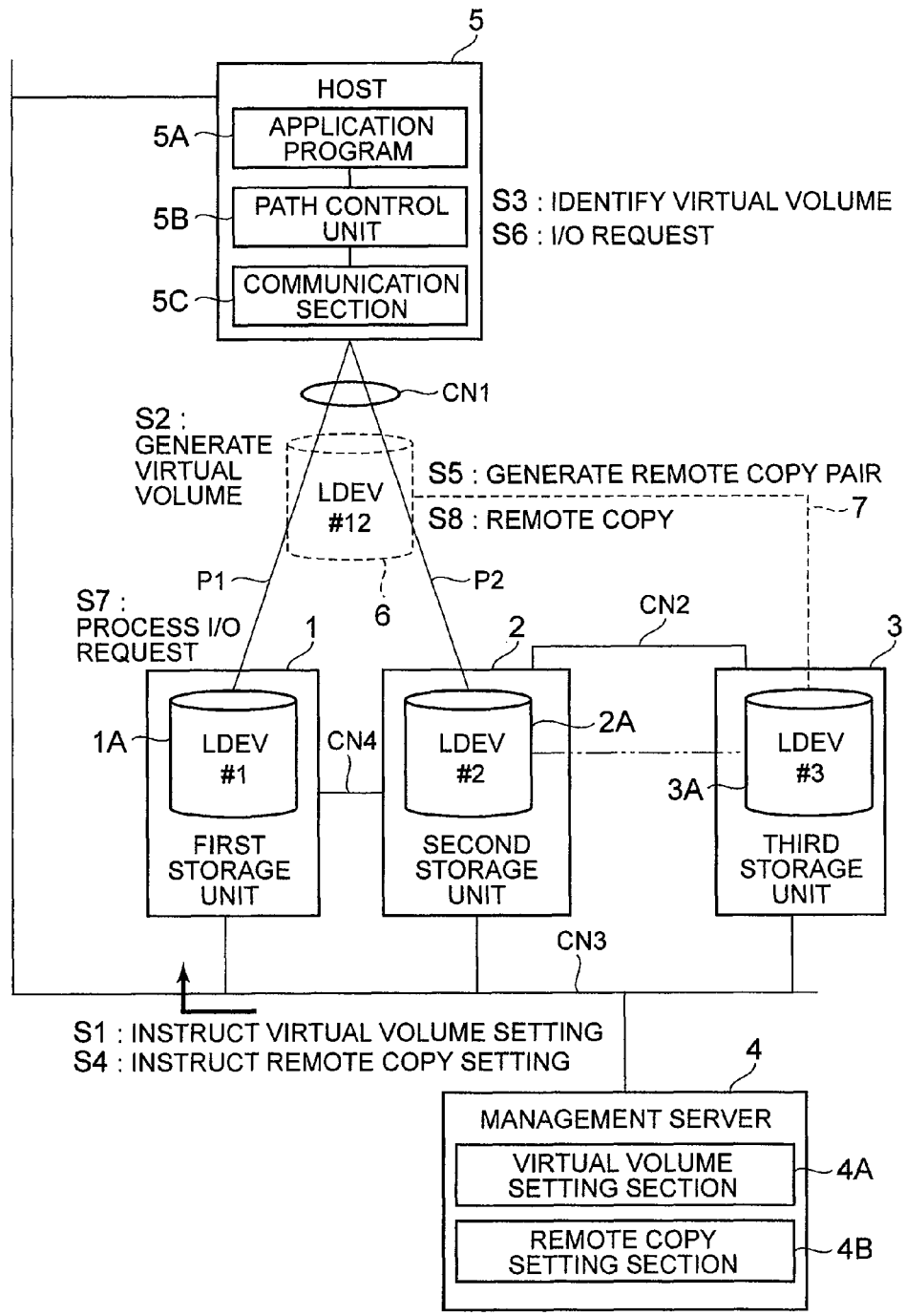
FIG. 1 is a conceptual view of an embodiment of the present invention.

FIG. 1 is an explanatory diagram of the constitution that provides an overview of an embodiment of the present invention. In this embodiment, as will be described subsequently, a constitution in which one virtual volume 6 is formed by logical volumes 1A and 2A in different storage units 1 and 2, a constitution in which the virtual volume 6 and another logical volume 3A are set as a remote copy pair, and a method of setting the virtual volume 6 and the remote copy setting method are each disclosed.

The storage system shown in FIG. 1 is constituted comprising, for example, storage units 1, 2, and 3 which are 'storage control apparatuses', a management server 4 constituting a 'management device', and a host 5 which constitutes a 'host computer'. The storage system generates the virtual volume 6 by virtualizing the logical volumes 1A and 2A which exist in the different storage units 1 and 2 and provides the host 5 with the virtual volume 6. The virtual volume 6 corresponds to the 'virtual logical device'.

The connection configuration will be described first. The storage units 1 and 2 are connected to the host 5 via a first communication network CN1 which constitutes a 'first communication path'. The storage unit 2 and storage unit 3 are connected via the second communication network CN2 which constitutes a 'second communication path'. The management server 4 is connected to the respective storage units 1 to 3 and the host 5 via a third communication network CN3 which constitutes a 'third communication path'. Furthermore, the storage unit 1 and storage unit 2 are mutually connected via a fourth communication path CN4. Although omitted from FIG. 1, the storage unit 3 may also be connected to the host 5 via the first communication network CN1.

Here, the communication networks CN1 and CN2 can be constituted using a FC_SAN (Fibre Channel_Storage Area Network) or an IP_SAN (Internet Protocol_SAN), for example. The third communication network CN2 can be constituted by using a LAN (Local Area Network) or a WAN (Wide Area Network), or the like, for example. The fourth communication path CN4 can be constituted by a fiber cable or metal cable which directly connects the storage units 1 and 2 and by the FC protocol, for example. The above connection configuration was only an example and the present invention is not limited thereto.

The respective storage units 1 to 3 are constituted as physically different devices each comprising logical volumes 1A to 3A which constitute 'logical devices'. The respective storage units 1 to 3 are able to comprise a plurality of storage devices, and the logical volumes constituting the logical devices are formed in the physical storage area which the storage devices comprise. The logical volumes 1A to 3A can be provided in a redundant physical storage area such as a RAID5 or RAID6 storage area, for example. In the following description, there are cases where 'logical volume' is abbreviated as 'volume'. In the drawings, the logical volumes which constitute the logical devices are displayed as 'LDEV'.

Devices that can be used as the storage devices include a variety of devices that are capable of reading and writing data such as, for example, hard disk devices, semiconductor memory devices, optical disk devices, magneto-optical disk devices, magnetic tape devices, and flexible disk devices.

In cases where hard disk devices are used as storage devices, for example, FC (Fibre Channel) disks, SCSI (Small Computer System Interface) disks, SATA disks, ATA (AT Attachment) disks, and SAS (Serial Attached SCSI) disks, or the like, can be employed.

In cases where semiconductor memory devices are employed as the storage devices, a variety of memory devices such as flash memory, FeRAM (Ferroelectric Random Access Memory), MRAM (Magnetoresistive Random Access Memory), Ovonic Unified Memory, and RRAM (Resistance RAM), for example, can be used. The types of storage devices are not limited to the aforementioned types. Rather, a variety of other storage devices which will be manufactured in the future will also serve as storage devices.

FIG. 1 expediently shows a case where the respective storage units 1 to 3 each comprise the respective real logical volumes 1A to 3A. Real logical volumes are volumes which are directly associated with a physical storage area of a storage device. As will become evident from subsequent embodiments, the respective storage units 1 to 3 need not necessarily comprise real logical volumes. Logical volumes which another storage unit which exists outside this apparatus comprises can also be included and used.

A technology according to which a logical volume which an external storage unit comprises is included in the apparatus itself and such a storage unit is visible to the host 5 as if same were its own real logical volume appears in Japanese Application Laid Open No. 2005-107645. The technology that appears in this publication can be adopted by this embodiment.

Therefore, each of the storage units 1 to 3 may also be constituted not comprising a hard disk drive or other storage device. In this case, the respective storage units 1 to 3 can be constituted as computer devices such as switch devices or virtualization devices, for example.

The management server 4 is a device for managing the constitution of the respective storage units 1 to 3 and for issuing instructions to the host 5. The management server 4 comprises a virtual volume setting section 4A and a remote copy setting section 4B in addition to the basic functions for managing the storage system. The details of the respective setting sections 4A and 4B will be provided subsequently but, to explain this in simple terms first, the virtual volume setting section 4A is a function for virtualizing the different logical volumes 1A and 2A which exist in the different storage units 1 and 2 as one virtual volume 6. The remote copy setting section 4B is a function for configuring a remote copy pair from all or part of the virtual volume 6 and the logical volume 3A in the other storage unit 3.

The host 5 is constituted as a computer device such as a mainframe computer, a server computer, or a personal computer, for example. In cases where the host 5 is a mainframe computer, a communication protocol such as FICON (Fibre Connection: registered trademark), ESCON (Enterprise System Connection: registered trademark), ACONARC (Advanced Connection Architecture: registered trademark), FIBARC (Fibre Connection Architecture: registered trademark), for example, is used. In cases where the host 5 is a server computer or personal computer or the like, for example, a communication protocol such as TCP/IP (Transmission Control Protocol/Internet Protocol), FCP (Fibre Channel Protocol), iSCSI (internet Small Computer System Interface), for example, is used.

The host 5 comprises an application program (sometimes abbreviated as 'application' hereinbelow) 5A, a path control unit 5B which constitutes an 'alternate path control unit', and a communication section 5C, for example. The hardware constitution of the storage units 1 to 3, management server 4, and host 5 will be described in detail in the subsequent embodiments. The application program 5A is one or a plurality of software products for executing the various tasks of electronic mail management software, customer management software, or document creation software, for example.

The path control unit 5B is software that is employed to switch the access path used by the host 5 (sometimes abbreviated as 'path' hereinbelow). The host 5 is able to obtain the identifiers, unit numbers, LU numbers, and path information and so forth of the various logical volumes 1A and 2A provided in the respective storage units 1 and 2 by transmitting ENQ commands such as an Inquiry command, for example, to the respective storage units 1 and 2. The path control unit 5B identifies the plurality of paths as alternate paths in cases where a plurality of paths with the same identifier are detected. That is, in cases where a plurality of paths for accessing the same logical volume are detected, one path is identified as a primary path which is used normally (also called the 'active path') and the other path is identified as a secondary path which is used abnormally (also referred to as the 'passive path').

The virtual volume 6 is constituted by virtualizing the logical volumes 1A and 2A in the different storage units 1 and 2. The respective logical volumes 1A and 2A which constitute the virtual volume 6 can be called 'constitutional element volumes', for example.

One logical volume 1A is set as the primary volume in the virtual volume 6 and the other logical volume 2A is set as the secondary volume in the virtual volume 6. However, as will be clear from the subsequent embodiments, the one and the other logical volumes are changed in their role between the primary volume and secondary volume according to requirements. That is, in cases where an access fault occurs with the logical volume 1A, the attribute of the logical volume 2A is changed from 'secondary' to 'primary'.

The primary volume is the volume which is normally accessed by the host 5 and the secondary volume is a volume which is accessed by the host 5 when a fault occurs. The primary volume can also be called the active volume and the secondary volume can be called the passive volume instead. In cases where the primary volume and secondary volume which constitute the virtual volume 6 form a copy pair, the primary volume can be called the copy source volume and the secondary volume can be called the copy destination volume.

A virtual identifier for uniquely specifying the virtual volume 6 in the storage system is created for the virtual volume 6. In the example shown in FIG. 1, '#12' is used as the virtual identifier. The virtual identifier is generated on the basis of the original identifiers of the respective logical volumes 1A and 2A which constitute the virtual volume 6, for example. In the example shown in FIG. 1, the original identifier of one logical volume 1A is '#1' and the original identifier of the other logical volume 2A is '#2'. Therefore, in this embodiment, the virtual identifier '#12' is obtained by combining the identifier '#1' of the one logical volume 1A and the identifier '#2' of the other logical volume 2A.

That is, the virtual identifier is generated so as to not overlap the identifier of the other logical volumes that exist in the storage system. In cases where the identifiers of the existing logical volumes 1A to 3A and then of the logical volumes which have the possibility of being set in the respective storage units 1 to 3 are called local identifiers, the virtual identifier is created so as to not overlap any of these local identifiers.

In cases where the virtual volume 6 is set, the respective storage units 1 and 2 set the virtual identifier for the logical volumes 1A and 2A which constitute the virtual volume 6. The storage unit 1 sets the virtual identifier '#12' as the identifier of the logical volume 1A. The storage unit 2 also sets the virtual identifier '#12' as the identifier of the logical volume 2A.

That is, the virtual identifier is set as a priority with respect to the original identifiers of the respective logical volumes 1A and 2A which constitute the virtual volume 6. In response to an inquiry from the host 5, the storage unit 1 sends back a virtual identifier as the identifier of the logical volume 1A and the storage unit 2 sends back a virtual identifier as the identifier of the logical volume 2A. Hence, the path control unit 5B identifies the logical volume 1A and logical volume 2A as the same volume (virtual volume 6).

The local identifiers '#1' and '#2' that have been set for the respective logical volumes 1A and 2A are internal identification information which is used to manage the logical volumes 1A and 2A in the respective storage units 1 and 2. In contrast, the virtual identifier is external identification information for identifying the virtual volume 6 to the host 5.

The first access path P1 for accessing the logical volume 1A and the second access path P2 for accessing the logical volume 2A are identified by the path control unit 5B as paths for accessing the virtual volume 6. In this embodiment, the first access path P1 will be described as the primary path and the second access path P2 will be described as the secondary path.

The operation of this storage system will now be described. Initially, the user uses the virtual volume setting section 4A to designate the respective logical volumes 1A and 2A which constitute the virtual volume 6. The virtual volume setting section 4A generates first management information for setting the virtual volume 6 and the first management information is transmitted to either of the storage unit 1 or storage unit 2 (S1).

The first management information is information that is required to set the virtual volume 6 in the storage system and can also be referred to as virtual volume setting information. The first management information includes, for example, a virtual identifier and information specifying the copy source volume (primary volume or active volume) and the copy destination volume (secondary volume or passive volume) which constitute the virtual volume 6. The information for specifying the respective logical volumes includes information for specifying the storage unit in which the logical volume exists (the unit number), the identifier of the logical volume in the storage unit (the local identifier), and attribute information distinguishing the logical volume as the copy source volume or the copy destination volume.

A case where the storage unit 1 receives the first management information from the management server 4 will now be described. The storage unit 1 sets the virtual identifier for the logical volume 1A on the basis of the first management information and sets the attribute of the logical volume 1A as the 'primary (or active)' volume. The storage unit 1 also transmits the first management information to the storage unit 2 which comprises the 'secondary (or passive)' logical volume 2A on the basis of the first management information.

The fourth communication path CN4 can be used in the transfer of the first management information from the storage unit 1 to the storage unit 2. In cases where the storage units 1 and 2 are able to communicate in both directions via the first communication network CN1 or third communication network CN3, the storage unit 1 is also able to transmit the first management information to the storage unit 2 by using either the first communication network CN1 or the third communication network CN3.

Upon receipt of the first management information from the storage unit 1, the storage unit 2 sets a virtual identifier for the logical volume 2A in the same way as the storage unit 1 did and sets the attribute of the logical volume 2A as 'secondary'.

By setting the first management information for the respective storage units 1 and 2, one virtual volume 6 is generated from a plurality of logical volumes 1A and 2A which comprise a common virtual identifier (S2).

The management server 4 issues a device identification request to the host 5. The device identification request is a request which causes the host 5 to confirm the whereabouts and states of all of the logical volumes which can be used by the host 5. The host 5 issues an Inquiry command to the respective storage units 1 and 2 in accordance with the device identification request. The host 5 requests information for all the logical volumes which the storage units 1 and 2 each comprise.

The respective storage units 1 and 2 send back a predetermined response to the host 5 in accordance with the Inquiry command from the host 5. Predetermined responses include, for example, an LU (Logical Unit) number which is set for the logical volume, the unit number of the storage unit in which the logical volume exists, the identifier set for the logical volume, the attribute of the path for accessing the logical volume (either the primary path (active path) or secondary path (passive path)). The path attribute determines the initial attribute of the logical volume. That is, the logical volume which has the attribute of the primary path is the primary volume and is the volume which is normally employed. The logical volume which has the attribute of the secondary path is the secondary volume and is the volume which is used when a fault occurs.

The path control unit 5B of the host 5 analyzes the predetermined responses received from the respective storage units 1 and 2 and detects the logical volumes 1A and 2A which have the same identifier (virtual identifier). The logical volumes 1A and 2A for which the same virtual identifier is set are identified as the same volume and the path control unit 5B judges that it is possible to switch the access path to the logical volume 1A and the access path to the logical volume 2A.

In this embodiment, because the access path to the logical volume 1A is set as the primary path, the path control unit 5B normally accesses the logical volume 1A. When the stored content of the logical volume 1A is changed by the application program 5A, this change is also reflected in the logical volume 2A. That is, the data update which is carried out by the logical volume 1A is also similarly executed by the logical volume 2A. This is because, in the example shown in FIG. 1, the logical volume 1A and logical volume 2A which constitute the virtual volume 6 form the copy pair.

Figure 6:
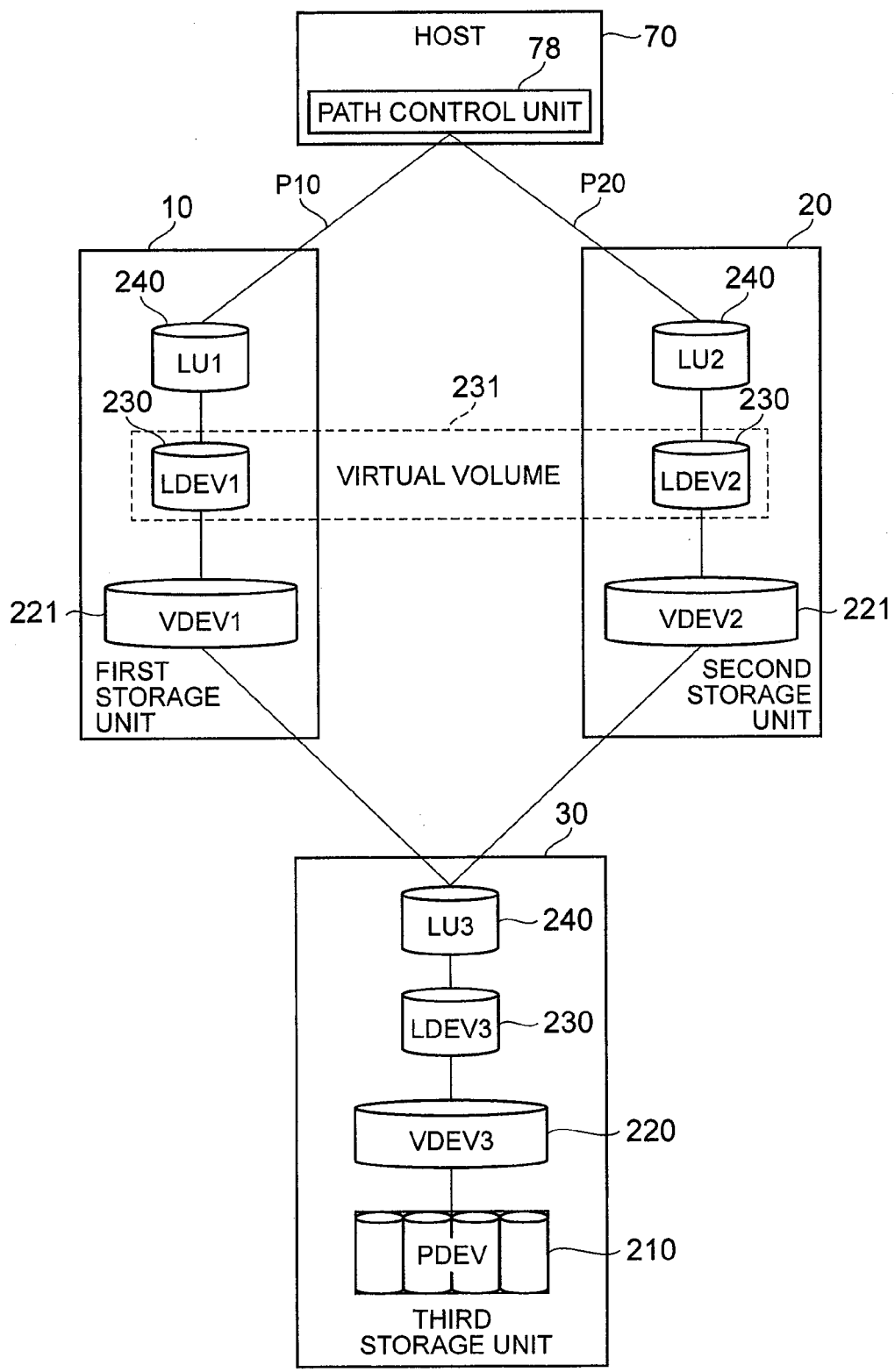
FIG. 6 is an explanatory diagram of another constitutional example of a virtual volume.

As shown in FIG. 6 (described subsequently), in cases where one virtual volume which is provided by different storage units is ultimately connected to the same logical volume, there is no need for the respective logical volumes which constitute the virtual volume to form a copy pair. That is, although the respective logical volumes which constitute the virtual volume form a pair, the need for the pair to be a copy pair depends on the constitution of the storage system.

In cases where a fault of some kind occurs in accessing the logical volume 1A, the path control unit 5B accesses the logical volume 2A by switching from the primary path to the secondary path. The application program 5A reads data from the logical volume 2A without being aware of the path switching and writes data to the logical volume 2A. The logical volume 2A holds the stored content which is the same as that of the logical volume 1A and, therefore, the application program 5A is able to continue processing without any problem and without being aware of the volume switching (S3).

The remote copy setting will be described next. In this embodiment, the remote copy destination storage unit is assumed to be the storage unit 3. The storage unit 3 may be installed at the same site as that of the storage units 1 and 2 or may be installed at a different site from the storage units 1 and 2. From the perspective of disaster recovery, the storage units 1 and 2 and the storage unit 3 are preferably installed physically separate from one another.

The user designates the remote copy source volume and the remote copy destination volume. Here, the remote copy source volume is the virtual volume 6 and the remote copy destination volume is the logical volume 3A in the storage unit 3.

The remote copy setting section 4B generates second management information which is required to set the designated volumes 6 and 3A as the remote copy pair. The second management information can also be called remote copy setting information. The second management information includes information for specifying the remote copy source volume and information for specifying the remote copy destination volume. Information for specifying the remote copy source volume or remote copy destination volume includes a unit number which specifies the storage unit in which the volume exists, the number of the logical volume, an attribute which distinguishes the logical volume as the remote copy source volume or the remote copy destination volume, and an attribute which indicates whether the logical volume is the virtual volume 6.

The remote copy setting section 4B transmits the second management information to either storage unit of the respective storage units 1 and 2 which provide the virtual volume 6 that constitutes the remote copy source volume (S4).

The storage unit 1 transmits second management information to the storage unit 2 after setting the second management information for the storage unit 1. The storage unit 2 sets the second management information for the storage unit 2 as per storage unit 1. As a result, settings are made so that the virtual volume 6 which is provided by the storage units 1 and 2 functions as the remote copy source volume.

Upon completion of the remote copy settings for the virtual volume 6, the storage unit 1 transmits the second management information to the remote copy destination storage unit 3. The storage unit 1 transmits the second management information to the storage unit 3 via either the first communication network CN1 or the third communication network CN3, for example. The storage unit 3 sets the logical volume 3A as the remote copy destination volume.

As a result of setting the virtual volume 6 as the remote copy source volume and of setting the logical volume 3A as the remote copy destination volume, the remote copy pair is formed (S5).

In cases where the application program 5A writes data to the virtual volume 6, the path control unit 5B uses the first access path P1 to issue a write command to the logical volume 1A (S6).

The storage unit 1 writes write data received by the host 5 to the logical volume 1A. In addition, the storage unit 1 transmits write data to the logical volume 2A which constitutes the virtual volume 6 together with the logical volume 1A. The storage unit 2 writes write data received from the storage unit 1 to the logical volume 2A. Thus, the respective storage units 1 and 2 which provide the virtual volume 6 process the write command by writing write data to the logical volumes 1A and 2A respectively (S7).

Thereafter, the storage unit 1 confirms that the virtual volume 6 is the remote copy source volume and transmits the write data written to the logical volume 1A to the remote copy destination logical volume 3A. The storage unit 3 writes write data received from the storage unit 1 to the logical volume 3A. As a result, remote copying from the virtual volume 6 to the logical volume 3A is complete (S8).

This embodiment which is constituted thus affords the following effects. In this embodiment, the management server 4 is able to generate the virtual volume 6 in the storage system simply by transmitting the first management information required to set the virtual volume 6 to either storage unit 1 or storage unit 2 which together provide the virtual volume 6. That is, the user does not need to issue an instruction to set the virtual volume 6 to both the storage unit 1 and storage unit 2. Hence, user convenience improves with this embodiment.

In this embodiment, the management server 4 is able to set a remote copy in the storage system simply by transmitting the second management information which is required to set the remote copy to either the storage unit 1 or storage unit 2 which are charged with the virtual volume 6 which is the remote copy source volume. That is, the user need not issue an instruction individually to the storage unit 1, storage unit 2, and storage unit 3 and the remote copy pair can be generated by means of a single instruction. User convenience therefore improves.

In addition, as will become clear from the subsequent embodiments, in cases where the virtual volume 6 is cancelled, the management server 4 is able to hand over the virtual identifier to either the logical volume 1A or logical volume 2A. Therefore, the constitution of the virtual volume 6 can be changed without the host 5 being aware of the change.

Furthermore, as will become clear from the subsequent embodiments, in cases where the virtual volume is to be cancelled, the management server 4 investigates the handling of the remote copy that was set for the virtual volume 6 and judges the merits of canceling the virtual volume 6. Cancellation of the virtual volume 6 means that the virtual volume 6 is annihilated by canceling the virtual volume 6 which comprises the logical volume 1A and the logical volume 2A and restoring the logical volume 1A and logical volume 2A to normal volumes. In the subsequently described embodiment, the cancellation of the virtual volume will sometimes be referred to as virtual volume deletion. This embodiment will be described in detail hereinbelow.

First Embodiment

Figure 2:
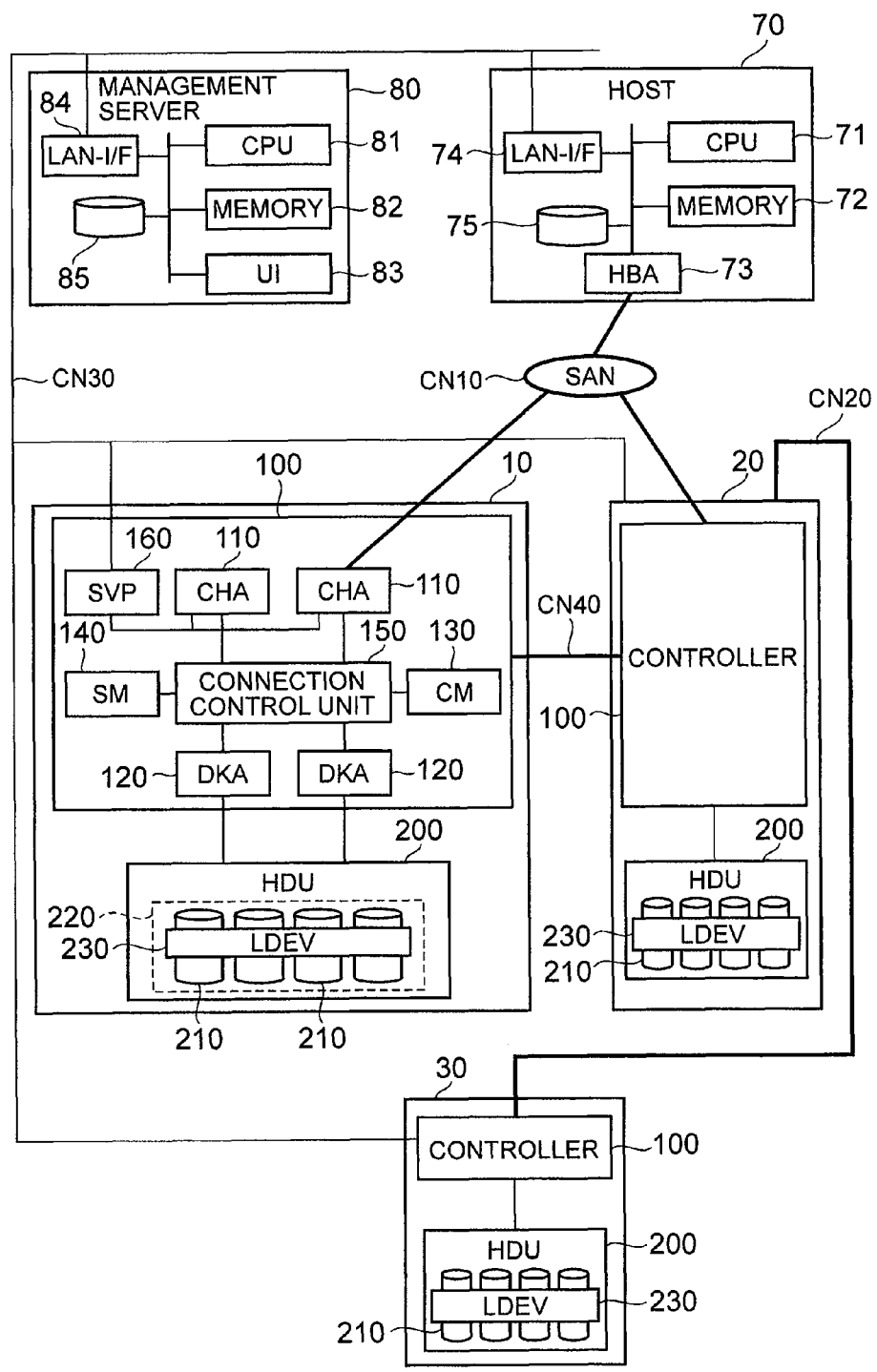
FIG. 2 is a hardware constitutional view of the storage system according to the embodiment of the present invention.

FIG. 2 is an explanatory diagram that provides an overview of the storage system of the embodiment. If we first explain the relationship with FIG. 1, the storage units 10, 20, and 30 in FIG. 2 correspond to the storage units 1, 2, and 3 respectively in FIG. 1. The host 70 in FIG. 2 corresponds to the host 5 in FIG. 1, and the management server 80 in FIG. 2 corresponds to the management server 4 in FIG. 1. The virtual volume 231 shown in FIG. 5 corresponds to the virtual volume 6 in FIG. 1. The logical volume 230 shown in FIG. 4 corresponds to the logical volumes 1A, 2A, and 3A in FIG. 1. The first communication network CN10 in FIG. 2 corresponds to the first communication network CN1 in FIG. 1, and the second communication network CN20 in FIG. 2 corresponds to the second communication network CN2 in FIG. 1. The third communication network CN30 in FIG. 2 corresponds to the third communication network CN3 in FIG. 1 and the fourth communication path CN40 in FIG. 2 corresponds to the fourth communication path CN4 in FIG. 1. The parts which overlap with the description for FIG. 1 will be described simply.

The storage system comprises a plurality of storage units 10, 20, and 30, a host 70, and a management server 80. The storage units 10 and 20 and host 70 are connected via a communication network CN10. The storage unit 20 and storage unit 30 are connected via the communication network CN20. The management server 80 is connected to the respective storage units 10 to 30 and the host 70 via the communication network CN30. The storage units 10 and 20 can be connected via the communication path CN40.

The communication network CN10 which connects the host 70 and the respective storage units 10 and 20 and the communication network CN20 which is used for an external connection are constituted by separate communication networks, whereby the effect of communication using an external connection on the communication between the host 70 and storage units 10 and 20 can be reduced. However, the constitution is not limited to this constitution. Rather, the communication networks CN10 and CN20 may also be constituted as the same communication network. Further, the constitution may also be such that the management network CN30 is abolished and management information is distributed using communication network CN10.

The constitution of the storage system is not limited to that shown in FIG. 2; other modified forms exist. Other embodiments will be described subsequently in conjunction with FIGS. 5 to 8. The constitution shown in FIG. 2 represents an example in which the storage unit 20 is the connection source of an external connection and the storage unit 30 is the connection destination of the external connection. As mentioned earlier, an external connection is a technique whereby a logical volume that exists outside the unit itself is included in the unit. The storage unit 20 constituting the connection source of the external connection is able to utilize the logical volume 230 in the storage unit 30 and, therefore, there is no need to provide the logical volume 230 in the storage unit 20.

The constitution of the storage units 10 to 30 will now be described. The respective storage units 10 to 30 may also have the same constitution. Therefore, storage unit 10 will be described by way of an example. The storage unit 10 shown in FIG. 2 is not connected externally to another storage unit but the storage unit 10 is able to include inside itself a logical volume in another storage unit by using an external connection. A constitution which corresponds with the external connection will also be described in the following description.

The storage unit 10 comprises, for example, a controller 100 and a storage device mount section (also called a 'HDU' hereinbelow) 200. The controller 100 controls the operation of the storage unit 10. The controller 100 comprises, for example, a channel adapter ('CHA' hereinbelow) 110, a disk adapter ('DKA' hereinbelow) 120, a cache memory ('CM' in FIG. 2) 130, a shared memory ('SM' in FIG. 2) 140, a connection control unit 150, and a service processor (SVP) 160.

Figure 4:
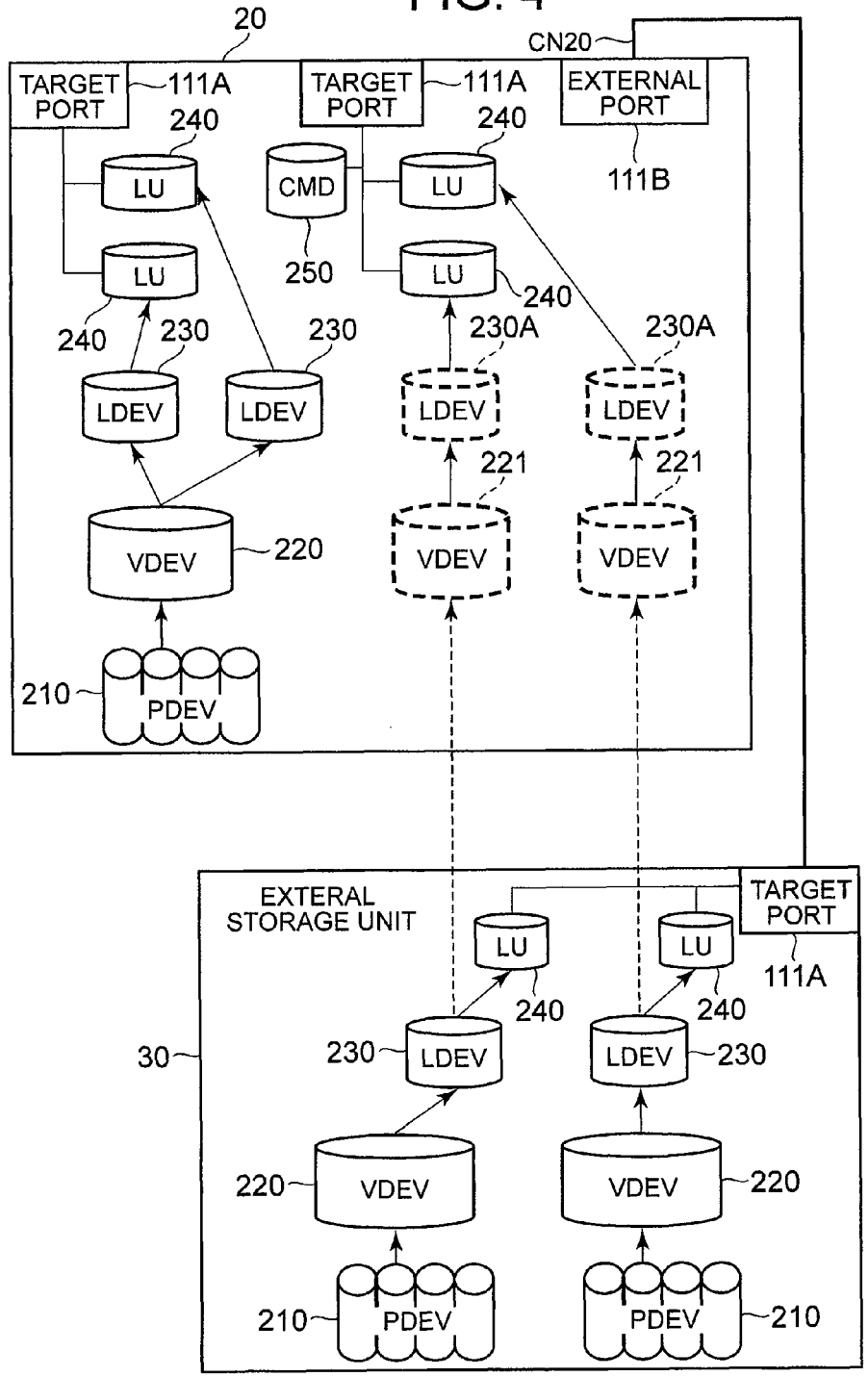
FIG. 4 is an explanatory diagram of a storage hierarchical structure of a storage unit.

The CHA 110 constituting the 'first communication control unit' performs data communications with the host 70 or the other storage units. The respective CHA 110 comprise at least one or more communication ports 111 (reference numeral 111 is used as a generic term for 111A and 111B) as shown in FIG. 4. The respective CHA 110 are constituted as microcomputer systems that comprise a CPU and a memory and so forth. The respective CHA 110 analyze and execute various commands such as read commands and write commands which are received from the host 70.

The respective CHA 110 are assigned network addresses which identify same (IP addresses or WWN (World Wide Names) or the like, for example). The CHA 110 are each able to act individually as NAS (Network Attached Storage). In cases where a plurality of hosts 70 exist, the respective CHA 110 individually accept and process requests from the respective hosts 70.

The DKA 120 which constitute 'second communication control units' exchange data with the disk drives 210 which the HDU 200 comprises. As per the CHA 110, the respective DKA 120 are constituted as microcomputer systems which comprise a CPU and a memory and so forth. The respective DKA 120 write data which the CHA 110 receives from the host 70 and data which are read from the other storage units, for example, to a predetermined disk drive 210. Further, the respective DKA 120 are also able to read data from a predetermined disk drive 210 and transmit same to the host 70 or an external storage unit. In cases where data are input or output to and from a disk drive 210, the respective DKA 120 convert the logical address to a physical address.

In cases where the disk drives 210 are managed under RAID, the respective DKA 120 perform data access which corresponds with the given RAID configuration. For example, the respective DKA 120 write the same data to different disk drive groups (RAID groups) (RAID1) or execute parity computation and write the data and parity to the disk drive group (RAID5, RAID6, or the like).

The cache memory 130 stores the data received from the host 70 or external storage unit. Furthermore, the cache memory 130 store data which are read from the disk drive 210. As will be described subsequently, a virtual intermediate storage device is constructed by utilizing the storage space of the cache memory 130.

The shared memory (also sometimes called the 'control memory') 140 stores various control information and so forth which are to be used in the operation of the storage unit 10. Further, the shared memory 140 also stores various tables (described subsequently) in addition to the creation of a work area.

Any one or a plurality of the disk drives 210 may also be used as a cache disk. Furthermore, the cache memory 130 and shared memory 140 can also be constituted as different memory units or a portion of the storage areas of the same memory can be employed as the cache area, while the other storage areas can be used as the control area.

The connection control unit 150 mutually connects the respective CHA 110, the respective DKA 120, the cache memory 130, and the shared memory 140. The connection control unit 150 can be constituted as a crossbar switch, or the like, for example.

The HDU 200 comprises a plurality of disk drives 210. As disk drives 210, for example, various storage devices such as, for example, hard disk drives, flexible disk drives, magnetic tape drives, semiconductor memory drives, optical disk drives, and so forth, as well as any equivalents thereof, can be used.

For example, a RAID group 220 can be constituted by integrating the physical storage areas of a plurality of disk drives 210. At least one or more logical volumes 230 of a fixed size or a variable size can be provided in the physical storage areas of the RAID group 220.

An SVP 160 is connected to the respective CHA 110 via an internal network such as a LAN. The SVP 160 can also exchange data with the shared memory 140 or DKA 120 via the CHA 110. The SVP 160 collects various information in the storage unit 10 and supplies same to the management server 80.

The other storage units 20 and 30 can also be constituted in the same way as the storage unit 10. However, the constitutions of the storage units 10 to 30 may also be different. The present invention can be applied even when the models, vendors, and types of the respective storage units 10 to 30 are different, for example.

The hardware constitution of the host 70 will now be described. The host 70 is constituted comprising a CPU 71, a memory 72, a HBA (Host Bus Adapter) 73, a LAN interface 74, and an internal disk 75, for example. Although only one host 70 is shown in FIG. 2, a plurality of hosts 70 can actually be provided.

The HBA 73 is a communication section for accessing the storage units 10 and 20 via communication network CN10 and corresponds to the communication section 5C in FIG. 1. The LAN interface 74 is a communication section for communicating with the management server 80 (or the management server 80 and respective storage units 10 to 30) via the management communication network CN30.

The constitution of the management server 80 will now be described. The management server 80 is a computer device for managing the constitution and so forth of the storage system and is operated by a user such as the system administrator or maintenance staff, for example. The management server 80 is constituted comprising, a CPU 81, a memory 82, a user interface ('UI' in FIG. 2) 83, a LAN interface 84, and an internal disk 85, for example. The LAN interface 84 communicates with the respective storage units 10 to 30 and the host 70 via the management communication network CN30.

The user interface 83 provides the user with a management screen (described subsequently) and accepts designations from the user. The user interface 83 is constituted by a display device, a keyboard switch, a pointing device, or the like, for example. A constitution that allows various designations to be made by means of a speech input, for example, is also possible.

Figure 3:
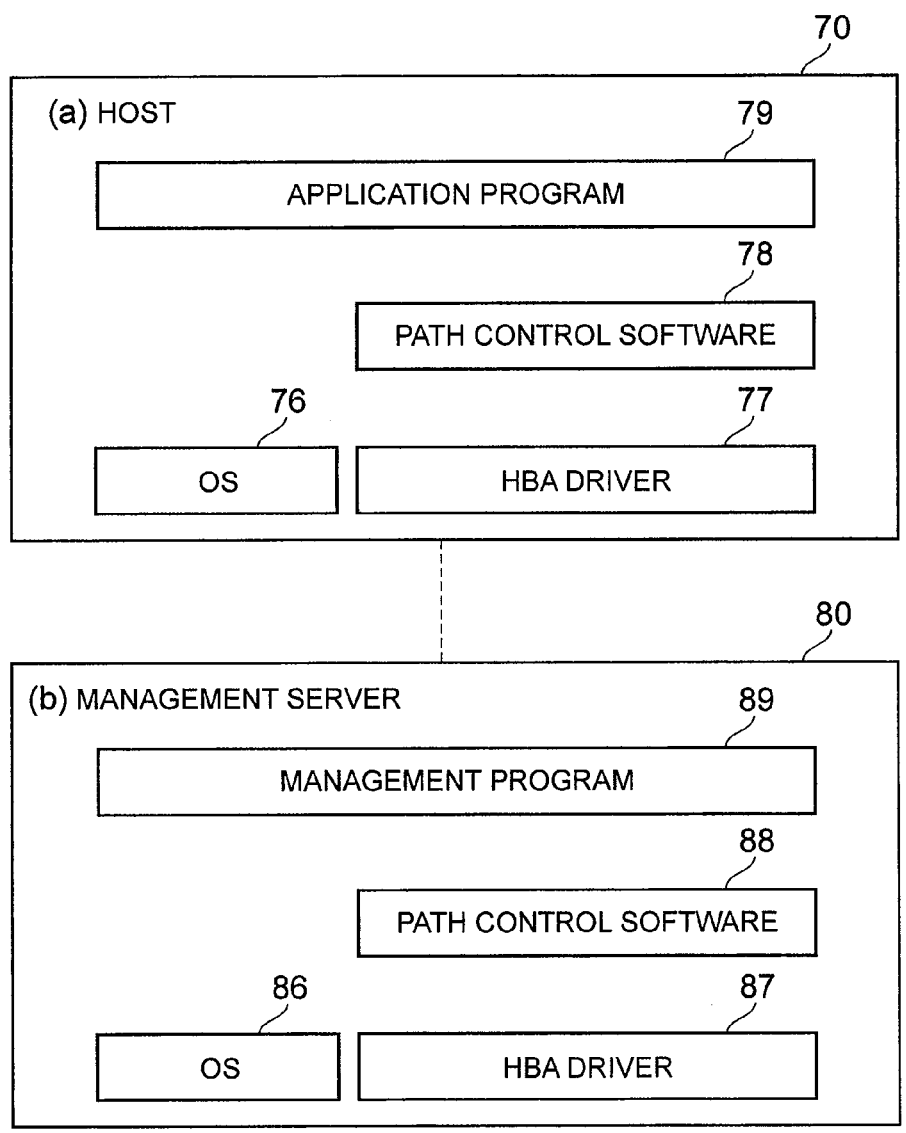
FIG. 3 is an explanatory diagram which schematically shows the software constitution of a host and a management server.

FIG. 3 is an explanatory diagram that shows the software constitution of the host 70 and management server 80. As shown in FIG. 3A, the host 70 comprises, for example, an operating system 76, a HBA driver 77, path control software 78, and an application program 79.

The HBA driver 77 is software for controlling the HBA 73. The path control software 78 corresponds to the path control unit 5B in FIG. 1. The path control software 78 determines which access path is to be used for access in accordance an access request from the application program 79. In cases where a plurality of access paths linked to the access destination volume exist, the path control software 78 switches the access path that has been set as the primary path and the path that has been set as the secondary path. In the following description, the path control software 78 is sometimes referred to as the path control unit 78. The application program 79 is software that corresponds to the application program 5A in FIG. 1.

As shown in FIG. 3B, the management server 80 comprises, substantially like the host 70, an operating system 86, an HBA driver 87, path control software 88, and a management program 89. The management program 89 implements a function to issue an instruction to the storage unit to set the virtual volume 231 and a function to issue an instruction to the storage unit to set a remote copy between the virtual volume 231 and another logical volume 230. The management program 89 is software that corresponds to the virtual volume setting section 4A and the remote copy setting section 4B in FIG. 1.

FIG. 4 is an explanatory diagram that shows the storage structure of the storage system. FIG. 4 shows a constitution pertaining to the above-mentioned external connection.

The storage structure of the storage unit 20 can be broadly classified into a physical storage hierarchy and a logical storage hierarchy, for example. The physical storage hierarchy is constituted by PDEV (Physical Devices) 210 which are physical disks. The PDEV correspond to the disk drives 210.

The logical storage hierarchy can be constituted by a plurality of hierarchies (of two types, for example). One logical hierarchy can be constituted by any one of a VDEV (Virtual Device) 220 or a virtual VDEV 221 which is treated as a VDEV 220. The other logical hierarchy can be constituted by a LDEV (Logical Device) 230.

The VDEV 220 is constituted by grouping a predetermined number of PDEV 210 such as one set of four (3D+1P) and one set of eight (7D+1P), for example. One RAID storage area is formed by collecting the storage areas provided by the respective PDEV 210 that belong to the group. The RAID storage area is the VDEV 220.

In contrast to the construction of the VDEV 220 on the physical storage area, the VDEV 221 is a virtual intermediate storage device which does not directly require a physical storage area. The VDEV 221 is not directly associated with a physical storage area and constitutes a tray for mapping the LU (Logical Unit) of the external storage unit 30. Here, because the storage unit 30 of the connection destination exists outside the storage unit 20 from the perspective of the storage unit 20 which is the connection source, storage unit 30 is known as the external storage unit 30.

At least one or more LDEV 230 can be provided in the VDEV 220 or VDEV 221. The LDEV 230 is the logical volume 230 mentioned earlier. The LDEV 230 is constituted by dividing the VDEV 220 into parts of variable size or a fixed size, for example.

In the case of an open-system host, by mapping the LDEV 230 with LU 240, the host 70 identifies the LDEV 230 as one physical disk. By designating the LUN (Logical Unit Number) and logical block address, the open-system host accesses the desired LDEV 230. In cases where the host 70 is a mainframe-system host, the LDEV 230 is identified directly.

The LU 240 is a device that can be identified as a SCSI logical unit. The respective LU 240 are connected to the host 70 via a target port 111A. At least one or more LDEV 230 can be associated with the respective LU 240. By associating a plurality of LDEV 230 with one LU 240, the LU size can also be virtually expanded.

The CMD (Command Device) 250 is a dedicated LU which is used to transfer commands and statuses between the host 70 and storage unit 20. Commands from the host 70 are written to the CMD 250. The storage unit 20 executes processing which corresponds with the commands written to the CMD 250 and writes the execution result to the CMD 250 as the status. The host 70 reads and confirms the status written to the CMD 250 and writes the processing content which is to be executed next to the CMD 250. Thus, the host 70 is able to send various instructions to the storage unit 20 via the CMD 250.

Instead of storing the commands received from the host 70 in the CMD 250, the storage unit 20 is also able to process these commands directly. In addition, instead of defining the device (LU) of an entity, the constitution may also be such that the CMD is generated as a virtual device and commands from the host 70 are received and processed. For example, the CHA 110 writes commands which are received from the host 70 to the shared memory 140 and the CHA 110 and DKA 120 process the commands stored in the shared memory 140. The processing result is written to the shared memory 140 and transmitted from the CHA 110 to the host 70.

The external storage unit 30 is connected to the initiator port (external port) 111B of the storage unit 20 via the communication network CN20. The communication port 111B is a communication port for an external connection.

The external storage unit 30 comprises a plurality of PDEV 210, VDEV 220 which are set in the storage areas provided by the PDEV 210 and at least one or more LDEV 230 which can be set in the VDEV 220. The respective LDEV 230 are associated with the LU 240.

The LU 240 of the external storage unit 30 are mapped with the VDEV 221. As indicated by the thick dotted lines at the top of FIG. 4, the LDEV 230A which are provided in the virtual VDEV 221 in the storage unit 20 are supplied to the host 70 via the LU 240.

When the host 70 issues write commands and read commands to the LDEV 230A, the commands are converted into commands which are issued to the external storage unit 30 and transmitted by the storage unit 20 to the external storage unit 30. The external storage unit 30 performs processing in accordance with the commands received from the storage unit 20 and transmits the processing result to the storage unit 20. The storage unit 20 then transmits the processing result received from the external storage unit 30 to the host 70.

FIG. 4 illustrates, by way of an example, a case where the storage unit 20 acquires the logical volumes 230 in the storage unit 30 but a case where the storage unit 10 acquires the logical volumes 230 in the storage unit 30 is similar.

Figure 5:
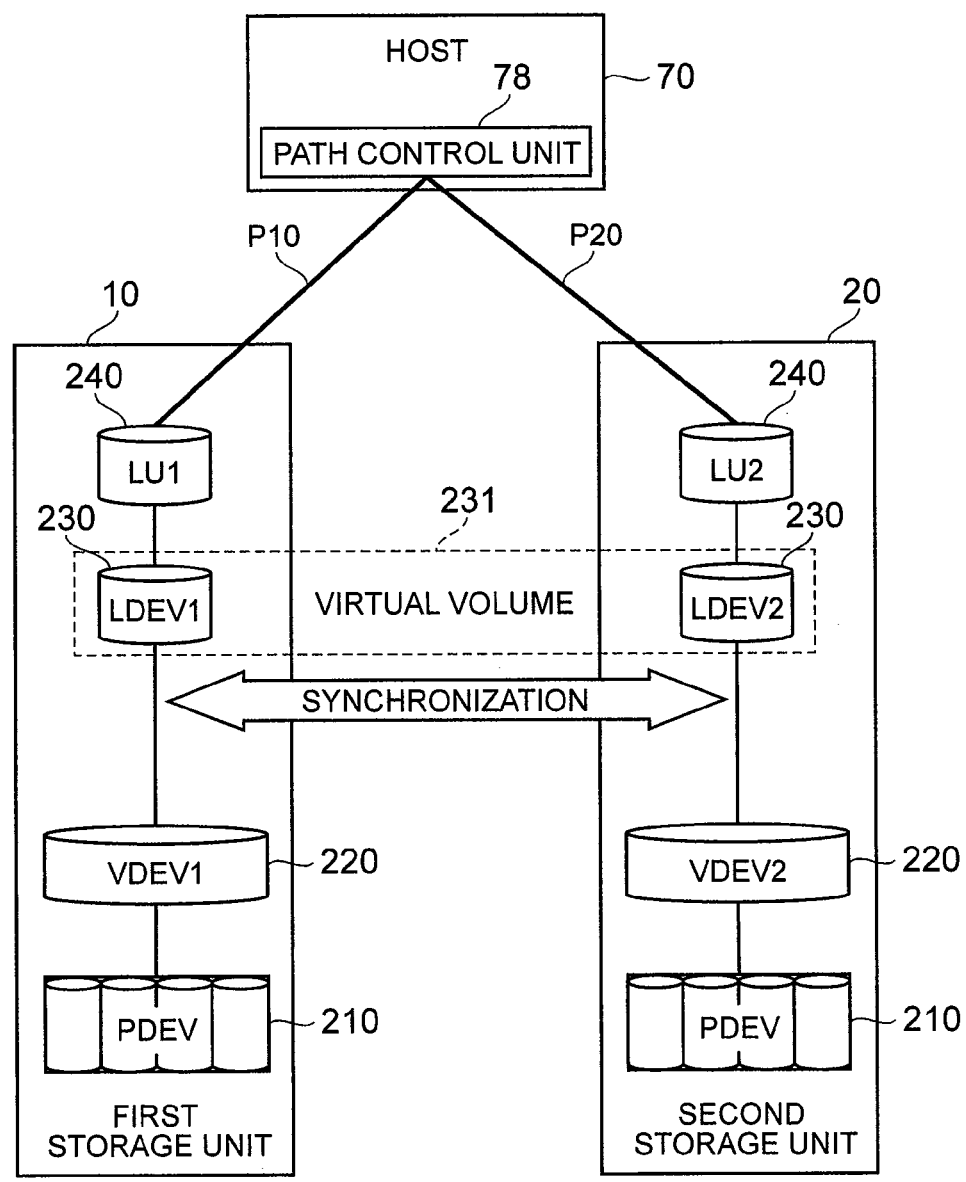
FIG. 5 is an explanatory diagram of a constitutional example of a virtual volume.

FIGS. 5 to 8 show modified examples of the constitution of the storage system. FIG. 2 shows a case where the storage unit 20 is the connection source storage unit of the external connection. FIG. 5 shows a case where neither of the respective storage units 10 and 20 which provide virtual volumes 231 uses an external connection. That is, the respective storage units 10 and 20 each comprise real volumes 230 (LDEV1 and LDEV2 in FIG. 5). The virtual volume 231 is formed by forming a copy pair from the respective real volumes 230.

The path control unit 78 uses either the access path P10 or the access path P20 to access the virtual volume 231. Here, in an initial state, access path P10 is taken to be the primary path and access path P20 is taken to be the secondary path.

In cases where the primary path P10 is used, in reality, the host 70 accesses the logical volume 230 (LDEV1) in the storage unit 10. When the host 70 updates the data stored in the logical volume 230 (LDEV1), the update is also applied to the logical volume 230 (LDEV2) in the storage unit 20. This is because one virtual volume 231 is constituted by two logical volumes 230 (LDEV1, LDEV2) which form the copy pair. Because the same virtual identifier is set for the respective logical volumes 230 (LDEV1, LDEV2) which constitute the virtual volume 231, the path control unit 78 fails to identify the respective logical volumes 230 (LDEV1, LDEV2) and identifies the logical volumes as the same device.

In the example shown in FIG. 5, the data of the virtual volume 231 are stored in different logical volumes 230 and, therefore, a copy pair is formed by the logical volume 230 in the storage unit 10 and the logical volume 230 in the storage unit 20 and it is necessary to match the stored content of the respective logical volumes 230. However, the data in the virtual volume 231 exist in each of the separate storage units 10 and 20 and data redundancy is therefore high.

FIG. 6 shows another connection configuration. FIG. 6 shows a case where both the storage unit 10 and the storage unit 20 utilize a common external storage unit 30. The logical volume 230 in the external storage unit 30 will sometimes be referred to as the 'external volume'.

One logical volume 230 (LDEV1) which constitutes the virtual volume 231 utilizes the storage area of the external volume 230 (LDEV3). Likewise, the other logical volume 230 (LDEV2) which constitutes the virtual volume 231 utilizes the storage area of the external volume 230 (LDEV3).

The logical volume 230 (LDEV1) in the storage unit 10 and the logical volume 230 (LDEV2) in the storage unit 20 form a pair (not a copy pair) and virtual volume 231 is formed by setting the same virtual identifier for each of the logical volumes 230 (LDEV1, LDEV2).

In the example shown in FIG. 6, because one external volume 230 (LDEV3) is shared by the storage unit 10 and storage unit 20, the data of the virtual volume 231 are stored only in the external volume 230 (LDEV3). That is, the data of the virtual volume 231 are centrally managed by the external volume 230 (LDEV3) of the external storage unit 30. Hence, in the example shown in FIG. 6, there is no need to match the stored content of the respective logical volumes 230 (LDEV1, LDEV2) which constitute the virtual volume 231.

Figure 7:
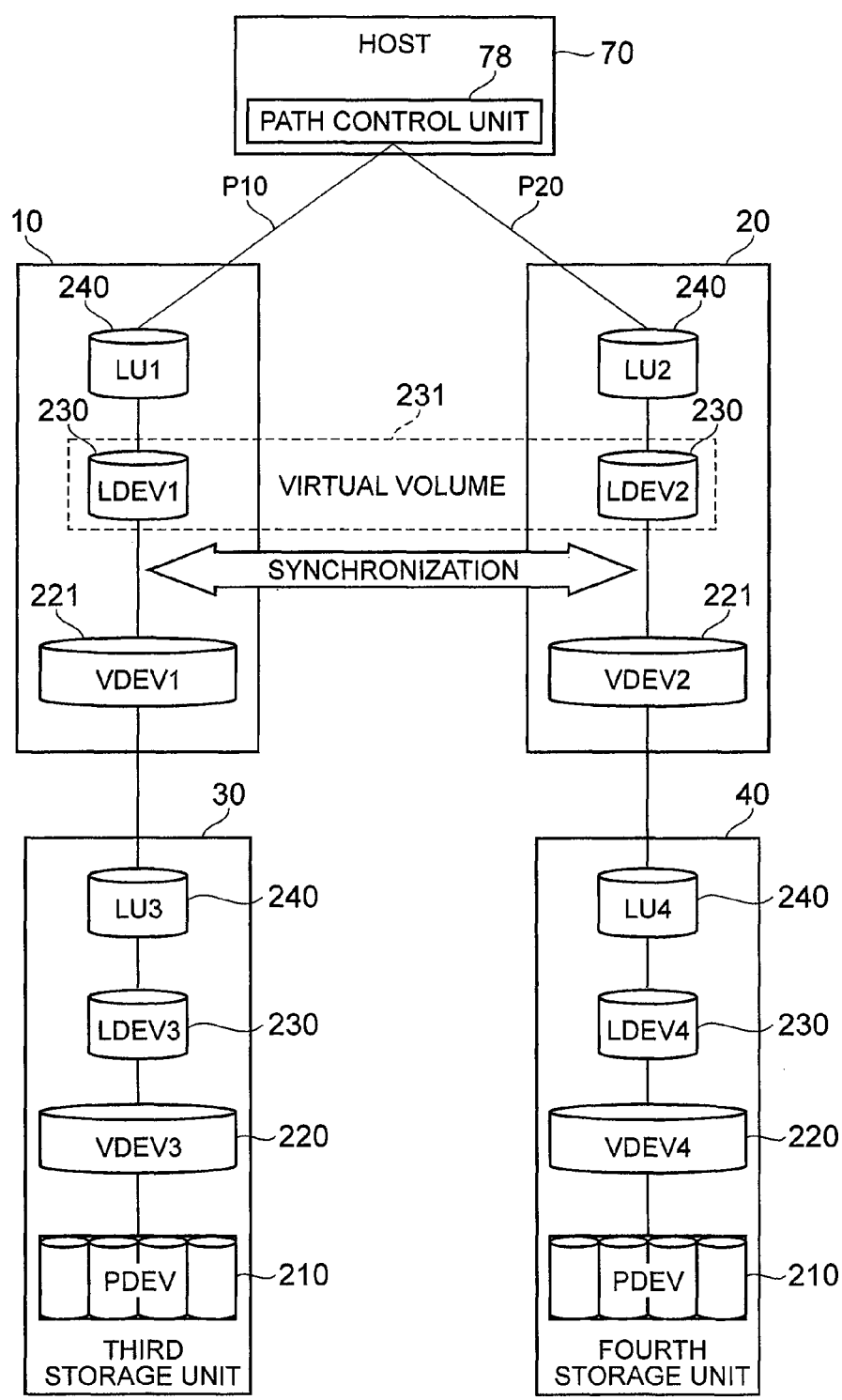
FIG. 7 is an explanatory diagram which shows yet another constitutional example of a virtual volume.

FIG. 7 shows a case where both of the storage units 10 and 20 which provide the virtual volume 231 utilize the external storage units 30, 40. One storage unit 10 utilizes the external volume 230 (LDEV3) in the external storage unit 30 and the other storage unit 20 utilizes the external volume 230 (LDEV4) in the external storage unit 40. That is, in the example in FIG. 7, the respective storage units 10, 20 which provide virtual volumes 231 utilize different external volumes. In this case, the stored content of each of the logical volume 230 (LDEV1) and logical volume 230 (LDEV2) must match.

Figure 8:
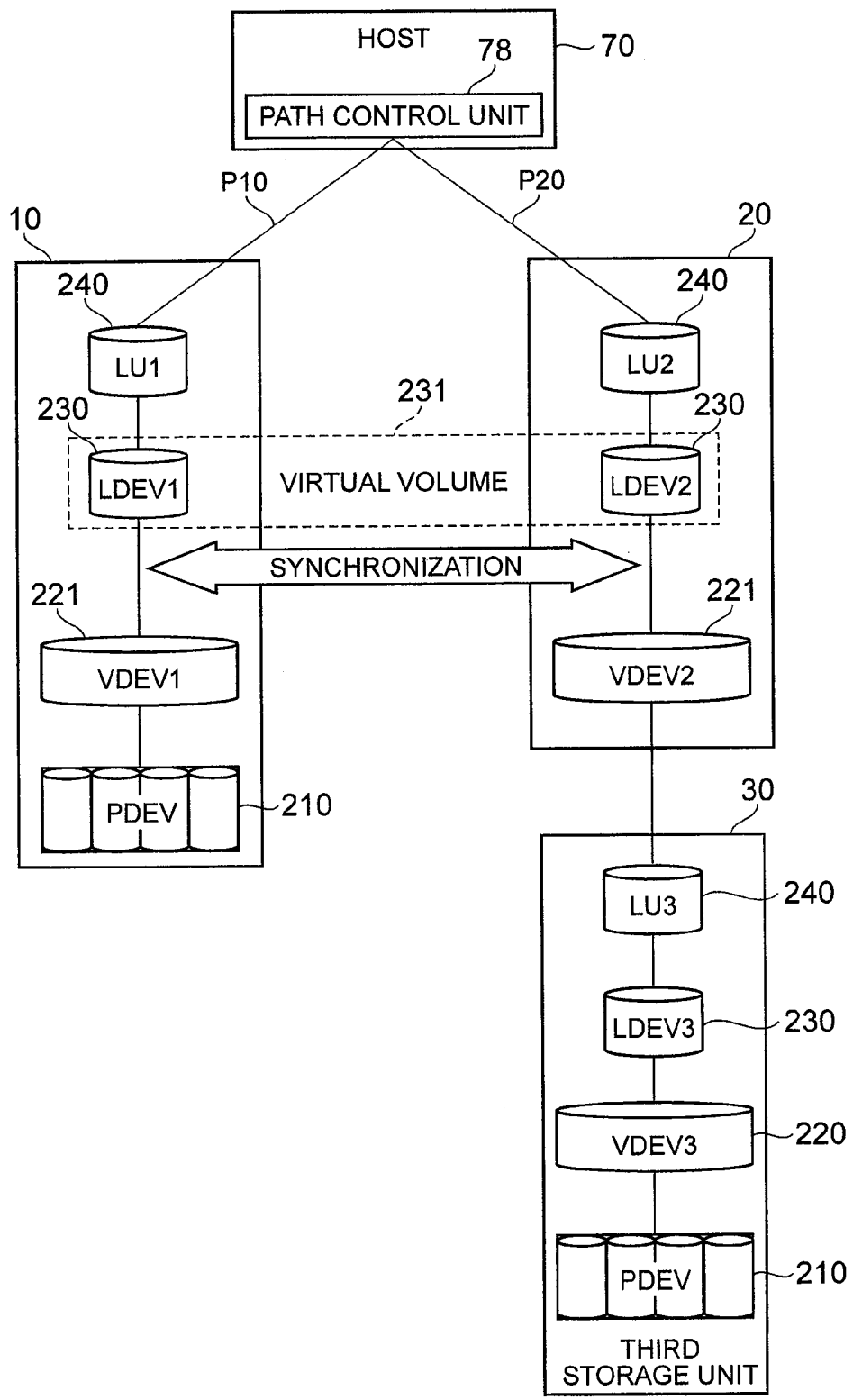
FIG. 8 is an explanatory diagram which shows yet another constitutional example of a virtual volume.

The example shown in FIG. 8 shows the constitution shown in FIG. 2 in simplified form as per FIGS. 5 to 7. Because the constitution has already been mentioned, the description here is omitted.

FIG. 9 is an explanatory diagram that shows a table T10 which stores management information for setting the virtual volume 231. This table T10 corresponds to the 'first management information'. The virtual volume management information table T10 is generated by the management server 80 and is stored in the shared memory 140 in the respective storage units which provide the virtual volume 231.

The virtual volume management information table T10 associates a number C11, a virtual volume identifier (FIG. 9 displays the identifier as 'ID') C12, first virtual volume constitution information C13, and second virtual volume constitution information C14, for example.

Number C11 indicates the order set by the virtual volume 231. The virtual volume identifier C12 corresponds to the 'virtual identifier'. The virtual volume identifier will sometimes be abbreviated as the 'virtual identifier' hereinbelow. As mentioned earlier, the virtual identifier is identification information for uniquely specifying the virtual volume 231 in the storage system and is presented to the host 70. The virtual identifier C12 is constituted by a unit number ('S/N' in FIG. 9) C15 and an LDEV number C16, for example. The unit number C15 is identification information for uniquely specifying the storage unit in the storage system. The LDEV number C16 is identification information for managing the logical volume 230 in the storage unit. The constitutional example of the virtual identifier C12 will be described further subsequently.

The first virtual volume constitution information C13 is information relating to one logical volume which constitutes the virtual volume 231. The first virtual volume constitution information C13 includes, for example, a unit number C15, an LDEV number C16, and a volume attribute C17. The volume attribute C17 distinguishes the volume as the primary volume or the secondary volume which constitute the virtual volume 231. In cases where the logical volume 230 in the storage unit 10 is selected as the primary volume, the unit number of the storage unit 10 is set as the unit number C15.

The second virtual volume constitution information C14 is information relating to the other logical volume which constitutes the virtual volume 231. Like the first virtual volume constitution information C13, the second virtual volume constitution information C14 includes the unit number C15, LDEV number C16, and volume attribute C17. In cases where the logical volume 230 in the storage unit 20 is selected as the secondary volume, the unit number of the storage unit 20 is set as the unit number C15.

A constitutional example of the virtual identifier C12 is shown in the lower part of FIG. 9. The unit number C15 contained in the virtual identifier C12 is constituted by unit numbers C151 and C152 of the two storage units 10 and 20 which provide the virtual volume 231 (the unit number C15 of the virtual identifier=the unit number C151 of one storage unit+the unit number C152 of the other storage unit). The LDEV number of the primary volume is used as the LDEV number C16 of the virtual identifier C12.

FIG. 10 shows another constitutional example of the virtual identifier C12. The virtual identifier C12 may be constituted comprising the unit number C151 of one storage unit, the unit number C152 of the other storage unit, the LDEV number C16 of the primary volume, and the serial number C18.

The serial number C18 is a number that is set in the order in which the virtual volume 231 is generated. By providing the serial number C18 in the virtual identifier C12, even in cases where the generation and annihilation of the virtual volume 231 are repeated, an overlapping of the virtual identifier can be prevented.

In the example in FIG. 9, the virtual identifier is constituted by the number of one storage unit, the number of the other storage unit, and the LDEV number of the primary volume. For example, in cases where a certain virtual volume is cancelled and the volumes which formed the pair pertaining to the virtual volume are each restored to normal volumes, whereupon the volumes once again form a pair, there is the possibility that another virtual volume which has the same virtual identifier as the initial virtual volume will be formed. In contrast, in the example shown in FIG. 10, even when the storage system operates for a long time in order to generate a virtual identifier by using the serial number C18, a situation where there is a virtual identifier overlap can be prevented.

The constitution of the virtual identifier is not limited to that shown in FIGS. 9 and 10. For example, as shown in FIG. 6, in cases where the respective storage units which commonly provide the virtual volume share the use of one external volume, a virtual identifier may be generated from the number of the external storage unit and the LDEV number of the external volume. Further, a constitution in which virtual identifier overlap is prevented by means of another procedure in place of the serial number C18 is also possible.

FIG. 11 is an explanatory diagram that shows a table T20 for storing the management information for setting a remote copy. Table T20 corresponds to the 'second management information'. The remote copy pair management table T20 is generated by the management server 80 and is stored in the shared memory 140 in the storage unit which provides the remote copy source volume and the shared memory 140 in the storage unit which provides the remote copy destination volume. In cases where either the remote copy source volume or remote copy destination volume is the virtual volume 231, Table T20 is stored in the shared memory 140 of the respective storage units which provide the virtual volume 231.

The remote copy pair management table T20 includes, for example, a number C21, first remote copy constitution information C22, and second remote copy constitution information C23. Number C21 indicates the order in which the remote copy pair is set. The first remote copy constitution information C22 is information relating to one volume forming the remote copy pair. The second remote copy constitution information C23 is information relating to the other volume which forms the remote copy pair.

The first remote copy constitution information C22 and second remote copy constitution information C23 each comprise a unit number C24, an LDEV number C25, remote copy attribute C26, and a virtual volume attribute C27.

The unit number C24 is a number that specifies the storage unit in which the remote copy source volume or remote copy destination volume exists. The LDEV number C25 is a number which specifies the remote copy source volume or the remote copy destination volume. The remote copy attribute C26 is information which distinguishes the volume as the remote copy source or the remote copy destination. In FIG. 11, the remote copy source volume is displayed as 'RC-PVOL' and the remote copy destination volume is displayed as 'RC-SVOL'. 'RC' is an abbreviation for 'remote copy'. The virtual volume (abbreviated as 'VVOL' in FIG. 11) attribute C27 indicates whether the remote copy source volume or remote copy destination volume is formed as the virtual volume 231. A volume for which 'ON' has been set for the virtual volume attribute C27 signifies the fact that the volume has been formed as the virtual volume 231. A volume for which 'OFF' has been set for the virtual volume attribute C27 signifies the fact that the volume is not for virtual volume 231 but is instead a normal volume.

FIG. 12 shows a Table T30 with which the respective storage units manage each of the logical volumes. That is, the respective storage units each comprise Table T30. Table T30 is stored in the shared memory 140.

The LDEV management table T30 comprises, for example, an LDEV number C31, a volume type C32, a VDEV number C33, a start address C34, and a size C35. The LDEV number C31 is identification information for managing the logical volumes 230 in the respective storage units. The LDEV number C31 can also be referred to as the 'local identifier'.

The volume type C32 distinguishes the volume as being constituted as an internal volume or constituted using an external volume. The volume which is constituted as an internal volume is a volume which utilizes a physical storage area within the storage unit. A volume which is constituted by using an external volume is a volume which utilizes a volume in an external storage unit (an external volume).

The VDEV number C33 is information specifying the VDEV to which the volume belongs. The start address C34 indicates from which part of the physical storage area of the VDEV the volume starts. The size C35 is the storage capacity of the volume.

FIG. 13 shows a Table T40 for managing external volumes. This Table T40 is stored in the shared memory 140 of the storage units which utilize external volumes. The storage units which do not utilize external volumes do not comprise Table T40.

The external volume management table T40 includes, for example, VDEV number C41, connection port C42, and external storage information C43. The VDEV number C41 is information specifying the VDEV. The connection port C42 is information specifying the communication port 111B to which the external storage unit is connected.

The external storage information C43 indicates the constitution of the external storage unit. The external storage information C43 includes, for example, a LUN_C44, a vendor name C45, a unit name C46, and a volume identifier C47. The LUN_C44 indicates the LUN associated with the external volume. The vendor name C45 indicates the name of the supplier of the external storage unit. The unit name C46 indicates the number for specifying the external storage unit. The volume identifier C47 is a local identifier which allows the external storage unit to identify a volume in the external storage unit (an external volume).

Figure 14:
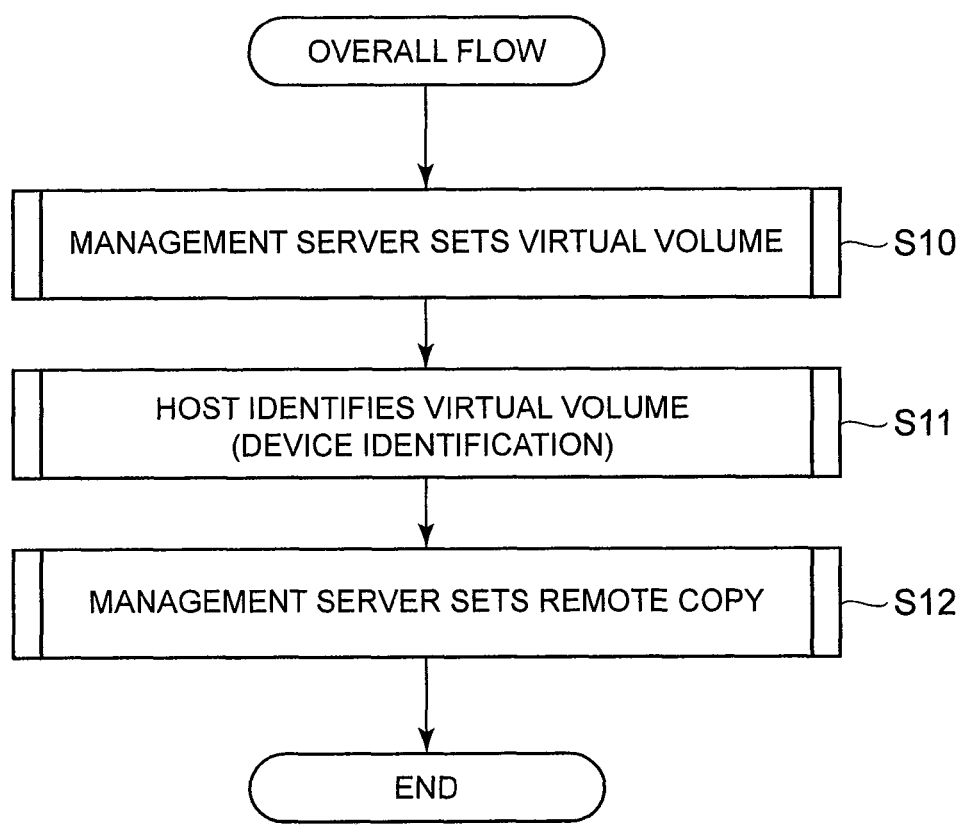
FIG. 14 is a flowchart that schematically shows the whole operation of the storage system.

The operation of the storage system will now be described. FIG. 14 is a flowchart that shows the overall flow of the processing in simplified form. In the storage system of this embodiment, the management server 80 sets a virtual volume by issuing an instruction to a storage unit (S10), whereupon the host 70 identifies devices (volumes) in the storage system in accordance with a report from the management server 80 (S11). In addition, the management server 80 sets the remote copy by issuing an instruction to the storage unit (S12). As will be described subsequently, in cases where a virtual volume is cancelled, different processing is executed.

Figure 15:
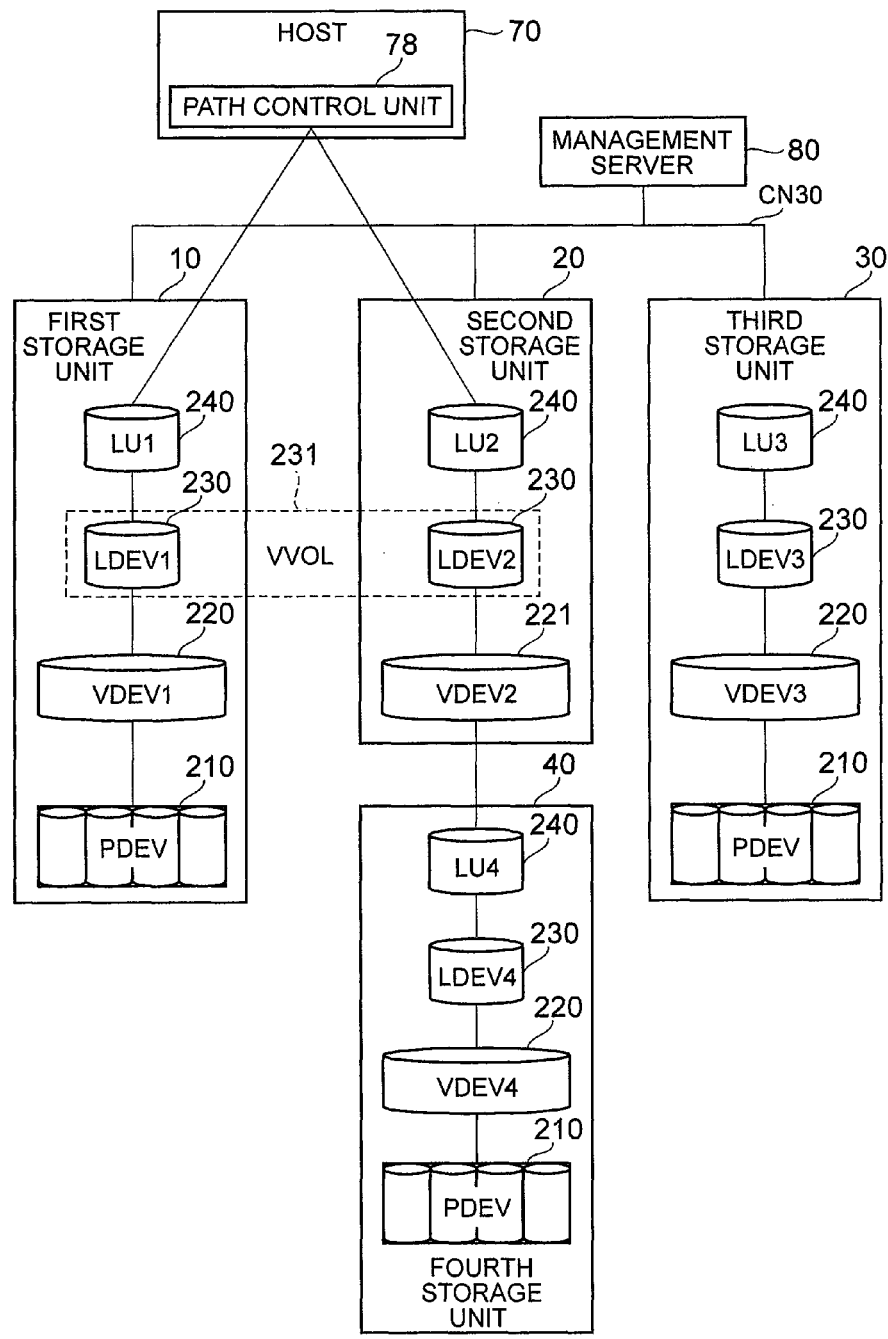
FIG. 15 is a constitutional view of the storage system which serves to illustrate a method of setting a virtual volume.

FIG. 15 is a constitutional view of the storage system which is used in order to illustrate the method of setting a virtual volume. As shown in FIG. 15, a case where the virtual volume 231 is generated by means of the first storage unit 10 and second storage unit 20 will be described.

Figure 16:
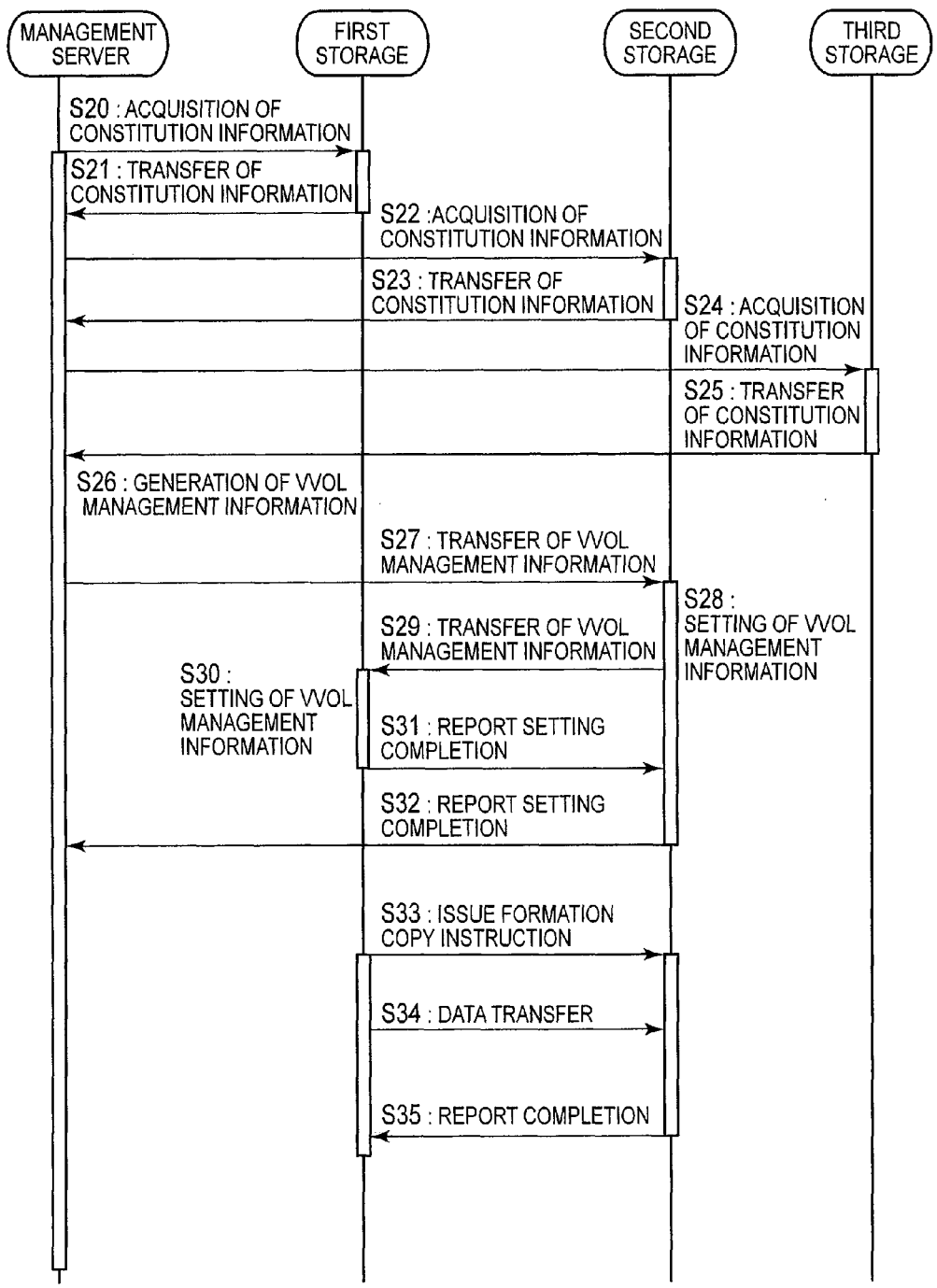
FIG. 16 is a flowchart of the method of setting a virtual volume.

FIG. 16 is a flowchart which shows the method of setting a virtual volume. The management server 80 requests constitution information from each of the storage units in the storage system (S20, S22, S24). The respective storage units transmit the LDEV management table T30 to the management server 80 (S21, S23, S25).

The management server 80 generates a screen G10 for setting a virtual volume on the basis of the constitution information collected from each of the storage units. The user designates the volume pair which is to constitute the virtual volume by using the setting screen G10. The setting screen G10 and designation method will be described subsequently in conjunction with FIGS. 18 to 22.

The management server 80 generates virtual volume management information as shown for the virtual volume management information table T10 in FIG. 9 on the basis of the user's designation (S26). The management server 80 transmits virtual volume management information to either the storage unit which provides the primary volume of the virtual volume or the storage unit which provides the secondary volume of the virtual volume (S27). FIG. 16 shows a case where virtual volume management information is transmitted to the second storage unit 20 which provides the secondary volume.

The storage unit 20 stores the virtual volume management information received from the management server 80 in the shared memory 140 in the storage unit 20 and the constitution of the virtual volume is set by the controller 100 of the storage unit 20 (S28). Thereafter, the storage unit 20 transfers the virtual volume management information to the storage unit 10 which provides the primary volume (S29).

The storage unit 10 stores the virtual volume management information which is received from the storage unit 20 in the shared memory 140 of the storage unit 10 and the constitution of the virtual volume is set by the controller 100 of the storage unit 10 (S30). The storage unit 10 reports the fact that the virtual volume setting is complete to the storage unit 20 which is the source of transmission of the virtual volume management information (S31).

Upon receipt of the report that the virtual volume setting is complete from the storage unit 10, the storage unit 20 reports the fact that the setting of the virtual volume is complete to the management server 80 (S32).

The storage unit 10 which provides the primary volume issues an instruction to the storage unit 20 which provides the secondary volume to start a form copy (S33) and transmits the data stored in the primary volume constituting the virtual volume to the storage unit 20 (S34). The storage unit 20 writes the data received from the storage unit 10 to the secondary volume which constitutes the virtual volume. Upon completion of the formation copy, the storage unit 20 reports the fact that the formation copy is complete to the storage unit 10 (S35).

A formation copy is an initial copy which is made in order to match the stored content of two volumes. For the sake of convenience in the following description, the storage unit which provides the primary volume of the virtual volume will sometimes be called the primary storage unit and the storage unit which provides the secondary volume of the virtual volume will sometimes be called the secondary storage unit.

Figure 17:
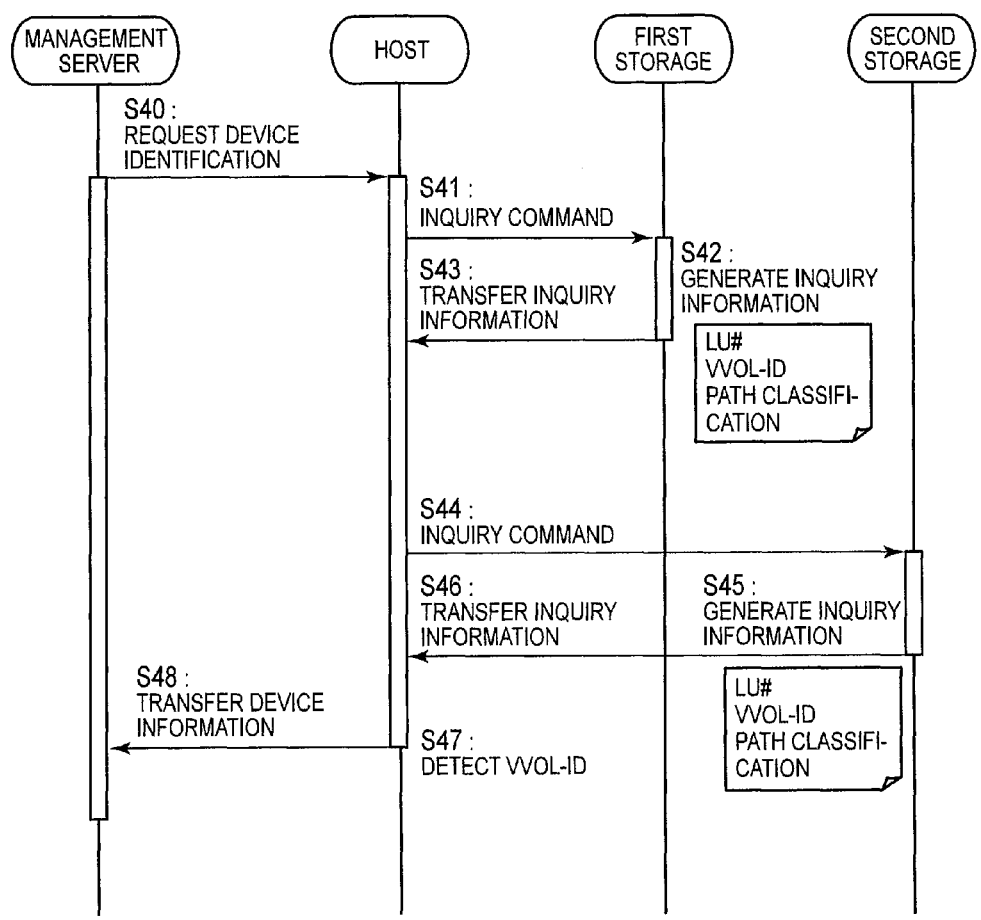
FIG. 17 is a flowchart that shows processing whereby the host identifies volumes in the system.

FIG. 17 is a flowchart showing the processing with which the host 70 detects devices in the storage system. The devices are logical devices (logical volumes 230). The management server 80 issues a request to the host 70 to identify the devices (S40).

The host 70 transmits an Inquiry command to the respective storage units 10 and 20 in accordance with the instruction from the management server 80 (S41, S44). The respective storage units generate Inquiry information in accordance with the instruction from the host 70 (S42, S45). Inquiry information is information for responding to an Inquiry command and includes, for example, an LU number (LUN), a virtual identifier, and a path type. Here, a case where the virtual volume 231 has been generated is taken as an example, and, therefore, the Inquiry information includes a virtual identifier.

The respective storage units 10 and 20 transmit Inquiry information to the host 70 (S43, S46). The path control unit 78 of the host 70 identifies devices with the same virtual identifier as the same device. The path control unit 78 sets the two access paths P10 and P20 which permit access to the device (virtual volume 231) as paths which permit an alternate path operation (S47).

The host 70 transfers Inquiry information collected from the respective storage units 10, 20 to the management server 80 (S48). The management server 80 confirms that the processing to identify the devices performed by the host 70 is complete as a result of receiving the information from the host 70.

An example of the method for setting a virtual volume will now be described with reference to FIGS. 18 to 22. The respective screens of FIGS. 18 to 22 are supplied to the user via the user interface 83 of the management server 80, for example.

FIG. 18 shows an initial state of the setting screen G10 for setting a virtual volume. The setting screen G10 displays, for example, a volume list G11, a selection list G12, an apply button G13, and a cancel button G14.

The volume list G11 shows a list of the volumes which the user is able to select. The volume list G11 displays, for each volume, the unit number (S/N) of the storage unit in which the volume exists, the number of the volume (LDEV#), the volume type, and the volume size, for example.

The selection list G12 displays the volumes which have been selected by the user. In the initial state, because none have yet been selected by the user, the selection list G12 has blank fields.

FIG. 19 shows an aspect in which the user selects the primary volume which constitutes the virtual volume. The user selects a desired volume as the primary volume from among the volumes displayed in the volume list G11. For example, the user calls a submenu G15 by clicking the pointing device in a state where the desired volume has been selected. The submenu G15 allows the volume to be selected as the primary volume or as the secondary volume.

The user selects a volume as the primary volume by operating the apply button G13 above the selected volume. As a result, the volume designated by the user is determined as the primary volume.

FIG. 20 shows an aspect in which the user selects a secondary volume which constitutes the virtual volume. As mentioned in FIG. 19, the user calls the submenu G15 above the desired volume and selects the volume as the secondary volume. When the user operates apply button G13, the volume designated by the user is determined as the secondary volume. The selection list G12 in FIG. 20 displays information relating to the primary volume that was determined first.

FIG. 21 shows an aspect in which the constitution of the virtual volume is finally determined. The selection list G12 displays information relating to the primary volume and the secondary volume designated by the user. When the user operates the apply button G13, the virtual volume is set with the constitution shown in the select list G12.

FIG. 22 is a screen G20 showing a list of the virtual volumes designated by the user. This screen shows, for each virtual volume, an identifier (virtual identifier) G21 of the virtual volume, information G22 specifying the primary volume which constitutes the virtual volume, information G23 specifying the secondary volume which constitutes the virtual volume, and the size G24 of the virtual volume. Information relating to the constitution of the virtual volume designated by the user is registered in the virtual volume management information table T10.

Figure 23:
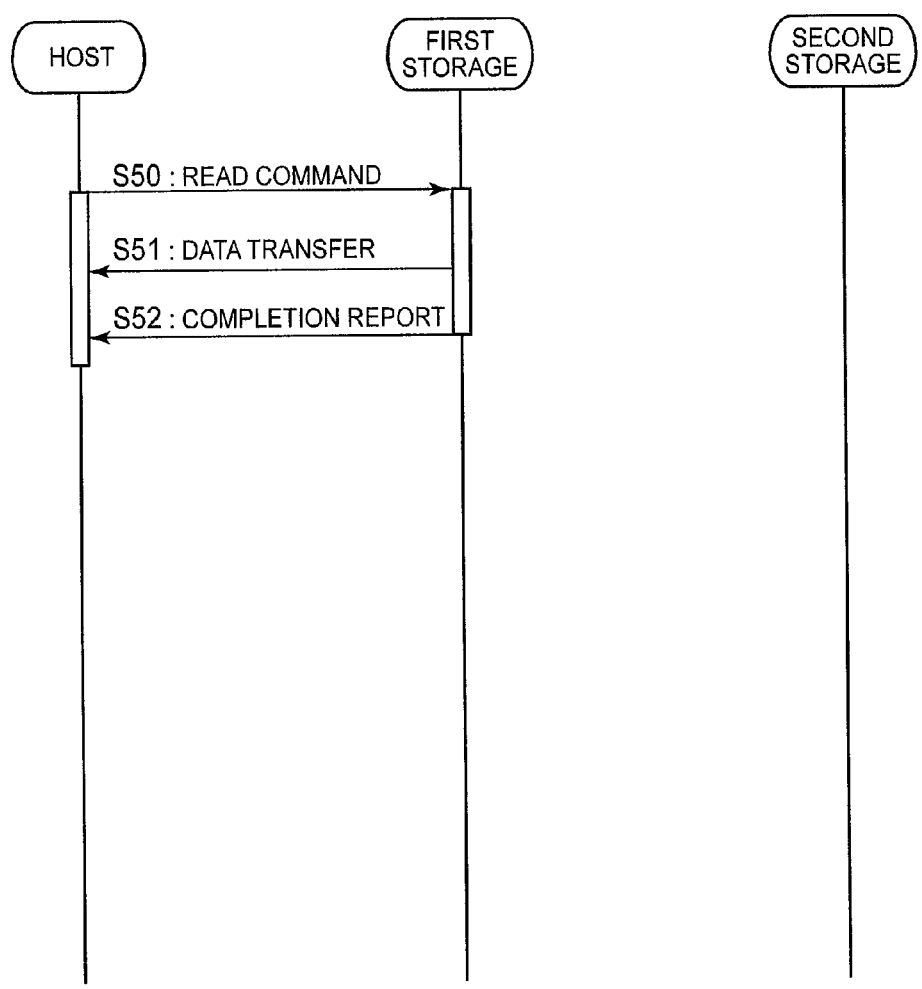
FIG. 23 is a flowchart for processing a read command for the virtual volume.

The processing in a case where data are written to and read from a virtual volume will now be described on the basis of FIGS. 23 to 26. FIG. 23 shows processing in a case where data are read from the virtual volume. The host 70 issues a read command to the primary storage unit (S50). The primary storage unit reads data from the logical volume 230 in accordance with the read command and transmits the data thus read to the host 70 (S51). The primary storage unit reports the fact that the processing of the read command is complete to the host 70 (S52).

Figure 24:
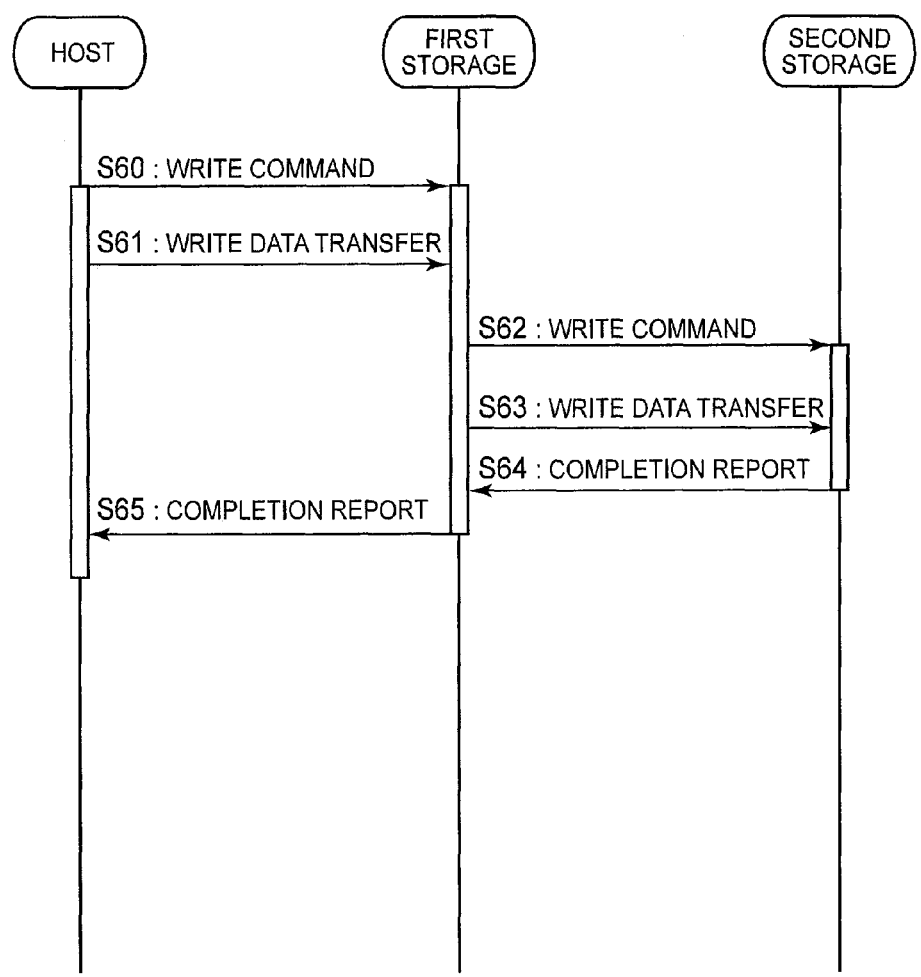
FIG. 24 is a flowchart for processing a write command for the virtual volume.
Figure 25:
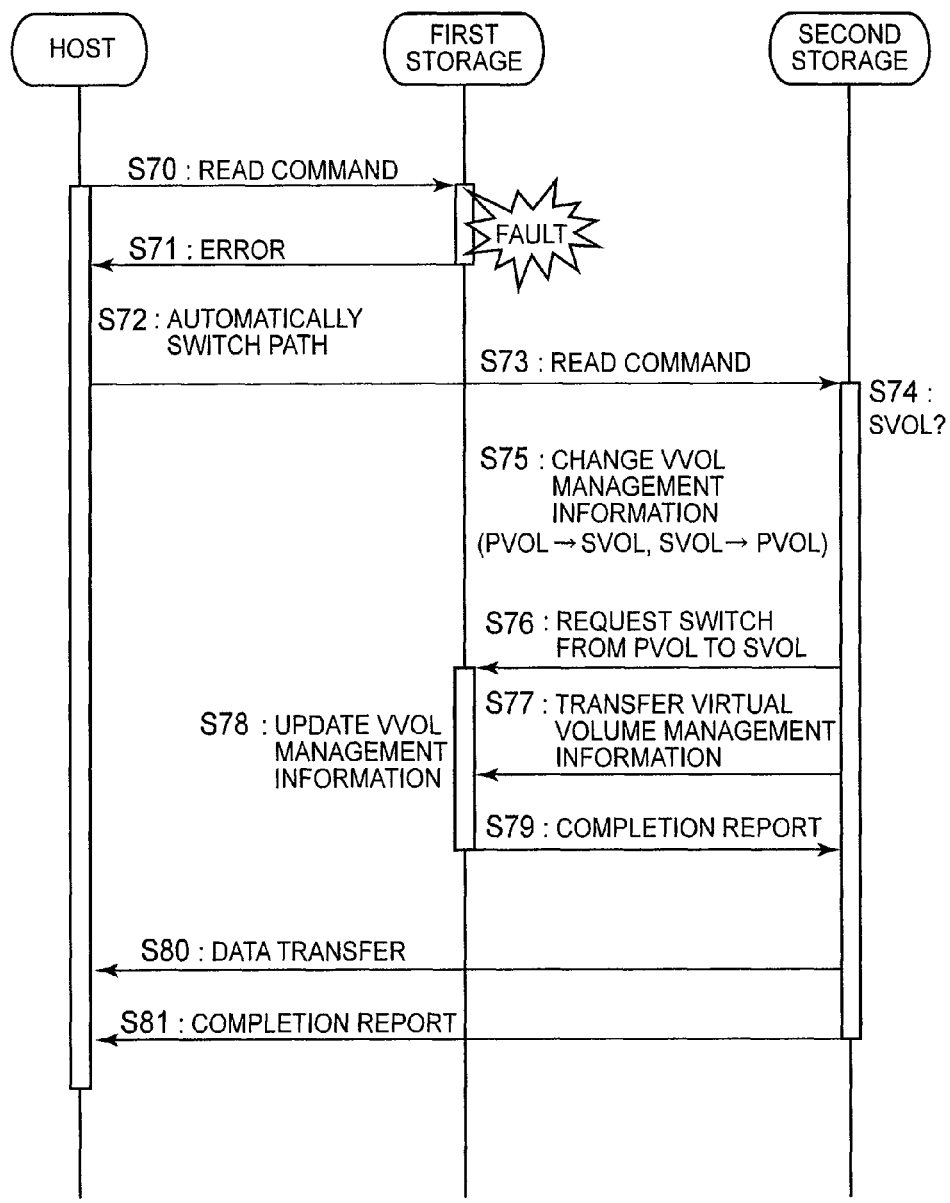
FIG. 25 is a flowchart for processing a read command when a fault occurs.

FIG. 24 shows processing in a case where data are written to the virtual volume. The host 70 issues a write command to the primary storage unit (S60) and transmits write data to the primary storage unit (S61). More precisely speaking, upon receipt of the write command from the host 70, the primary storage unit judges whether there is a spare area in the cache memory 130 and, in cases where write data can be accepted, reports the fact that write data can be received to the host 70. The host 70, which receives this report, transmits the write data to the primary storage unit.

The primary storage unit issues a write command to the secondary storage unit after the write data have been stored in the cache memory 130 (S62) and transmits the write data to the secondary storage unit (S63).

The secondary storage unit stores the write data received from the primary storage unit in the cache memory 130 and reports the fact that processing of the write command is complete to the primary storage unit (S64).

If the primary storage unit confirms the processing of the write command by the secondary storage unit, the primary storage unit reports the end of write command processing to the host 70 (S65).

The primary storage unit and secondary storage unit write the write data which are stored in the cache memory 130 to the disk drives 210 at a time when the processing load is small, for example. The act of transferring data from the cache memory 130 to the disk drives 210 is called destage processing.

Figure 26:
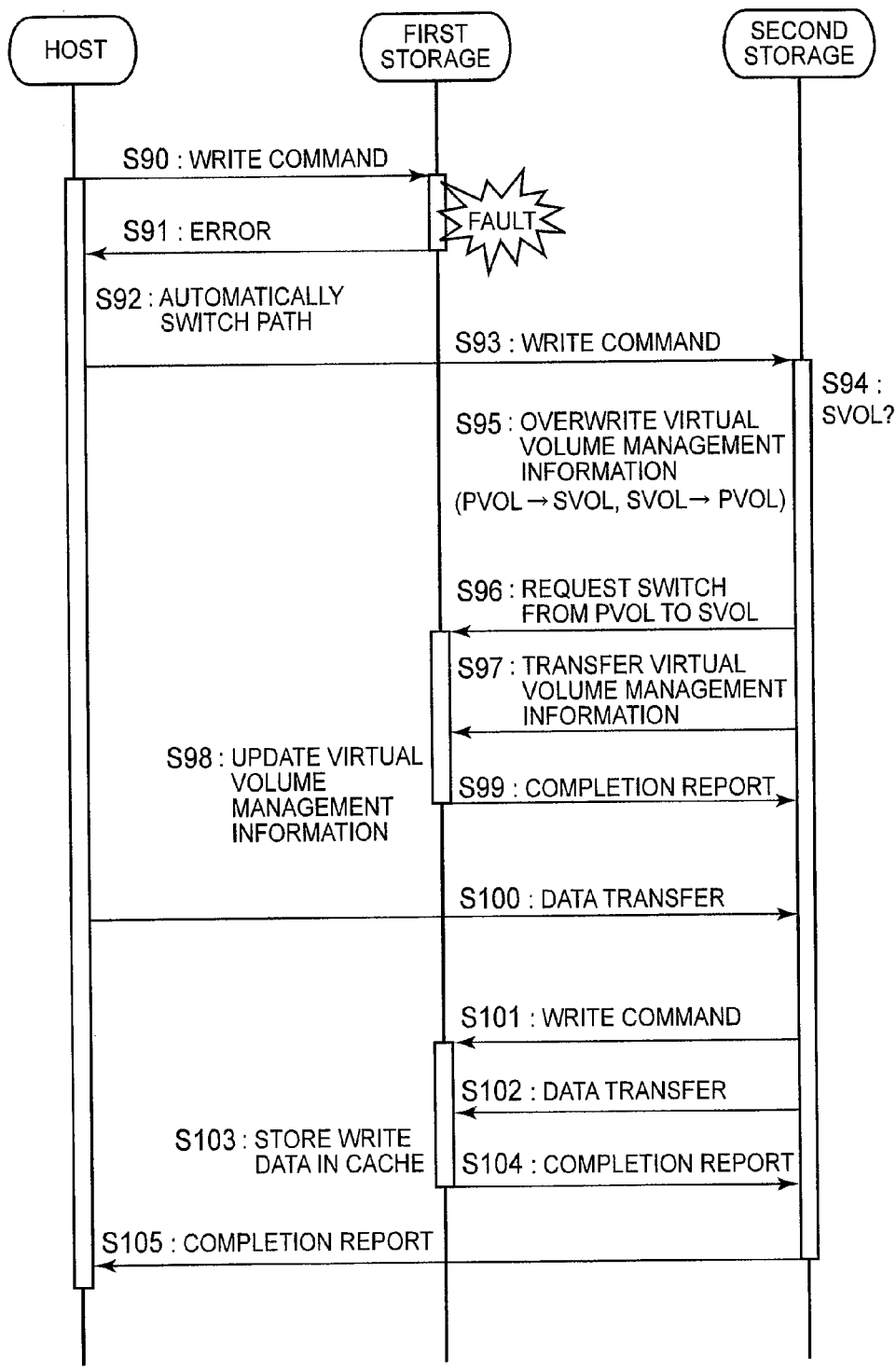
FIG. 26 is a flowchart for processing a write command when a fault occurs.

The write processing and read processing in cases where an access fault occurs will be described next. FIG. 26 shows a case where data cannot be read from the primary volume of the primary storage unit.

Initially, the host 70 issues a read command to the primary volume (S70). In cases where a fault of some kind occurs in accessing the primary volume, a time out error or the like occurs (S71). Therefore, the path control unit 78 switches from the primary path to the secondary path and issues a read command to the secondary volume (S74).

Upon receipt of the read command from the host 70, the secondary storage unit judges whether the volume constituting the read command target is the secondary volume constituting the virtual volume (S74).

When it is confirmed that the command is a read command with respect to the secondary volume, the secondary storage unit rewrites virtual volume management information stored in the shared memory 140 and reverses the attributes of the primary volume and secondary volume (S75). That is, the attribute of the volume which has thus far been the primary volume is changed to the secondary volume and the attribute of the volume which has thus far been the secondary volume is changed to the primary volume.

The secondary storage unit issues a request to the primary storage unit to switch the volume attribute (S76) and transfers the virtual volume management information in the secondary storage unit to the primary storage unit (S77).

The primary storage unit stores the virtual volume management information received from the secondary storage unit in the shared memory 140 in the primary storage unit and changes the volume attribute (S78). The primary storage unit reports the fact that the update of virtual volume management information is complete to the secondary storage unit (S79).

The secondary storage unit reads the data requested by the host 70 and transmits the data to the host 70 (S80). The secondary storage unit reports the fact that the processing of the read command is complete to the host 70 (S81).

For example, as per the case where there is a temporary access fault, in cases where there is no need for the virtual volume management information stored in the host 70 to be updated, there is no need to transmit the virtual volume management information to the host 70 from the secondary storage unit.

Instead, following S81, the virtual volume management information in the secondary storage unit may be transmitted from the secondary storage unit to the host 70 and the virtual volume stored in the host 70 may be updated.

Furthermore, for example, in cases where a serious fault occurs in the primary storage unit and the secondary storage unit is unable to communicate with the primary storage unit, the constitution may also exclude the processing of S76 to S79.

FIG. 26 shows write processing in a case where an access fault has occurred. The host 70 issues a write command to the primary volume (S90). Because there is an access fault with access to the primary volume, the path control unit 78 detects an error (S91). The path control unit 78 automatically switches from the primary path to the secondary path (S92) and issues a write command to the secondary volume (S93).

Upon receipt of the write command from the host 70, the secondary storage unit judges whether to access the secondary volume (S94) and similarly rewrites the virtual volume management information (S95).

The secondary storage unit similarly issues a request to switch the volume attribute to the primary storage unit (S96) and transmits the virtual volume management information to the primary storage unit (S97).

The primary storage unit updates the virtual volume management information set for itself (S98) and reports the end of the update to the secondary storage unit (S99). The secondary storage unit issues a report to the host 70 that it is possible to receive write data.

The host 70 transfers write data to the secondary storage unit (S100). The secondary storage unit stores write data received from the host 70 in the cache memory 130.

The secondary storage unit issues a write command to the primary volume of the primary storage unit (S101) and transmits the write data to the primary storage unit (S102).

The primary storage unit stores the write data received from the secondary storage unit in the cache memory 130 (S103) and reports the completion of write command processing to the secondary storage unit (S104).

Upon receipt of the completion report from the primary storage unit, the secondary storage unit reports the fact that the write command processing is complete to the host 70 (S105).

In cases where the secondary storage unit is unable to communicate with the primary storage unit, S96 to S99 and S101 to S104 can be omitted. In this case, the stored content of the secondary volume and the stored content of the primary volume will not match and there is then a difference between the two volumes. Therefore, the secondary storage unit uses difference management data such as differential data, for example, to manage the difference between the two volumes. In cases where the primary storage unit has recovered from the fault, the secondary storage unit transmits the differential data to the primary storage unit. As a result, the stored content of the secondary volume and the stored content of the primary volume can be made to match once again.

As mentioned earlier, the virtual volume is formed by a pair of a primary volume and a secondary volume and, therefore, the host 70 is able to use either one of the duplexed access paths known as the primary path and secondary path to access the virtual volume. Further, in cases where the data storage destination devices (logical volumes) of the primary volume and secondary volume which constitute the virtual volume are physically different from one another, the data protection can be afforded redundancy. Therefore, the virtual volume is able to provide the user with a convenience and reliability which are absent from the prior art.

In addition, the user is able to save a copy of the data of the virtual volume in a secondary site which is separate from the primary site. As a result, data can be protected even when a disaster occurs and the disaster recovery performance improves.

Figure 27:
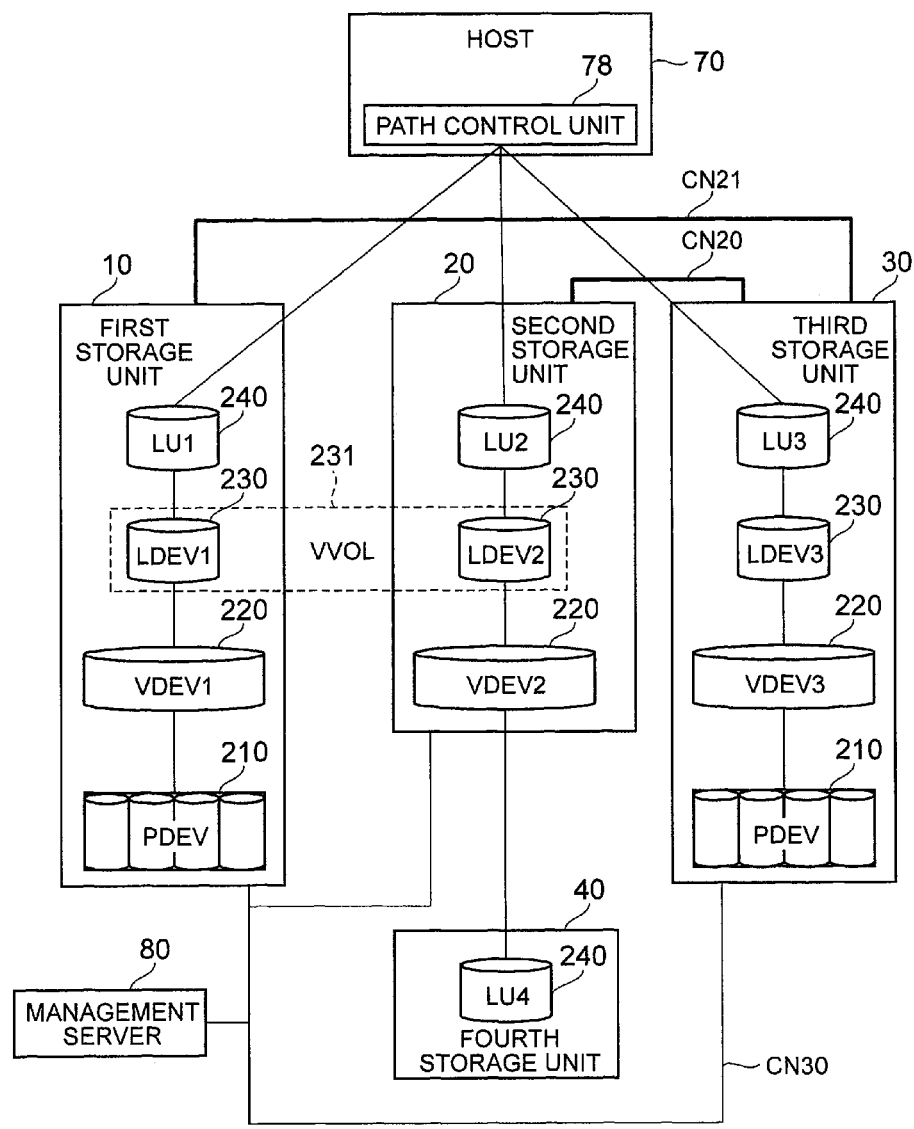
FIG. 27 is a constitutional view of the storage system which serves to illustrate a remote copy setting method.

Therefore, the method of setting a remote copy and the remote copy operation will be described. FIG. 27 shows a constitutional example of the storage system which serves to illustrate the remote copy setting method and operation. The storage unit 10 and storage unit 30 and the storage unit 20 and storage unit 30 are connected by the external connection communication networks CN21 and CN20 respectively. Further, the host 70 is able to communicate with the respective storage units 10 to 30.

Figure 28:
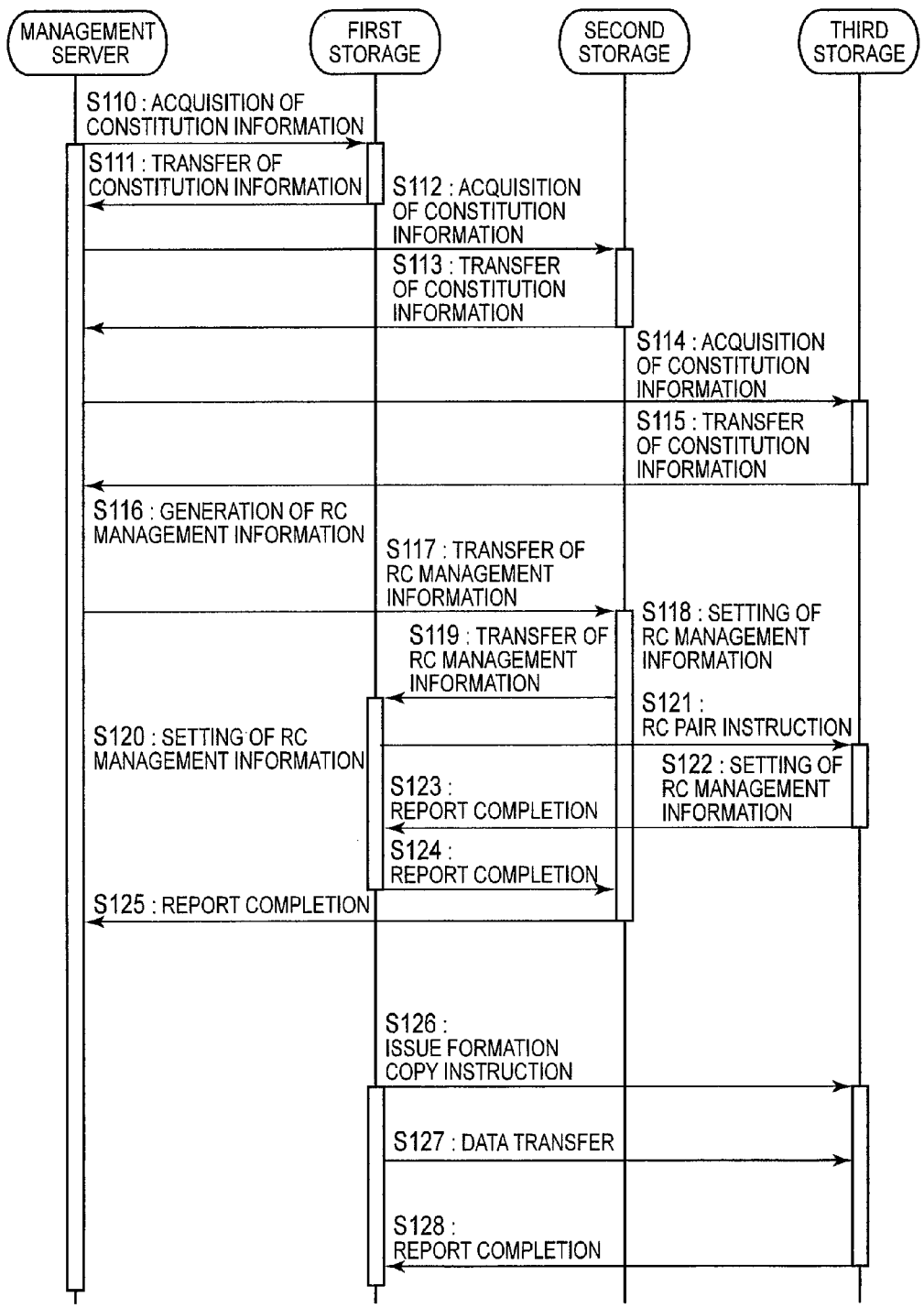
FIG. 28 is a flowchart that shows the remote copy setting method.

FIG. 28 is a flowchart showing the remote copy setting processing. A method of setting a virtual volume which is provided by the storage unit 10 and the storage unit 20 and a volume of the storage unit 30 as the remote copy pair will be described. A case where the virtual volume is the remote copy source volume (RC-PVOL) will be described.

The management server 80 issues a request to the respective storage units 10 to 30 to acquire constitution information such as the LDEV management table T30 (S110, S112, S114). The respective storage units 10 to 30 transmit constitution information on themselves to the management server 80 (S111, S113, S115).

The management server 80 generates a remote copy setting screen G30 on the basis of the constitution information collected from the respective storage units 10 to 30 and, as a result of the remote copy setting screen G30 being operated by the user, generates the remote copy management information described in the remote copy pair management table T20 (S116).

The management server 80 transmits remote copy management information to any one storage unit among the primary storage unit 10 and secondary storage unit 20 which provide the virtual volume which constitutes the remote copy source. FIG. 28 shows a case where the remote copy management information is transmitted to the secondary storage unit 20.

The secondary storage unit 20 stores the remote copy management information received from the management server 80 in the shared memory 140 and sets the remote copy to the secondary storage unit 20 (S118). The secondary storage unit 20 transfers the remote copy management information to the primary storage unit 10 (S119).

The primary storage unit 10 stores the remote copy management information received from the secondary storage unit 20 in the shared memory 140 of the primary storage unit 10 and sets the remote copy to the primary storage unit 10 (S120).

In addition, the primary storage unit 10 transmits the remote copy management information to the remote copy destination storage unit 30 (S121). The remote copy destination storage unit 30 stores the received remote copy management information in the shared memory 140 of the storage unit 30 and sets the remote copy to the storage unit 30 (S122). The remote copy destination storage unit 30 reports the fact that the remote copy setting is complete to the primary storage unit 10 (S123).

When the primary storage unit 10 confirms that the setting of the remote copy destination storage unit 30 is complete, the primary storage unit 10 reports the fact that the remote copy setting is complete to the secondary storage unit 20 (S124).

The secondary storage unit 20 reports the fact that the remote copy setting is complete to the management server 80 (S125).

For example, the remote copy source primary storage unit 10 issues an instruction to start a formation copy to the remote copy destination storage unit 30 at a time when the processing load is small (S126). The primary storage unit 10 transmits the data which are stored in the primary volume to the remote copy destination storage unit 30 (S127). The remote copy destination storage unit 30 writes the received data to the remote copy destination volume. Upon completion of the formation copy, the remote copy destination storage unit 30 reports the completion of the formation copy to the primary storage unit 10 (S128).

Figure 29:
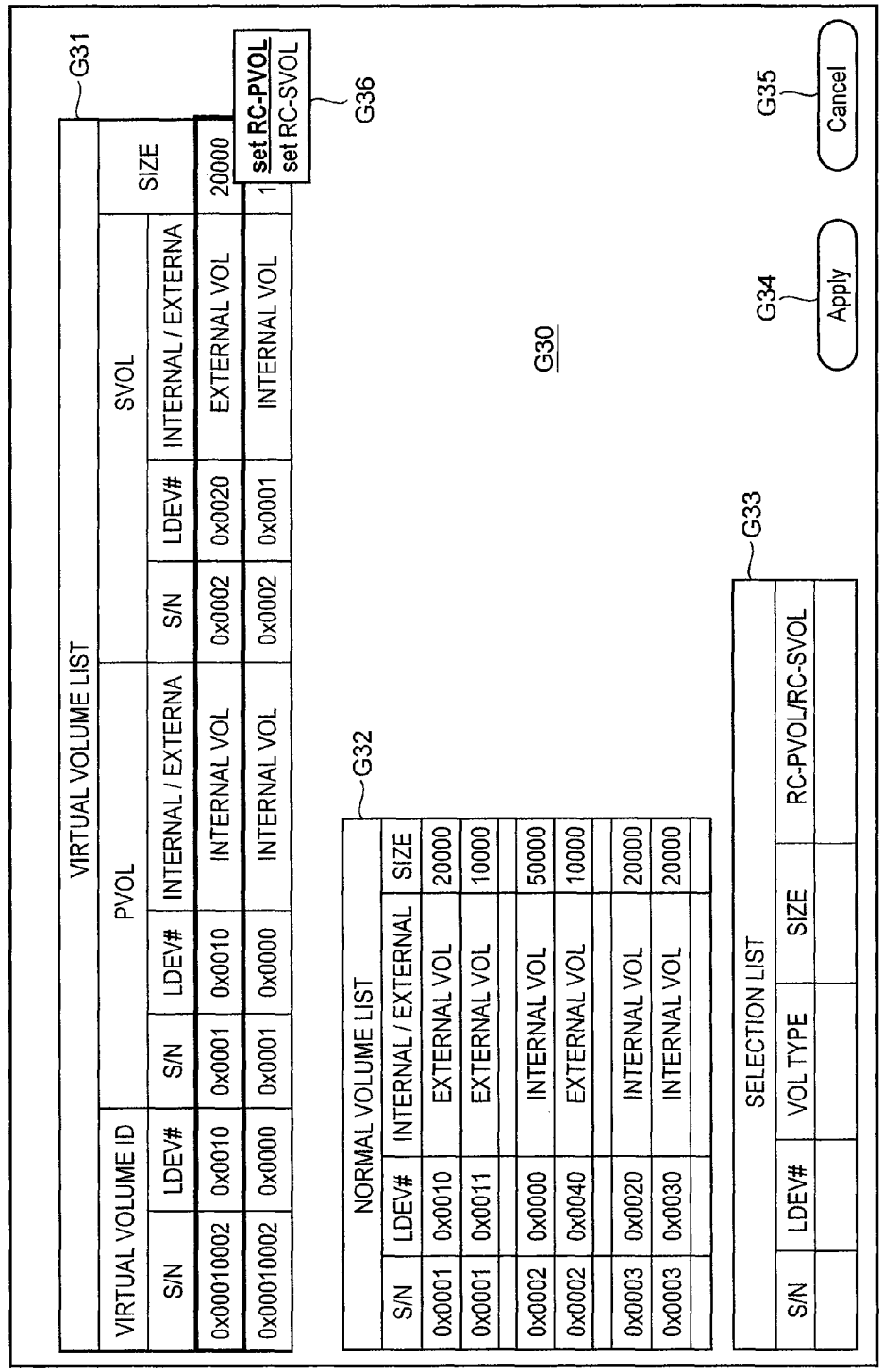
FIG. 29 is an explanatory diagram of a screen that shows an aspect in which a remote copy source volume is designated.

An aspect in which the user issues an instruction to perform remote copy setting by using the management server 80 will now be described on the basis of FIGS. 29 to 32. FIG. 29 is the screen G30 for setting the remote copy.

The remote copy setting screen G30 comprises, for example, a virtual volume list G31, a normal volume list G32, a selection list G33, an apply button G34, and a cancel button G35.

The virtual volume list G31 shows a list of the virtual volumes 231 that are provided in the storage system. The normal volume list G32 shows a list of normal volumes which are provided in the storage system. The selection list G33 shows a list of volumes that are selected as the remote copy pair.

By calling a submenu G36 in a state where the desired volume has been selected, the user selects the volume as either the remote copy source volume or the remote copy destination volume. In FIG. 29, the virtual volume 231 which is provided by the primary storage unit 10 and the secondary storage unit 20 is selected as the remote copy source volume.

Figure 30:
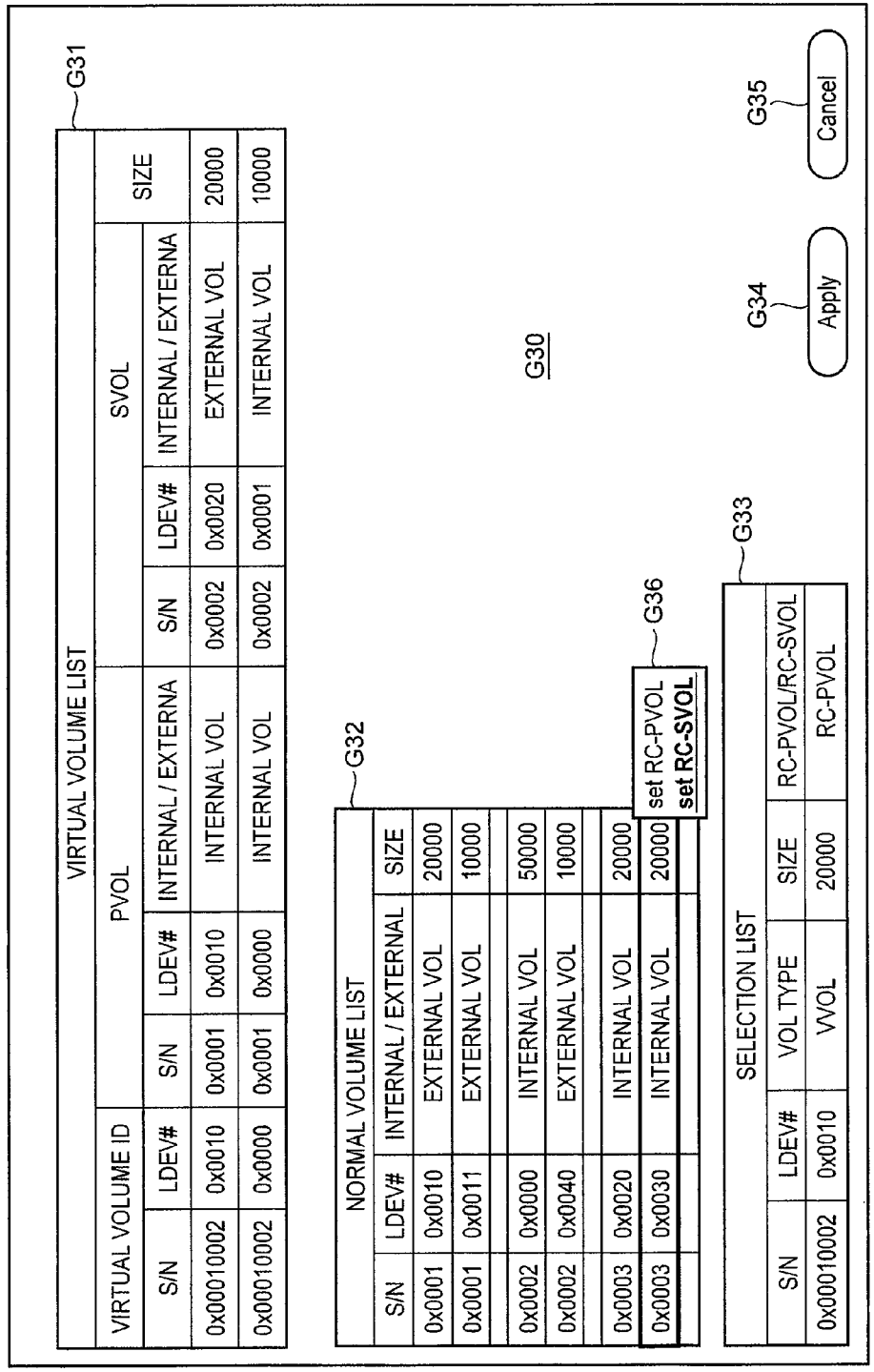
FIG. 30 is an explanatory diagram of a screen that shows an aspect in which a remote copy destination volume is designated.

FIG. 30 shows an aspect in which the remote copy destination volume is selected. By opening the submenu G36 in a state where the desired volume has been selected, the user selects the volume as the remote copy destination volume. The information on the remote copy source volume that was selected first is displayed in the selection list G33.

FIG. 31 shows a state where the selection of a remote copy source virtual volume and a remote copy destination normal volume has ended. As a result of the user operating the apply button G34, the remote copy instruction of the user is complete.

FIG. 32 is a screen G40 which shows a list of remote copy pairs. The user is able to confirm the designated content by means of the screen G40.

Figure 33:
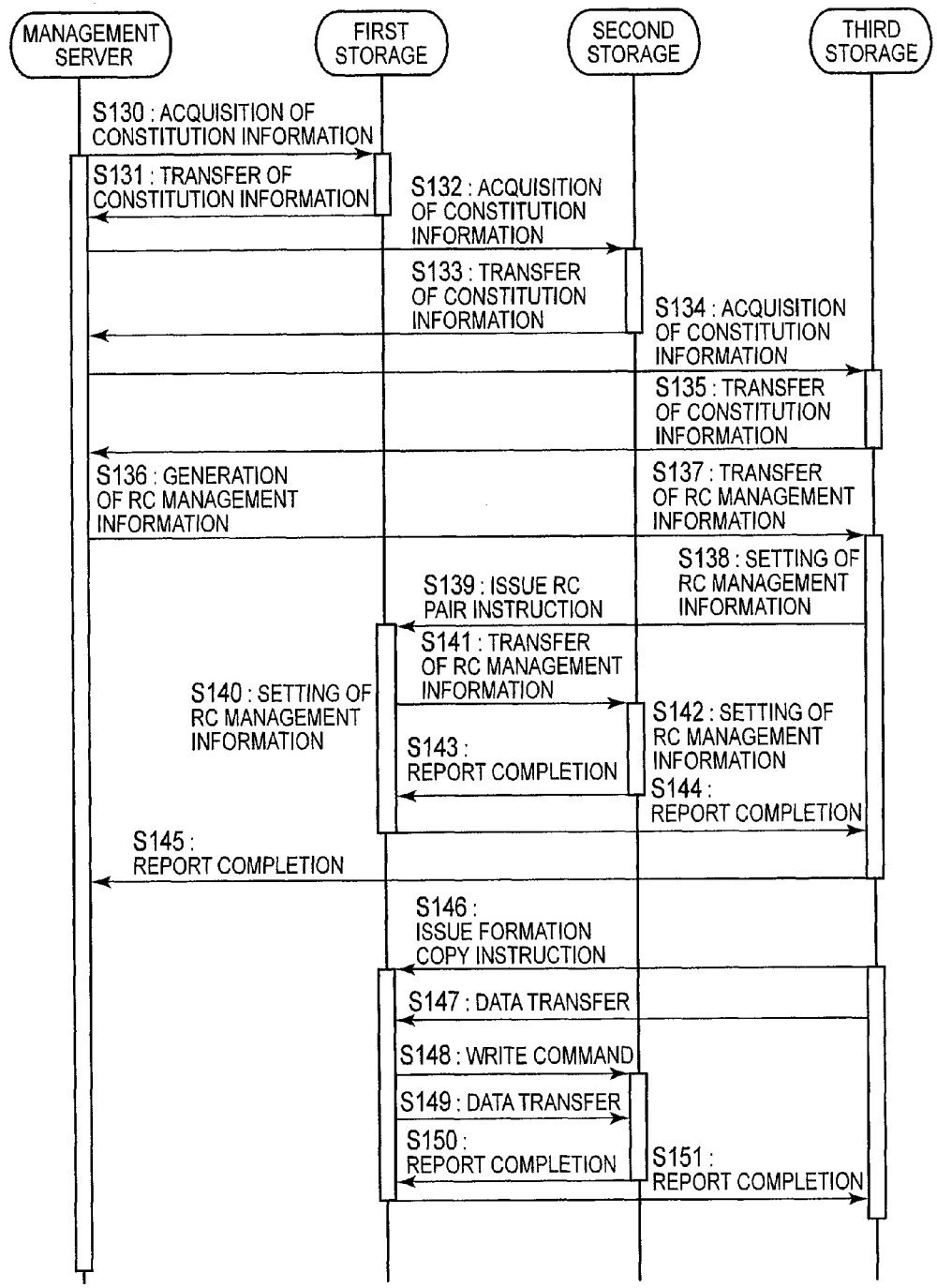
FIG. 33 is a flowchart that shows the remote copy setting method in which a normal volume is the remote copy source and a virtual volume is a remote copy destination.

FIG. 33 is a flowchart that shows the method of setting a remote copy in a case where the normal volume is a remote copy source volume and the virtual volume is a remote copy destination volume.

As per FIG. 28, the management server 80 acquires constitution information from the respective storage units 10 to 30 (S130 to S135) and generates remote copy management information (S136).

The management server 80 transmits remote copy management information to the remote copy source storage unit 30 (S137). The remote copy source storage unit 30 makes remote copy settings (S138) and then transmits the remote copy management information to the remote copy destination primary storage unit 10 (S139).

The primary storage unit 10 makes remote copy settings on the basis of the remote copy management information thus received (S140) and transmits the remote copy management information to the secondary storage unit 20 (S141).

The secondary storage unit 20 makes remote copy settings on the basis of the remote copy management information thus received (S142) and issues a report regarding the completion of settings to the primary storage unit 10 (S143). The primary storage unit 10, which receives the report, then issues a report regarding the completion of settings to the remote copy source storage unit 30 (S144).

The remote copy source storage unit 30 reports the fact that remote copy settings are complete to the management server 80 (S145).

Thereafter, the remote copy source storage unit 30 issues an instruction to start a formation copy to the primary storage unit 10 (S146) and transmits the data which are stored in the remote copy source volume to the primary storage unit 10 (S147).

The primary storage unit 10 writes the received data to the primary volume (S147). The primary storage unit 10 issues a write command to the secondary storage unit 20 (S148) and transmits the data which are stored in the primary volume to the secondary storage unit 20 (S149).

The secondary storage unit 20 writes the data to the secondary volume and reports completion of the write command processing to the primary storage unit 10 (S150). The primary storage unit 10 reports the fact that the formation copy is complete to the remote copy source storage unit 30 (S151).

For the sake of convenience in the description, it is indicated that the formation copy is completed by means of only one data transfer. However, in reality, the formation copy is completed by means of a plurality of data transfers.

Figure 34:
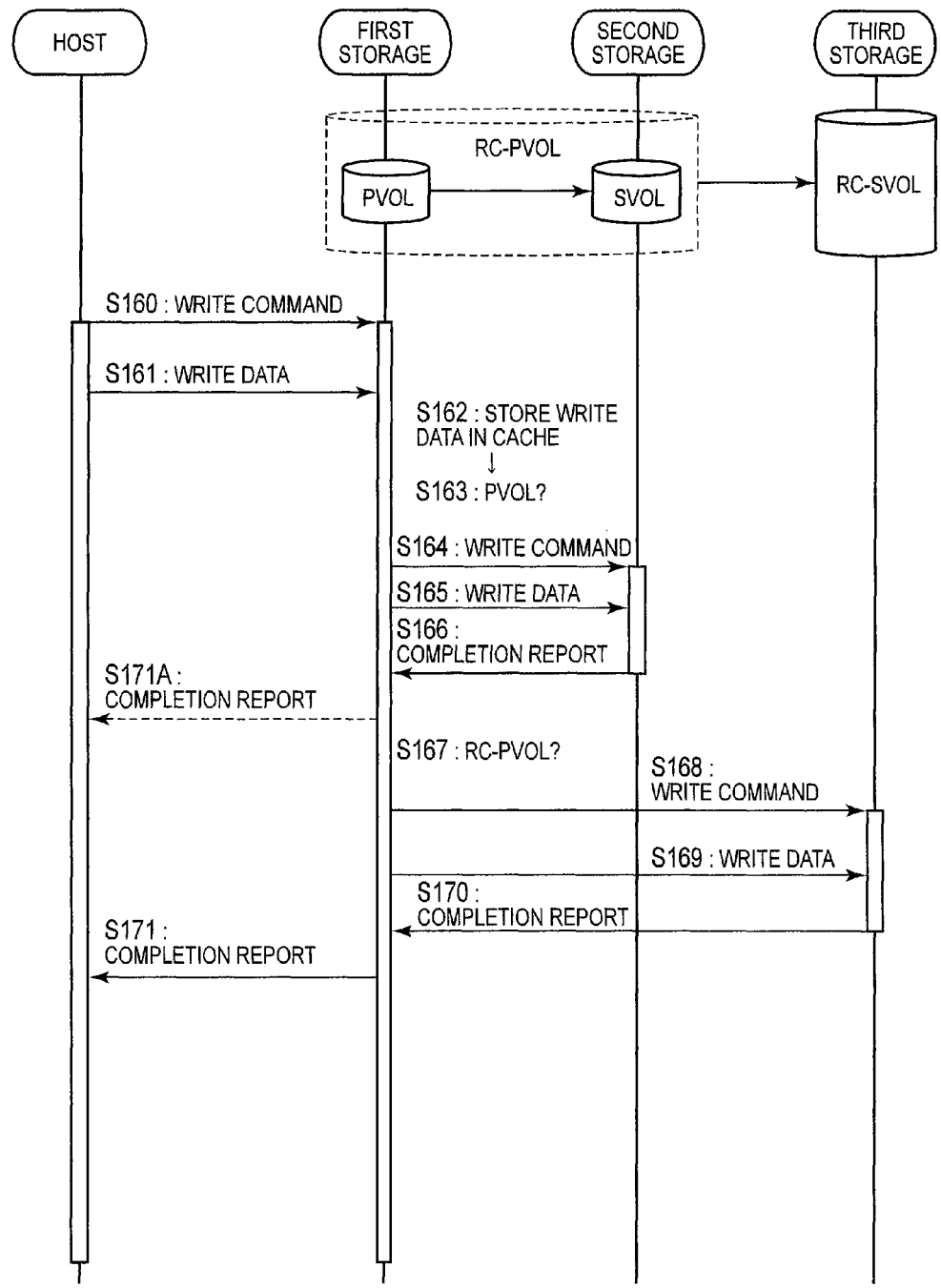
FIG. 34 is a flowchart that shows a remote copy operation.

FIG. 34 shows the remote copy operation in a case where a write command is issued. As per FIG. 28, FIG. 34 shows a case where the virtual volume provided by the primary storage unit 10 and the secondary storage unit 20 are the remote copy source volume.

The host 70 issues a write command to the primary volume (S160) and transmits write data to the primary volume (S161). The primary storage unit 10 stores the write data in the cache memory 130 (S162). The primary storage unit 10 confirms that same has the primary volume (S163) and transmits the write command and write data to the secondary storage unit 20 (S164, S165).

The secondary storage unit 20 writes the write data received from the primary storage unit 10 to the secondary volume and reports the fact that the write command processing is complete to the primary storage unit 10 (S166).

As a result, the stored content of the primary volume and the stored content of the secondary volume match.

Thereafter, the primary storage unit 10 confirms that same is the remote copy source storage unit (S167) and transmits the write command and write data to the remote copy destination storage unit 30 (S168, S169).

The remote copy destination storage unit 30 writes the write data received from the remote copy source to the remote copy destination volume and reports that the processing is complete to the primary storage unit 10 (S170).

Upon receipt of the completion report from the remote copy destination storage unit 30, the primary storage unit 10 reports that the write command processing is complete to the host 70 (S171).

As indicated by S171A in FIG. 34, the primary storage unit 10 may also report the fact that the write command processing is complete to the host 70 at the point where it is confirmed that the writing of write data to the secondary volume is complete.

A method that reports the completion of the write command processing to the host 70 after confirming the completion of the remote copy can be called a 'synchronous system' (S171). In contrast, a method that reports the completion of the write command processing to the host 70 prior to confirming the completion of the remote copy processing can be called an 'asynchronous system' (S171A).

In the case of a 'synchronous system', the stored content of the three volumes, namely, the primary volume, secondary volume, and remote copy destination volume completely match and, therefore, the data protection reliability can be increased. However, it takes time to report the completion of processing to the host 70 and the responsiveness of the storage system drops.

In the case of an 'asynchronous system', the completion of processing can be reported to the host 70 at the point when there is a match between the stored content of the primary volume and the stored content of the secondary volume. Hence, the responsiveness of the storage system is also improved by a synchronous system. However, because a report is issued to the host 70 prior to completion of the remote copy, there is not necessarily a guarantee of a match between the stored content of the remote copy destination volume and the stored content of the remote copy source volume.

As a further modified example of the asynchronous system, it is also possible to report completion of the write command processing to the host 70 at the point when the primary storage unit 10 stores the write data in the cache memory 130 (S162).

Figure 35:
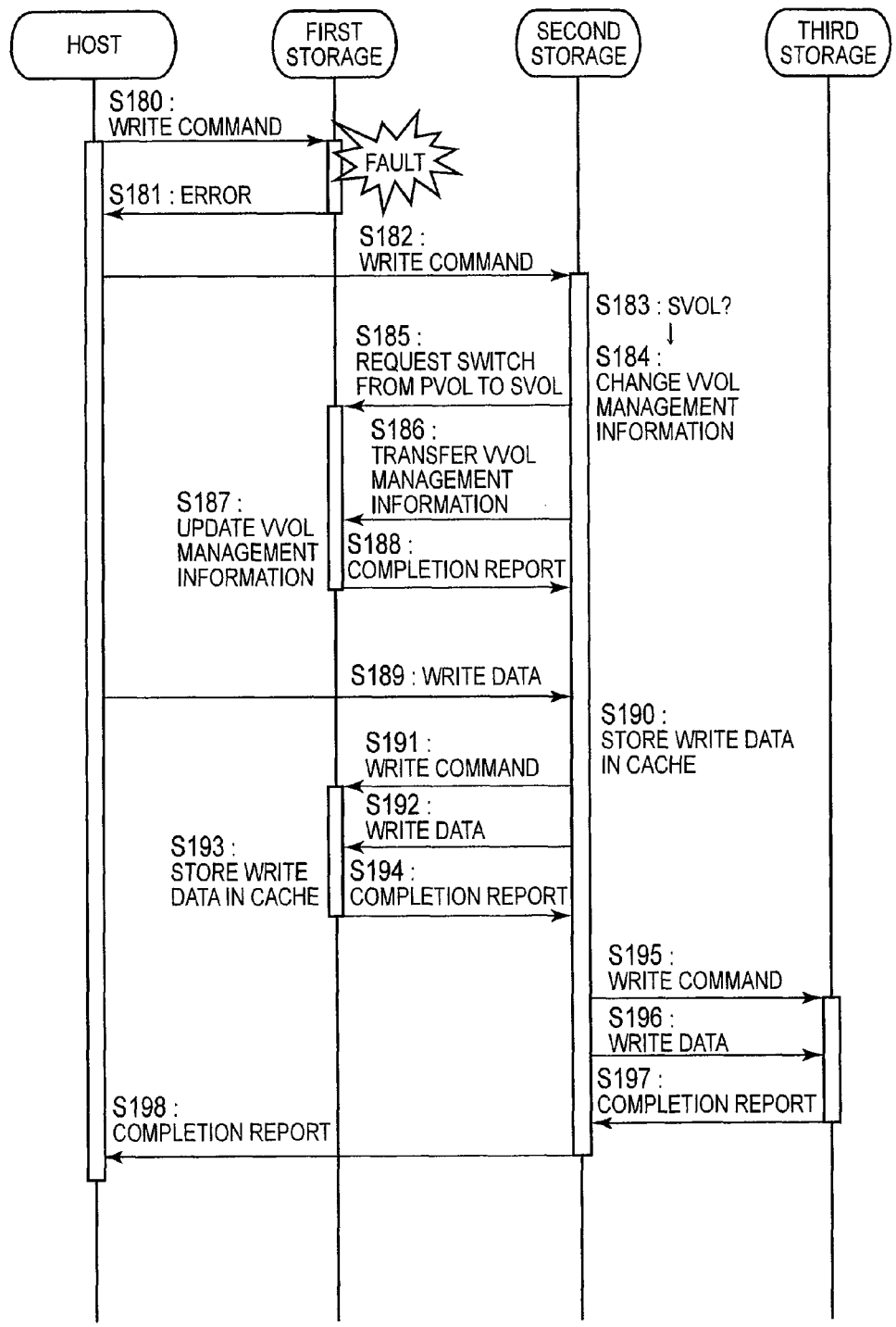
FIG. 35 is a flowchart that shows a remote copy operation when a fault occurs.

FIG. 35 is a flowchart that shows a case where a fault occurs with the access to the primary volume.

The host 70 issues a write command to the primary volume (S180). Due to the access fault, the path control unit 78 detects an error (S181). The path control unit 78 issues a write command to the secondary volume by switching from the primary path to the secondary path (S182).

The secondary storage unit 20 confirms that same has the secondary volume (S183) and changes the virtual volume management information (S184). As mentioned earlier, the secondary storage unit changes the attribute of the volume which has thus far been the secondary volume to the primary volume and the attribute of the volume which has thus far been the primary volume to the secondary volume.

The secondary storage unit 20 issues a request to switch the volume attribute to the primary storage unit 10 (S185). The secondary storage unit 20 then transmits the virtual volume management information whose volume attribute has been changed to the primary storage unit 10 (S186).

The primary storage unit 10 stores the virtual volume management information received from the secondary storage unit 20 to the shared memory 140 of the primary storage unit 10 (S187). The primary storage unit 10 reports that the update of the virtual volume management information is complete to the secondary storage unit 20 (S188).

Upon receipt of the write data from the host 70 (S189), the secondary storage unit 20 stores the write data in the cache memory 130 of the secondary storage unit 20 (S190).

The secondary storage unit 20 issues a write command to the primary storage unit 10 (S191) and transmits the write data to the primary storage unit 10 (S192).

The primary storage unit 10 stores the write data received from the secondary storage unit 20 in the cache memory 130 (S193) and reports the fact that the write command processing is complete to the secondary storage unit 20 (S194).

Thereafter, the secondary storage unit 20 executes a remote copy. The secondary storage unit 20 transmits the write command and write data to the remote copy destination storage unit 30 (S195, S196).

The remote copy destination storage unit 30 stores the write data in the cache memory 130 of the storage unit 30 and reports the fact that the write command processing is complete to the secondary storage unit 20 (S197).

Upon confirming that the remote copy is complete, the secondary storage unit 20 reports the fact that the write command processing is complete to the host 70 (S198).

Figure 36:
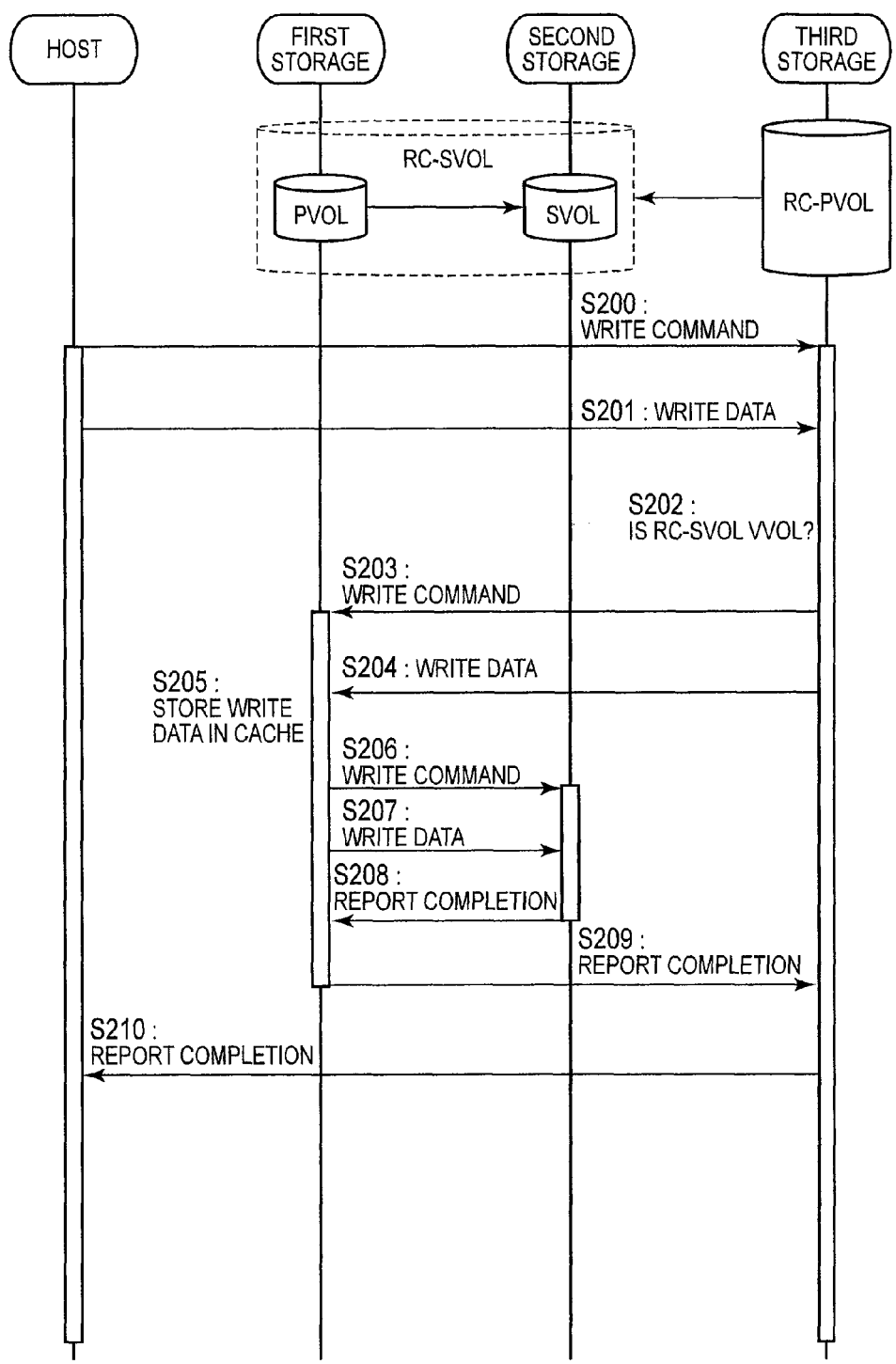
FIG. 36 is a flowchart that shows a remote copy operation for a case where a normal volume is the remote copy source.

FIG. 36 shows write processing in a case where the normal volume of the storage unit 30 is the remote copy source volume and the virtual volume provided by the storage unit 10 and the storage unit 20 is the remote copy destination volume.

The host 70 transmits a write command and write data to the storage unit 30 (S200, S201). The storage unit 30 confirms that the remote copy destination volume is the virtual volume (S202) and transmits the write command and write data to the primary storage unit 10 (S203, S204).

The primary storage unit 10 stores the write data in the cache memory 130 of the primary storage unit 10 (S205) and, thereafter, transmits the write command and write data to the secondary storage unit 20 (S206, S207).

The secondary storage unit 20 stores the write data in the cache memory 130 of the secondary storage unit 20 and reports that the processing is complete to the primary storage unit 10 (S208). For the sake of convenience in the description, the write data are sometimes stored in the cache memory when data are written to the volume.

Upon receipt of the report from the secondary storage unit 20, the primary storage unit 10 reports the fact that the write command processing is complete to the remote copy source storage unit 30 (S209).

Upon confirming that the processing at the remote copy destination is complete, the remote copy source storage unit 30 reports that the write command processing is complete to the host 70 (S210).

Figure 37:
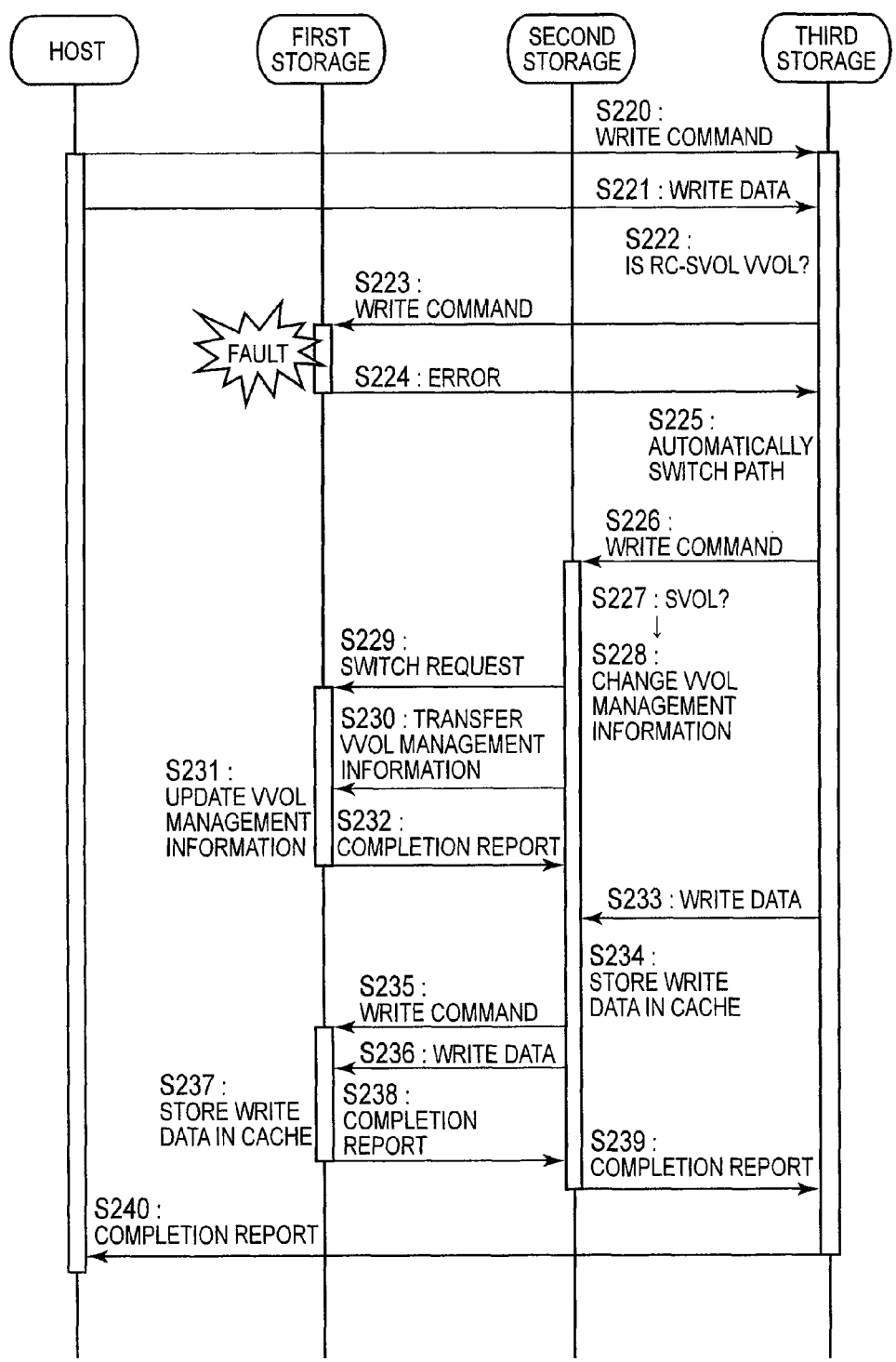
FIG. 37 is a flowchart that shows a remote copy operation in a case where a normal volume is the remote copy source and a fault occurs with the virtual volume.

FIG. 37 shows processing in a case where a fault occurs in the access to the primary volume of the virtual volume in the case described in FIG. 36.

The host 70 transmits a write command and write data to the remote copy source storage unit 30 (S220, S221). The storage unit 30 confirms the remote copy destination volume is the virtual volume (S222) and transmits the write command to the primary storage unit 10 (S223). However, because a fault has occurred in the access to the primary volume, the remote copy source storage unit 30 detects an error (S224).

The remote copy source storage unit 30 switches from the primary path to the secondary path (S225) and transmits the write command to the secondary storage unit 20 (S226).

The secondary storage unit 20 similarly confirms that same is the secondary storage unit (S227) and updates the virtual volume management information (S228). The secondary storage unit 20 issues a request to the primary storage unit 10 to switch the volume attribute (S229) and transmits the virtual volume management information to the primary storage unit 10 (S230).

The primary storage unit 10 updates the virtual volume management information (S231) and reports the fact that the update is complete to the secondary storage unit 20 (S232).

The secondary storage unit 20 stores the write data from the remote copy source storage unit 30 (S233) in the cache memory 130 of the secondary storage unit 20 (S234).

The secondary storage unit 20 transmits the write command and write data to the primary storage unit 10 (S235, S236). The primary storage unit 10 stores the write data in the cache memory 130 of the primary storage unit 10 (S237) and reports the completion of processing to the secondary storage unit 20 (S238).

The secondary storage unit 20 reports the fact that the write command processing is complete, that is, that the remote copy is complete to the remote copy source storage unit 30 (S239). The remote copy source storage unit 30 reports the fact that the write command processing is complete to the host 70 (S240).

This embodiment is constituted as above and affords the following effects. In this embodiment, one virtual volume is generated by means of the primary volume of the primary storage unit and the secondary volume of the secondary storage unit and supplied to the host 70. Therefore, the path control unit 78 of the host 70 is able to access the virtual volume by using either the primary path or the secondary path. Hence, the application program 79 of the host 70 is able to continue the processing without being aware of the path switching, and user convenience improves.

In this embodiment, the virtual volume is constituted by a pair of a primary volume and secondary volume. Hence, the data in the virtual volume can also be stored in two locations, namely, the primary volume and the secondary volume, and the reliability of the data protection can be increased.

In this embodiment, the management server 80 is able to provide the virtual volume 231 in the storage system simply by transmitting virtual volume management information which is required to set the virtual volume 231 to either the primary storage unit or the secondary storage unit. Therefore, the user need not set both the primary storage unit and the secondary storage unit and user convenience improves.

In this embodiment, the management server 80 is able to make remote copy settings simply by transmitting remote copy management information to the remote copy source storage unit or remote copy destination storage unit. Hence, the user does not need to set the remote copy source storage unit and the remote copy destination storage unit and user convenience improves.

Second Embodiment

The second embodiment will now be described with reference to FIGS. 38 and 39. The following embodiments including this embodiment corresponds to modified examples of the first embodiment. Descriptions which overlap with the first embodiment are omitted. In this embodiment, both the remote copy source volume and the remote copy destination volume are constituted by a virtual volume.

That is, one virtual volume is provided by making a pair from a first storage unit and a second storage unit and another virtual volume is provided by making another pair from a third storage unit and a fourth storage unit. The first virtual volume which is provided by the first storage unit and the second storage unit is the remote copy source volume. The other virtual volume which is provided by the third and fourth storage units is the remote copy destination volume.

The virtual volume setting method is as per the first embodiment. Virtual volume management information may be transmitted by the management server 80 to either storage unit of the two storage units which constitute the pair, for each of the pairs.

Figure 38:
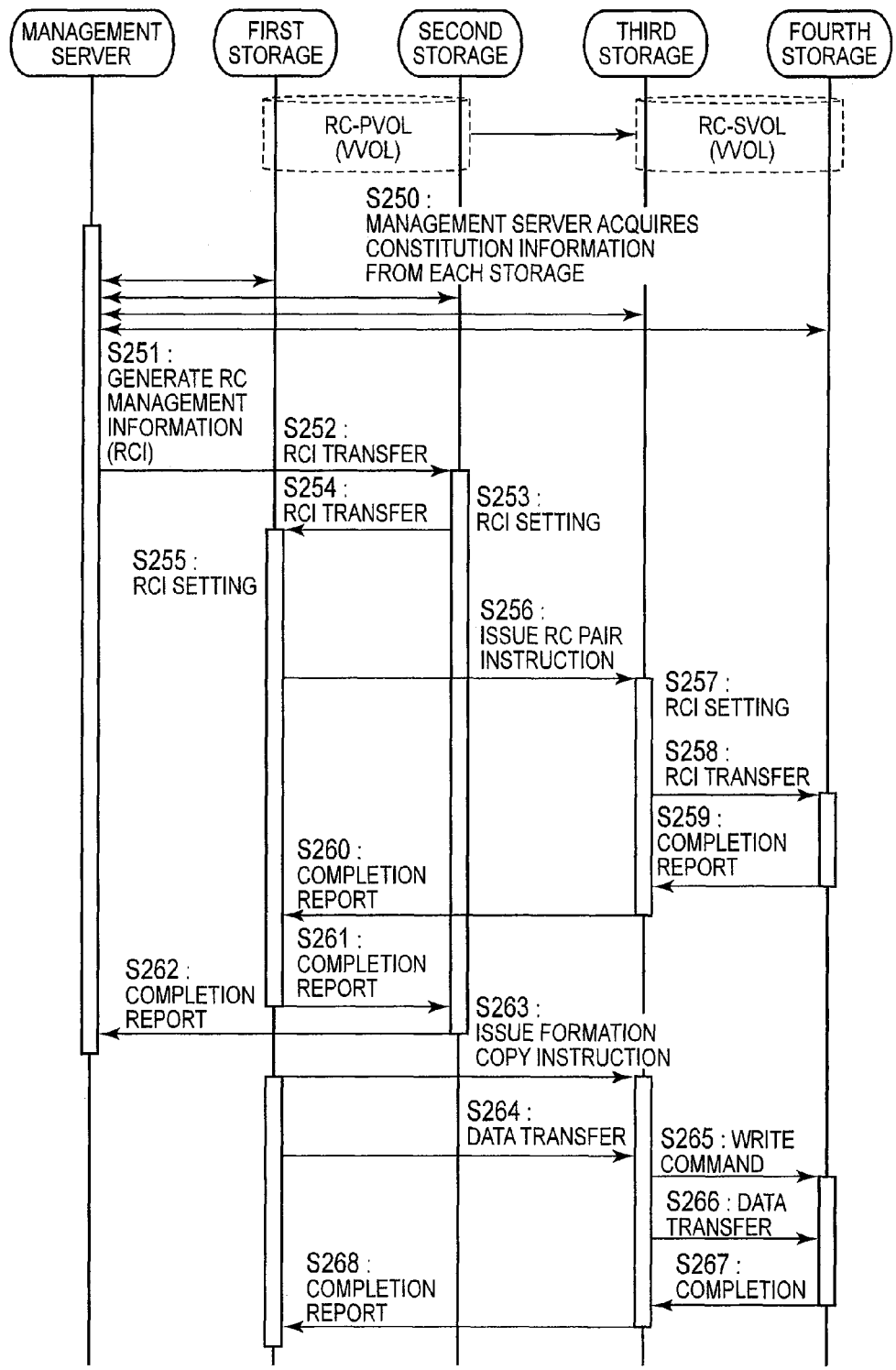
FIG. 38 is a flowchart that shows a method for forming a remote copy between virtual volumes in a storage system according to a second embodiment.

FIG. 38 shows a setting method in a case where a remote copy is made using virtual volumes. In FIG. 38, the remote copy management information is conveniently abbreviated as 'RCI'. The management server 80 acquires the constitution information from the first to fourth storage units (S250).

The management server 80 generates remote copy management information on the basis of the user instruction (S251) and transmits remote copy management information to the remote copy source storage unit (to either the first storage unit or the second storage unit) (S252). In FIG. 38, the management server 80 transmits remote copy management information to the secondary storage unit (second storage unit) constituted by the remote copy source virtual volume.

The second storage unit makes remote copy settings (S253) and then transmits remote copy management information to the first storage unit (S254). After performing remote copy settings (S255), the first storage unit transmits remote copy management information to one of the respective storage units of the remote copy destination and issues an instruction to set a remote copy pair (S256). In FIG. 38, an instruction to set a remote copy pair is issued by the first storage unit which is the primary storage unit of one virtual volume to the third storage unit which is the primary storage unit of the other virtual volume.

As mentioned with regard to the first storage unit and second storage unit, the third storage unit makes remote copy settings (S257) and then transmits the remote copy management information to the fourth storage unit (S258). The fourth storage unit makes remote copy settings and reports the fact that the setting is complete to the third storage unit (S259).

On confirming that a remote copy has been set by the fourth storage unit, the third storage unit reports the completion of the settings to the first storage unit (S260). The first storage unit reports the completion of settings to the second storage unit (S261). The second storage unit reports the completion of the settings to the management server 80 (S262).

Thereafter, the remote copy source storage unit starts the formation copy with appropriate timing. The first storage unit of the remote copy source issues an instruction to the third storage unit of the remote copy destination to start a formation copy (S263). The first storage unit transmits the data stored in the remote copy source virtual volume to the third storage unit (S264).

The third storage unit stores the data received from the first storage unit in the cache memory in the third storage unit and transmits a write command and write data to the fourth storage unit (S265, S266). The fourth storage unit stores the data received from the third storage unit to the cache memory in the fourth storage unit (S267) and reports the completion of writing to the third storage unit (S268). The third storage unit reports the completion of processing to the first storage unit (S269).

Figure 39:
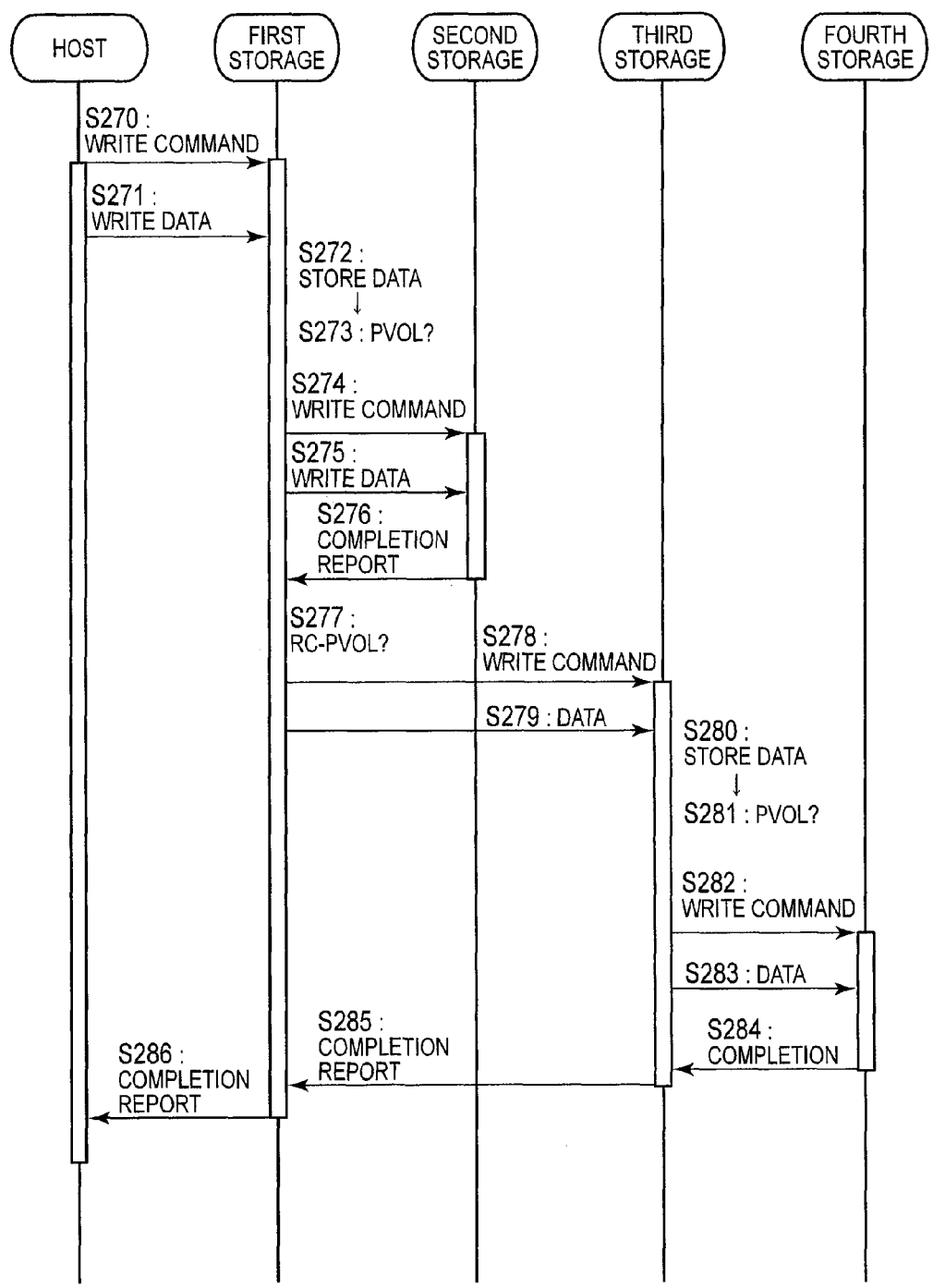
FIG. 39 is a flowchart for processing a write command.

FIG. 39 is a flowchart that shows write processing in a case where a remote copy pair is formed by two virtual volumes.

The host 70 transmits a write command and write data to the first storage unit (S270, S271).

The first storage unit stores write data in the cache memory (S272) and confirms that the first storage unit itself is the primary storage unit (S273). The first storage unit transmits the write command and write data to the second storage unit which constitutes the secondary storage unit (S274, S275). The second storage unit stores the write data received from the first storage unit in the cache memory and reports the completion of writing to the first storage unit (S276).

The first storage unit confirms that the first storage unit itself is the remote copy source storage unit (S277). The first storage unit transmits the write command and write data to the third storage unit of the remote copy destination (S278, S279).

The third storage unit stores the write data received from the first storage unit in the cache memory (S280). The third storage unit confirms that the third storage unit itself is the primary storage unit (S281) and transmits a write command and write data to the fourth storage unit (S282, S283).

The fourth storage unit stores the write data received from the third storage unit in the cache memory and reports the completion of writing to the third storage unit (S284). The third storage unit reports the completion of writing to the first storage unit (S285). The first storage unit reports the completion of writing to the host 70 (S286). As was mentioned earlier, the first storage unit is also able to report the completion of writing to the host 70 prior to confirming that data have been written by the remote copy destination.

An embodiment with such a constitution affords the same effects as those of the first embodiment. In this embodiment, because the virtual volume is set in both the remote copy source site and also the remote copy destination site, the redundancy of the data protection can be improved still further and the disaster recovery performance can be improved.

Third Embodiment

The third embodiment will now be described with reference to FIGS. 40 to 42. In this embodiment, separate volumes and a remote copy pair are formed by the primary volume and secondary volume which constitute the virtual volume.

Figure 40:
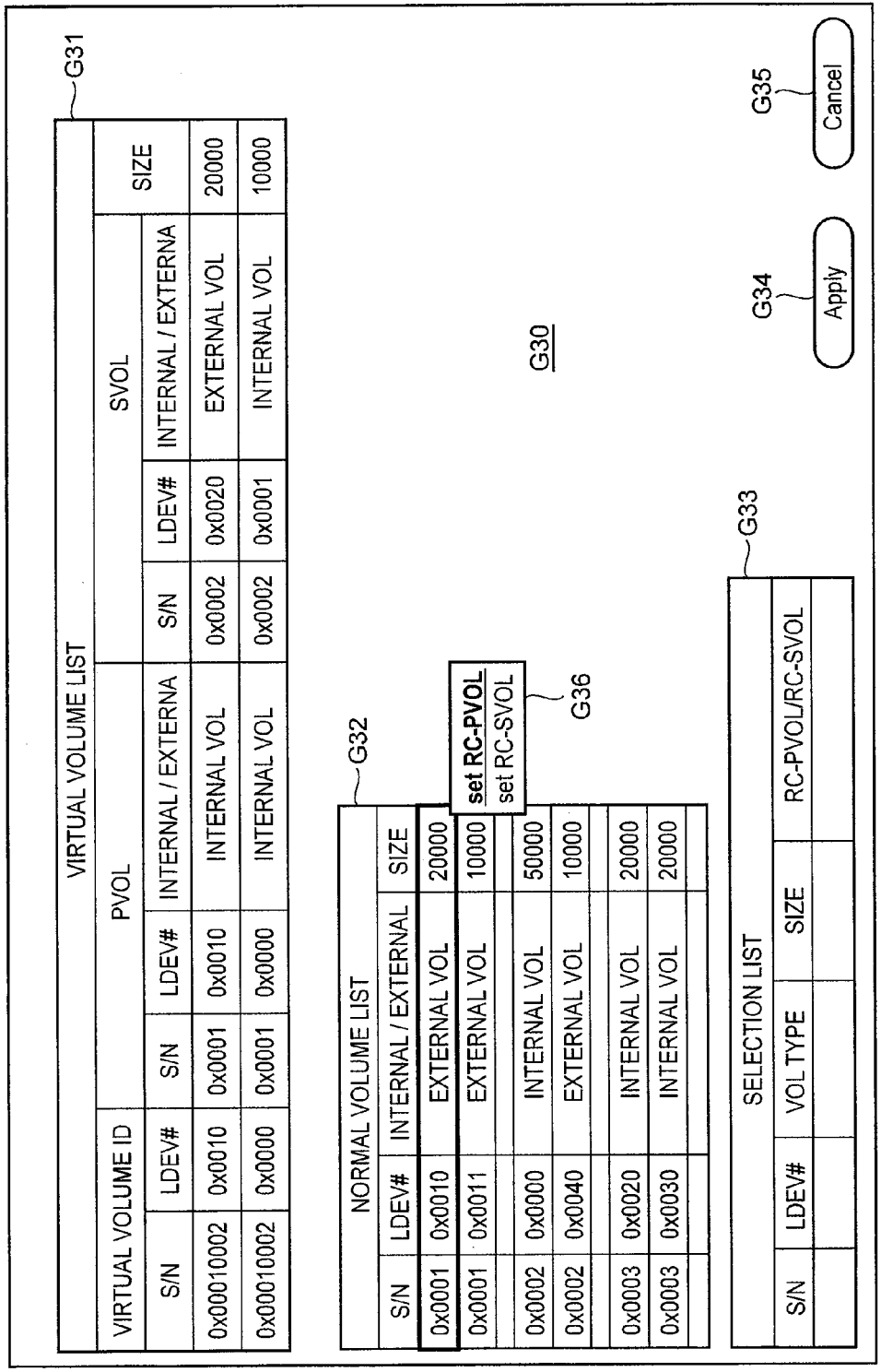
FIG. 40 is an explanatory diagram that shows a screen for setting a remote copy to some volumes in a virtual volume in a storage system according to a third embodiment.

FIG. 40 is a screen that shows an aspect in which the primary volume constituting the virtual volume is set as the remote copy source volume. That is, all the virtual volumes are not set as remote copy source volumes and a remote copy can be set for either or of both of the two volumes which constitute the virtual volume.

Figure 41:
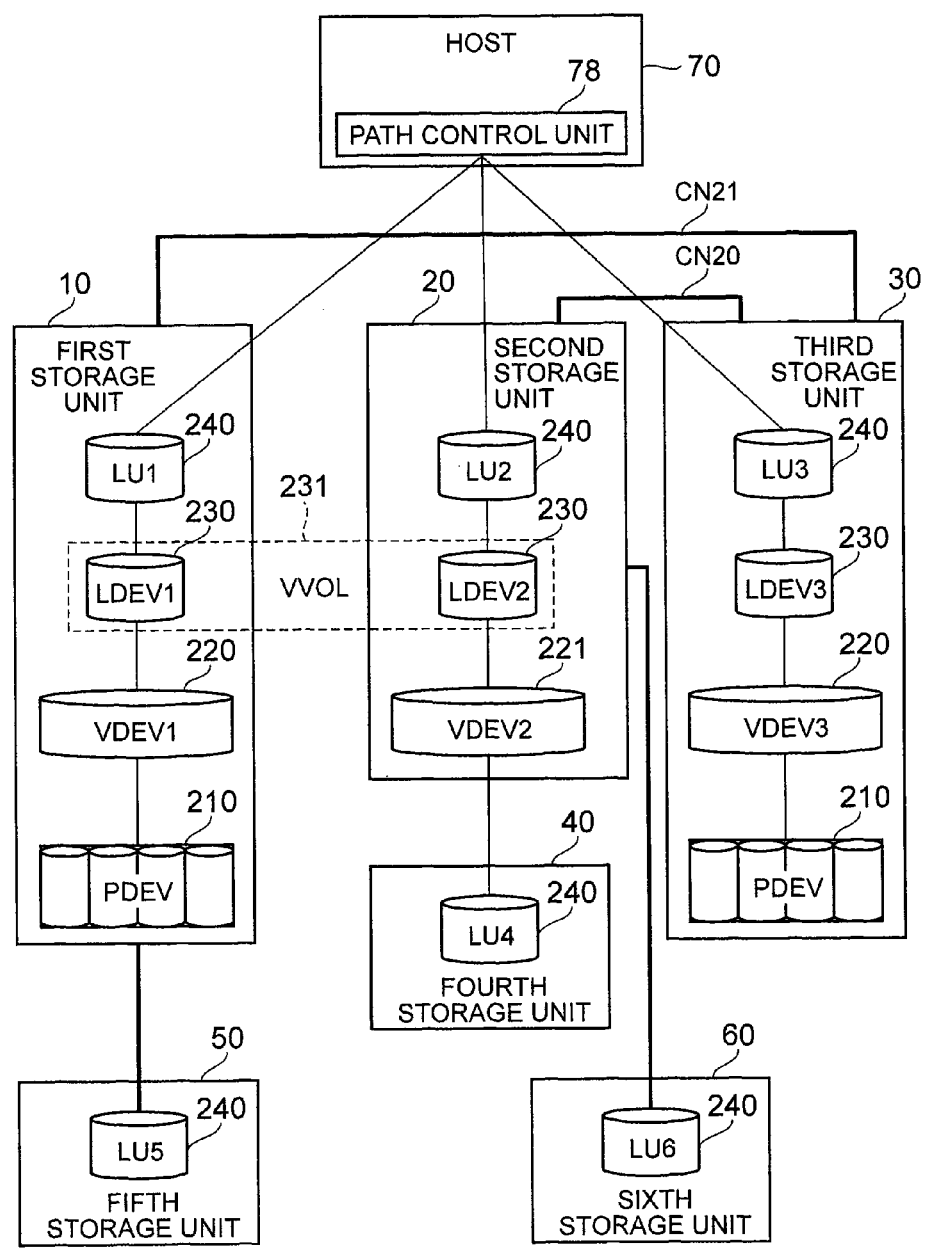
FIG. 41 is an explanatory diagram that shows the constitution of the storage system of the third embodiment.

FIG. 41 is an explanatory diagram showing the overall constitution of the storage system. As shown in FIG. 41, the first storage unit 10, third storage unit 30, and fifth storage unit 50 are connected. The second storage unit 20 is connected to the third storage unit 30, the fourth storage unit 40, and the sixth storage unit 60.

The second storage unit 20 uses an external connection function to use the logical volume 230 of the fourth storage unit 40. Therefore, a write command or read command which targets volumes in the second storage unit 20 is converted into a command for the fourth storage unit 40 in the second storage unit 20.

Figure 42:
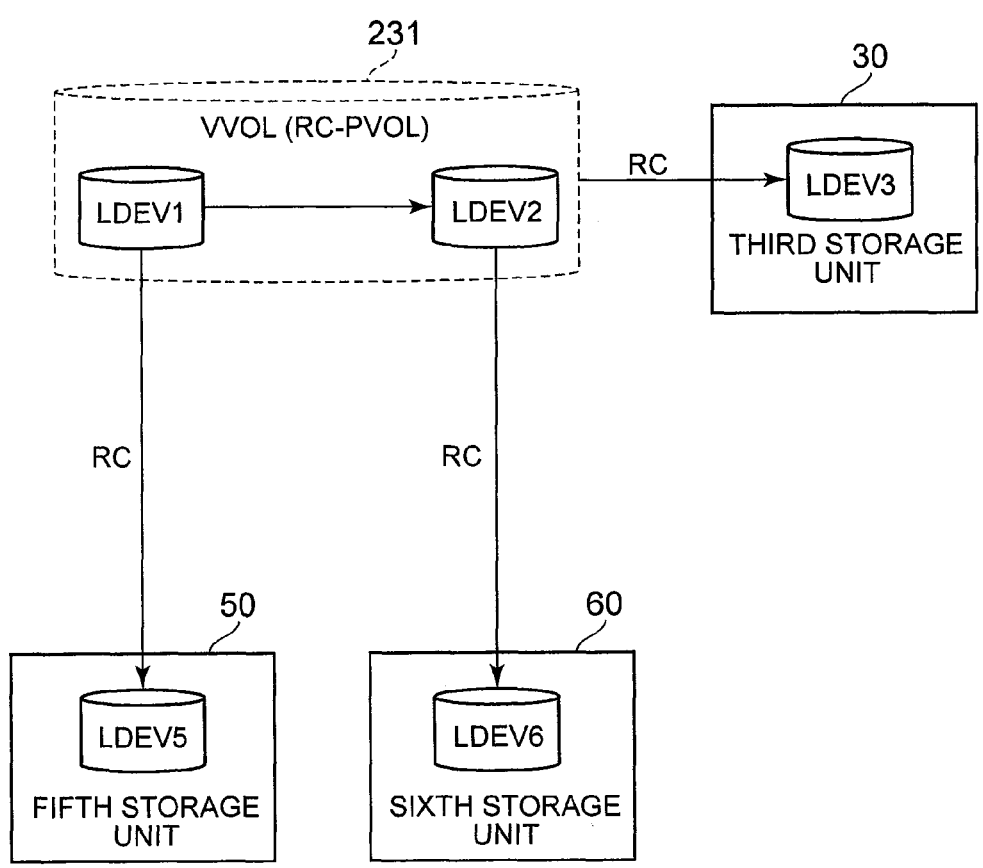
FIG. 42 is an explanatory diagram that shows the constitution of the remote copy that is set by the storage system.

FIG. 42 is an explanatory diagram showing, in simplified form, a remote copy pair which is provided in the storage system. The virtual volume 231 forms a remote copy pair with the logical volume in the third storage unit 30. The primary volume (LDEV1) which constitutes the virtual volume 231 forms a remote copy pair with the logical volume (LDEV5) in the fifth storage unit 50. The secondary volume (LDEV2)

which constitutes the virtual volume 231 forms a remote copy pair with the logical volume (LDEV6) in the sixth storage unit 60.

A remote copy which uses virtual volume 231 and a normal volume (LDEV3) is as per the first embodiment. Normally, the primary volume (LDEV1) and secondary volume (LDEV2) in the virtual volume 231 have synchronized stored content and the stored content of either the primary volume or secondary volume is transmitted to the remote copy destination volume (LDEV3). So too in cases where fault occurs in the virtual volume 231, data can be transferred to the remote copy destination volume by using either the primary volume or the secondary volume.

That is, in cases of a remote copy pair which uses the virtual volume 231, even when a fault occurs with a partial volume (either the LDEV1 or LDEV2) which constitutes the virtual volume 231, the remote copy can be continued. Even in cases where a fault occurs in either the primary volume or the secondary volume, the work can be continued using the virtual volume 231 and the data written to the virtual volume 231 can be stored in the remote copy destination volume.

In contrast, there are cases of a remote copy between the partial volume (either the LDEV1 or LDEV2) in the virtual volume 231 and the normal volume (LDEV5, LDEV6) and the normal volume (LDEV5, LDEV6) and cases where the remote copy is interrupted by a fault that occurs in the virtual volume 231. In cases where a fault occurs in the primary volume, for example, a remote copy pair in which the primary volume is the remote copy source volume (a pair of LDEV1 and LDEV5) stops the remote copy processing. A remote copy pair in which the secondary volume is the remote copy source volume (a pair of the LDEV2 and LDEV6) continues the remote copy irrespective of the fault with the primary volume.

In cases where a fault occurs with the secondary volume, a remote copy pair in which the secondary volume is the remote copy source volume stops the remote copy. A remote copy pair in which the primary volume is the remote copy source volume continues the remote copy.

This embodiment which is constituted thus affords the same effects as those of the first embodiment. In addition, in this embodiment, all of the virtual volumes can also be used to perform a remote copy or part of the virtual volume can be used to perform a remote copy. In addition, in this embodiment, a remote copy that utilizes the whole of the virtual volume and a remote copy that utilizes part of the virtual volume can be mixed together.

Therefore, in cases where a fault arises in either the primary volume or the secondary volume which constitutes the virtual volume, the stored content when a fault occurs can also be saved while continuing the remote copy which targets virtual volumes. For example, in cases where a fault occurs in the primary volume, the stored content at the point where the fault occurs can be saved in the volume constituting the remote copy destination (LDEV5) of the primary volume while using the secondary volume to maintain the remote copy pair of the virtual volume 231 and the remote copy destination volume (LDEV3). As a result, user convenience improves.

Fourth Embodiment

A fifth embodiment will now be described with reference to FIGS. 43 to 47. This embodiment describes a case where a virtual volume is deleted. As mentioned hereinbelow, in this embodiment, a virtual volume is deleted by judging the relationship between the virtual volume and the remote copy. In addition, in this embodiment, in cases where a pair of the primary volume and the secondary volume which constitute the virtual volume is cancelled, either the primary volume or the secondary volume is used in order to be able to take over the remote copy set for the virtual volume.

Figure 43:
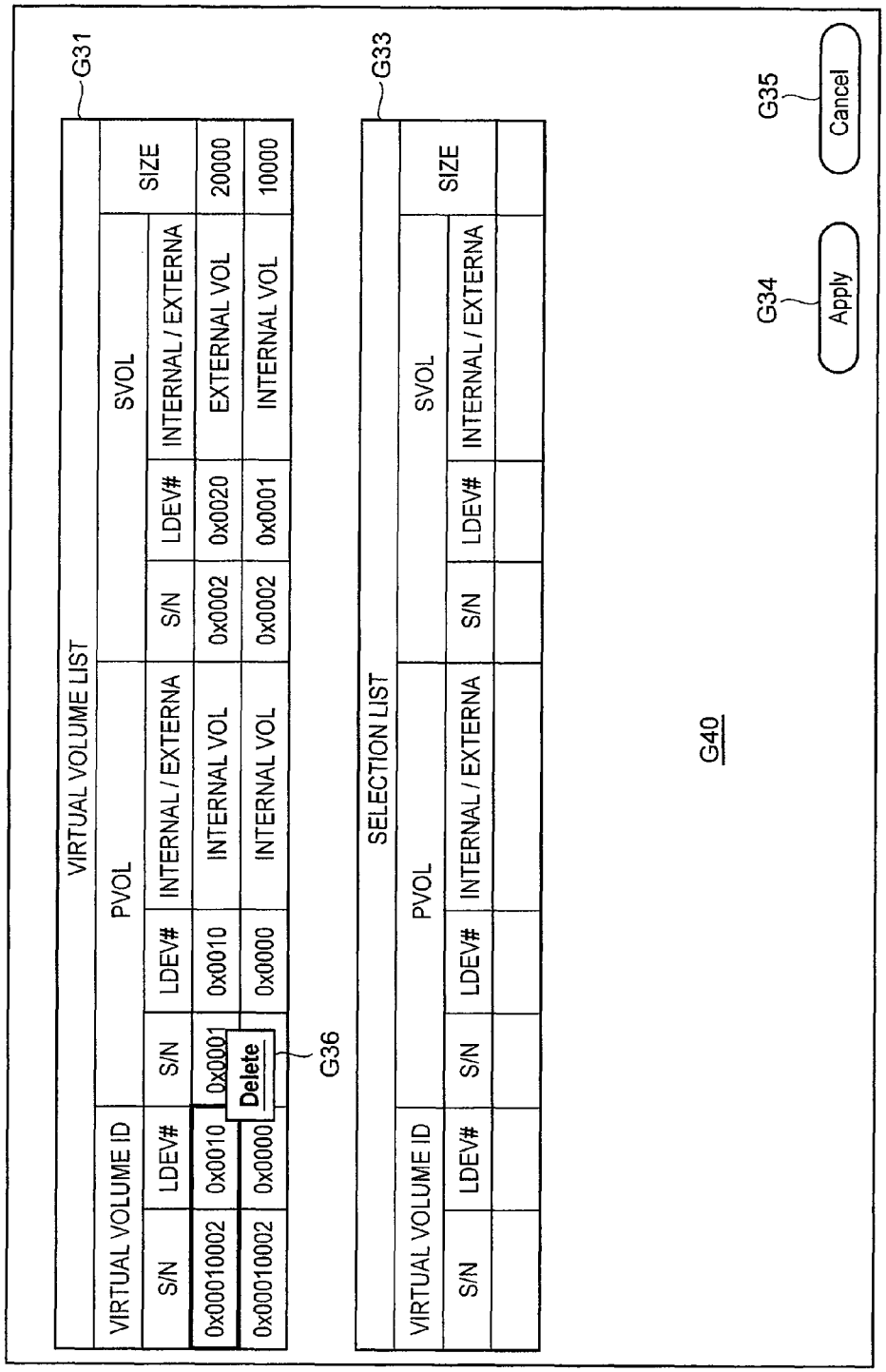
FIG. 43 is an explanatory diagram that shows a screen in which the virtual volume is deleted without taking over the virtual identifier in a storage system according to a fourth embodiment.

A case where the virtual volume is deleted without taking over the virtual identifier set for the virtual volume will now be described with reference to FIGS. 43 and 44. FIG. 43 shows a screen G40 which deletes the virtual volume. The user is able to select a virtual volume which is specified by the virtual identifier '0x00010002 0x0010' in FIG. 43 and issue an instruction via the submenu G36 to delete the selected virtual volume.

FIG. 44 shows a state in which the virtual volume which is to be deleted is determined. The selection list G33 displays information on the virtual volume selected in FIG. 43. As a result of the user operating the apply button G34, the virtual volume is deleted. The virtual identifier is not taken over by any volume and the virtual volume is deleted. However, as will be described subsequently using FIG. 47, in cases where a remote copy has been set for the virtual volume which is to be deleted, a warning is sent to the user.

FIGS. 45 and 46 show a case where the virtual identifier set for the virtual volume is handed over to either the primary volume or the secondary volume which constitute the virtual volume and the virtual volume is deleted.

As shown in FIG. 45, the user is able to select the primary volume which constitutes the virtual volume which is to be deleted and issue an instruction to delete the virtual volume. As shown in FIG. 46, information on the virtual volume which is to be deleted is shown in the selection list G36.

However, in the case of FIG. 46, although information relating to the selected primary volume is displayed in the selection list G33, information relating to the secondary volume which has not been selected is not displayed in the selection list G33.

That is, in cases where the whole virtual volume is deleted, as shown in FIG. 43, the virtual identifier is selected and, in cases where part of the virtual volume is deleted, as shown in FIG. 46, part of the deletion target (the primary volume in FIG. 45) is selected. 'In cases where part of the virtual volume is deleted' signifies that the virtual identifier set for the virtual volume is handed over to either one of the volumes constituting the virtual volume. In the example shown in FIG. 46, the virtual identifier is handed over to the secondary volume.

Therefore, the user is able to access the secondary volume by using a virtual identifier that is the same as that used thus far even in cases where the virtual volume is deleted, although, because the secondary volume is constituted by a single volume, in comparison with a virtual volume which is constituted by a pair of two volumes, the reliability of the data protection drops. However, data protection can be afforded redundancy by remote-copying the stored content of the secondary volume to another volume.

Figure 47:
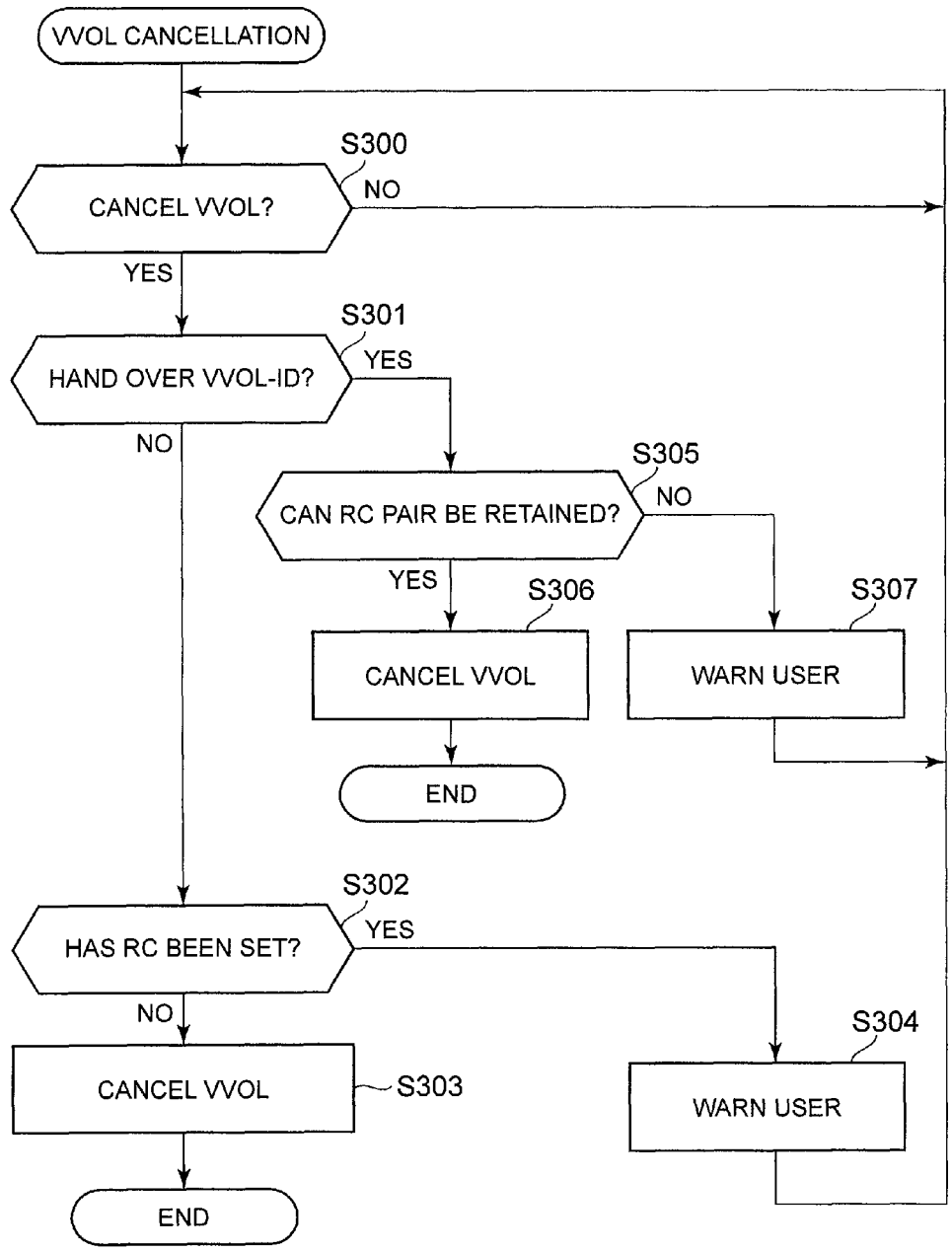
FIG. 47 is a flowchart that shows processing to judge whether the virtual volume is to be deleted by considering the remote copy set for the virtual volume.

FIG. 47 shows monitoring processing in a case where the virtual volume is deleted. The management server 80 judges whether the deletion of the virtual volume by the user has been instructed (S300). Deletion of the virtual volume signifies that the volumes constituting the virtual volume are restored to normal volumes and the virtual volume pair is cancelled.

For example, the management server 80 detects the fact that an instruction to delete the virtual volume has been issued either at the point the virtual volume to be deleted is selected or at the point where the virtual target volume is selected and the apply button G34 is operated (S300).

In cases where the virtual volume is canceled (deleted) (S300: YES), the management server 80 judges whether to take over the virtual identifier ('VVOL-ID' in FIG. 47) (S301). The take over the virtual identifier means to hand over the virtual identifier to any volume constituting the virtual volume, as shown in FIGS. 45 and 46.

In cases where the virtual identifier is not taken over (S301: NO), the management server 80 judges whether a remote copy has been set for the virtual volume (S302). In cases where a remote copy has not been set for the virtual volume (S302: NO), the management server 80 cancels the virtual volume (S303).

In cases where a remote copy has been set for the virtual volume (S302: YES), the management server 80 warns the user (S304). For example, the management server 80 supplies the user with an error message such as "A remote copy had been set for the virtual volume. Please cancel the remote copy setting and delete the virtual volume'. The user cancels the remote copy that has been set for the virtual volume and then issues an instruction to delete the virtual volume once again.

However, as shown in FIGS. 45 and 46, in cases where the virtual identifier has been handed over to any one of the plurality of volumes constituting the virtual volume (S301: YES), it is judged whether the remote copy that has been set for the virtual volume can be retained (S305).

A case where the virtual identifier is handed over by the secondary volume in the storage system shown in FIG. 41, for example, will now be described. The second storage unit 20 which is the secondary storage unit is connected to the third storage unit 30 which is the remote copy destination storage unit via the communication network CN2.

Therefore, if the communication link between the second storage unit 20 and the third storage unit 30 is set, the remote copy pair constituted by the virtual volume and the remote copy destination volume in the third storage unit 30 can be substituted for a remote copy pair that is constituted by the secondary volume and the remote copy destination volume.

In contrast, in cases where the second storage unit 20 and third storage unit 30 are unable to communicate and cases where a communication link has not been established between the secondary volume and remote copy destination volume, the secondary volume is unable to hand over the remote copy that has been set for the virtual volume.

In cases where the secondary volume is able to hand over a remote copy that has been set for the virtual volume (S305: YES), the management server 80 deletes the virtual volume and restores the primary volume and secondary volume to normal volumes (S306). In cases where the secondary volume is unable to hand over a remote copy that has been set for the virtual volume (S305: NO), the management server 80 warns the user (S307).

For example, the management server 80 issues an error message such as 'In order to hand over the remote copy that has been set for the virtual volume, please establish a communication link between the secondary volume and the remote copy destination volume' to the user. The user establishes a communication link between the secondary volume and the remote copy destination volume and then reissues an instruction to delete the virtual volume.

This embodiment with this constitution affords similar effects as those of the first embodiment. In addition, in this embodiment, the virtual identifier can be handed over and the virtual volume deleted to any one of a plurality of the volumes which constitute the virtual volume. Therefore, the virtual volume can be deleted without the host 70 being aware of this action. In addition, a new pair of the volume whose virtual identifier has been handed over and another volume can be constituted by means of the method described in FIG. 16. Hence, the constitution of the virtual volume can be changed while the virtual identifier identification by the host 70 is maintained.

More specifically, for example, in a first state, the virtual volume is constituted by the primary volume of the first storage unit 10 and the secondary volume of the second storage unit 20 and, in a second state, access by the host 70 is processed individually as a result of the secondary volume handing over the virtual identifier and, in a third state, a new virtual volume can be formed by the secondary volume and a volume in another storage unit. Because the virtual identifier is not changed during the period extending from the first state which passes via the second state before reaching the third state, the host 70 is substantially unaware of changes to the constitution of the virtual volume.

In this embodiment, in cases where the virtual volume is deleted, if the remote copy has been established for the virtual volume, the user is warned. Therefore, a situation where the user deletes a virtual volume without worrying about the remote copy that has been set for the virtual volume can be prevented and user convenience improves.

The present invention is not limited to the respective embodiments above. A person skilled in the art is able to make a variety of additions and changes and so forth within the scope of the present invention.

What is claimed is:

1. A storage system coupled to a host computer, comprising:
a first storage apparatus including a plurality of first storage devices and a first controller being configured to manage a first logical device with a first identifier on said plurality of first storage devices;
a second storage apparatus including a plurality of second storage devices and a second controller being configured to manage a second logical device with a second identifier on said plurality of second storage devices;
a third storage apparatus including a plurality of third storage devices and a third controller being configured to manage a third logical device with a third identifier on said plurality of third storage devices; and
a management computer being configured to manage said first storage apparatus, said second storage apparatus, and said third storage apparatus,
wherein said management computer is configured to instruct to create a virtual volume with a virtual identifier, said virtual volume corresponding both said first logical device in said first storage apparatus and said second logical device in said second storage apparatus,
wherein said first storage apparatus provides said first logical device with said virtual identifier as said virtual volume to said host computer, and the second storage apparatus provides said second logical device with said virtual identifier as said virtual volume to said host computer,
wherein, said management computer is configured to instruct to set a copy pair between said created virtual volume and said third logical device in said third storage apparatus,
wherein when said first controller in said first storage apparatus receives a write command to write data to said virtual volume from the host computer, said first controller is configured to write said data in said first logical device, transfer said data to said second storage apparatus to write said data in said second logical device, and transfer said write data to said third apparatus to write said data in said third logical device, wherein said management computer is configured to send first information to said first storage apparatus or said second storage apparatus when said management computer instructs to create said virtual volume, and wherein said first information includes said virtual identifier which identifies said virtual volume, said first identifier which identifies said first logical device as a primary volume corresponding to said virtual volume, and said second identifier which identifies said second logical device as a secondary volume corresponding to said virtual volume.

2. A storage system according to the claim 1, wherein data stored in said first logical device corresponding to said virtual volume is synchronized with data stored in said second logical unit corresponding to said virtual volume.

3. A storage system according to claim 1, wherein said first controller is configured to transfer said data to said second storage apparatus to write said data in said second logical device synchronously, and transfer said write data to said third apparatus to write said data in said third logical device asynchronously.

4. A storage system according to the claim 1, wherein said first controller in said first storage apparatus is configured to provide said virtual volume with said virtual identifier through a first path to a computer, and wherein said second controller in said second storage apparatus is configured to provide said virtual volume with said virtual identifier through a second path to said computer.

5. A storage system according to the claim 4, wherein said first path is a primary path and said second path is a secondary path.

6. A storage system according to the claim 1, wherein said management computer is configured to send second information to said first storage apparatus or said second storage apparatus when said management computer instructs to set said remote copy pair between said created virtual volume and said third logical device in said third storage apparatus, and wherein said second information includes said virtual identifier as a remote copy source identifier and said third identifier as a remote copy destination identifier.

7. A virtualization method for virtualizing logical devices in a storage system coupled to a host computer, the storage system comprising a first storage apparatus including a plurality of first storage devices and a first controller, a second storage apparatus including a plurality of second storage devices and a second controller, a third storage apparatus including a plurality of third storage devices and a third controller, and a management computer, the method comprising:

managing, by the first controller, a first logical device with a first identifier on said plurality of first storage devices;

managing, by the second controller, a second logical device with a second identifier on said plurality of second storage devices;

managing, by the third controller, a third logical device with a third identifier on said plurality of third storage devices;

managing, by the management computer, said first storage apparatus, said second storage apparatus, and said third storage apparatus;

instructing, by said management computer, to create a virtual volume with a virtual identifier, said virtual volume corresponding both said first logical device in said first storage apparatus and said second logical device in said second storage apparatus; and instructing, by said management computer, to set a copy pair between said created virtual volume and said third logical device in said third storage apparatus;

providing, by said first storage apparatus, said first logical device with said virtual identifier as said virtual volume to said host computer, and providing, by second storage apparatus, said second logical device with said virtual identifier as said virtual volume to said host computer; and when said first controller in said first storage apparatus receives a write command to write data to said virtual volume from the host computer, writing, by said first controller, said data in said first logical device, transferring, by said first controller, said data to said second storage apparatus to write said data in said second logical device, and transferring, by said first controller, said write data to said third apparatus to write said data in said third logical device;

sending, by said management computer, first information to said first storage apparatus or said second storage apparatus when said management computer instructs to create said virtual volume, wherein said first information includes said virtual identifier which identifies said virtual volume, said first identifier which identifies said first logical device as a primary volume corresponding to said virtual volume, and said second identifier which identifies said second logical device as a secondary volume corresponding to said virtual volume.

8. A virtualization method according to the claim 7, wherein data stored in said first logical device corresponding to said virtual volume is synchronized with data stored in said second logical unit corresponding to said virtual volume.

9. A virtualization method according to claim 7, further comprising:

transferring, by said first controller, said data to said second storage apparatus to write said data in said second logical device synchronously and transferring, by said first controller, said write data to said third apparatus to write said data in said third logical device asynchronously.

10. A virtualization method according to the claim 7, further comprising:

providing, by said first controller in said first storage apparatus, said virtual volume with said virtual identifier through a first path to a computer; and providing, by said second controller in said second storage apparatus, said virtual volume with said virtual identifier through a second path to said computer.

11. A virtualization method according to the claim 10, wherein said first path is a primary path and said second path is a secondary path.

12. A virtualization method according to the claim 7, further comprising:

sending, by said management computer, second information to said first storage apparatus or said second storage apparatus when said management computer instructs to set said remote copy pair between said created virtual volume and said third logical device in said third storage apparatus, wherein said second information includes said virtual identifier as a remote copy source identifier and said third identifier as a remote copy destination identifier.

* * * * *